(12) United States Patent
Chakraborty et al.

(10) Patent No.: US 12,121,413 B2
(45) Date of Patent: Oct. 22, 2024

(54) ORTHODONTIC ARTICLES AND METHODS OF MAKING AND POSTPROCESSING SAME

(71) Applicant: 3M INNOVATIVE PROPERTIES COMPANY, St. Paul, MN (US)

(72) Inventors: Saswata Chakraborty, Cottage Grove, MN (US); Benjamin C. MacMurray, Minneapolis, MN (US); James D. Hansen, White Bear Lake, MN (US); Karl J. L. Geisler, St. Paul, MN (US); Thomas P. Klun, Lakeland, MN (US); Daniel J. Skamser, Ham Lake, MN (US); John M. Riedesel, San Jose, CA (US); Steven H. Kong, Woodbury, MN (US); Anja Friedrich, Unterschleißheim (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 638 days.

(21) Appl. No.: 17/297,186

(22) PCT Filed: Jan. 21, 2020

(86) PCT No.: PCT/IB2020/050451
§ 371 (c)(1),
(2) Date: May 26, 2021

(87) PCT Pub. No.: WO2020/157598
PCT Pub. Date: Aug. 6, 2020

(65) Prior Publication Data
US 2022/0023007 A1 Jan. 27, 2022

Related U.S. Application Data

(60) Provisional application No. 62/798,083, filed on Jan. 29, 2019.

(51) Int. Cl.
| | |
|---|---|
| *A61C 7/08* | (2006.01) |
| *B29C 64/135* | (2017.01) |
| *B29C 64/30* | (2017.01) |
| *B33Y 10/00* | (2015.01) |
| *C08F 2/46* | (2006.01) |
| *C08F 2/50* | (2006.01) |
| *C08G 61/04* | (2006.01) |
| *B29C 64/241* | (2017.01) |
| *B29C 71/02* | (2006.01) |
| *B29C 71/04* | (2006.01) |
| *B29L 31/00* | (2006.01) |
| *B33Y 40/20* | (2020.01) |

(52) U.S. Cl.
CPC .............. *A61C 7/08* (2013.01); *B29C 64/135* (2017.08); *B29C 64/30* (2017.08); *B33Y 10/00* (2014.12); *B29C 64/241* (2017.08); *B29C 71/02* (2013.01); *B29C 71/04* (2013.01); *B29L 2031/753* (2013.01); *B33Y 40/20* (2020.01)

(58) Field of Classification Search
CPC ....... B29C 64/35; B29C 64/135; B29C 64/30; B29C 64/241; B29C 71/02; B29C 71/009; B29C 71/04; B33Y 70/00; B33Y 10/00; B33Y 80/00; B33Y 40/20; A61C 7/0002; A61C 7/08; B29L 2031/7536; B29L 2031/753
USPC ...... 264/347, 345, 340; 522/6, 189, 184, 71, 522/1; 520/1
See application file for complete search history.

(56) References Cited

U.S. PATENT DOCUMENTS

| | | | |
|---|---|---|---|
| 4,642,126 | A | 2/1987 | Zador |
| 4,652,274 | A | 3/1987 | Boettcher |
| 9,205,601 | B2 | 12/2015 | DeSimone |
| 9,360,757 | B2 | 6/2016 | DeSimone |
| 9,421,582 | B1 | 8/2016 | Zolnierek |
| 9,861,452 | B2 | 1/2018 | Rundlett |

(Continued)

FOREIGN PATENT DOCUMENTS

| | | |
|---|---|---|
| CN | 103934940 | 7/2014 |
| CN | 109016496 | 12/2018 |

(Continued)

OTHER PUBLICATIONS

Inai, JP 2000085018 Machine Translation, Mar. 28, 2000 (Year: 2000).*

(Continued)

*Primary Examiner* — Jessica Whiteley

(57) ABSTRACT

The present disclosure provides a method of making an orthodontic article. The method includes (a) providing a photopolymerizable composition; (b) selectively curing the photopolymerizable composition using actinic radiation to form an article in the shape of an orthodontic article including a number of layers of at least one photopolymerized polymer; and (c) moving the article and thereby generating a mass inertial force in the uncured photopolymerizable composition. The article has a first surface, and no more than 75% of the first surface has a slope magnitude greater than 2.5 degrees. Orthodontic articles are also provided, including an orthodontic article that is prepared according to the method. Orthodontic articles having low extractable component content are further provided. The mass inertial force tends to form a coating layer of uncured photopolymerizable composition on the article, and curing the coating layer can form a surface having low slope magnitude. The low slope magnitude may be correlated to a low haze of the surface of the article.

18 Claims, 16 Drawing Sheets

(56) References Cited

U.S. PATENT DOCUMENTS

| | | | |
|---|---|---|---|
| 10,011,050 B2 | 7/2018 | Kitching | |
| 10,383,704 B2 | 8/2019 | Kitching | |
| 10,703,085 B2 | 7/2020 | Yasukochi | |
| 10,759,116 B2 | 9/2020 | Wynne | |
| 2004/0159340 A1 | 8/2004 | Hiatt | |
| 2007/0031791 A1 | 2/2007 | Cinader, Jr. | |
| 2008/0248442 A1 | 10/2008 | Raby | |
| 2011/0091832 A1 | 4/2011 | Kim | |
| 2013/0095446 A1 | 4/2013 | Andreiko | |
| 2014/0356799 A1 | 12/2014 | Cinader, Jr. | |
| 2016/0311163 A1 | 10/2016 | Yasukochi | |
| 2018/0304497 A1 | 10/2018 | Kitching | |
| 2019/0374309 A1* | 12/2019 | Parkar | B33Y 50/02 |
| 2021/0315668 A1 | 10/2021 | Achten | |

FOREIGN PATENT DOCUMENTS

| | | | |
|---|---|---|---|
| CN | 109016496 A | * | 12/2018 |
| CN | 2000085018 | * | 12/2018 |
| EP | 2008636 | | 12/2008 |
| EP | 2167013 | | 3/2010 |
| JP | 2000085018 | * | 3/2000 |
| JP | 2000085018 A | * | 3/2000 |
| JP | 2011-525848 | | 9/2011 |
| JP | 2014-133134 | | 7/2014 |
| JP | 2015-120261 | | 7/2015 |
| WO | WO 2013-134031 | | 9/2013 |
| WO | WO 2015-094842 | | 6/2015 |
| WO | WO 2016-094272 | | 6/2016 |
| WO | WO 2016-109660 | | 7/2016 |
| WO | WO 2016-148960 | | 9/2016 |
| WO | WO 2016-148961 | | 9/2016 |
| WO | WO 2016-149007 | | 9/2016 |
| WO | WO 2016-191162 | | 12/2016 |
| WO | 2017/106341 A1 | | 6/2017 |
| WO | WO 2018-005501 | | 1/2018 |
| WO | WO 2018-006011 | | 1/2018 |
| WO | 2018/119026 A1 | | 6/2018 |
| WO | WO 2018-111548 | | 6/2018 |
| WO | WO 2018-119026 | | 6/2018 |
| WO | WO 2019-023009 | | 1/2019 |
| WO | WO 2019-023120 | | 1/2019 |
| WO | WO 2019-103855 | | 5/2019 |
| WO | WO 2019-104072 | | 5/2019 |
| WO | WO 2019-104079 | | 5/2019 |
| WO | WO 2019-175716 | | 9/2019 |
| WO | WO 2019-224699 | | 11/2019 |
| WO | WO 2020-005411 | | 1/2020 |
| WO | WO 2020-005413 | | 1/2020 |
| WO | WO 2020-069152 | | 4/2020 |
| WO | WO 2020-104873 | | 5/2020 |

OTHER PUBLICATIONS

Hu et al., CN 109016496 Machine Translation, Dec. 18, 2018 (Year: 2018).*

Matsumoto, "Synthesis and Thermal Properties of Poly (cycloalkyl methacrylate) s Bearing Bridged- and Fused-Ring Structures", Journal of Polymer Science Part A Polymer Chemistry, Sep. 1993, vol. 31, No. 10, pp. 2531-2539.

Safety Data Sheet, "Dental LT Clear" Formlabs, Sep. 2017, 11 pages.

International Search Report for PCT International Application No. PCT/IB2020/050451, mailed on Apr. 7, 2020, 3 pages.

* cited by examiner

100μm

ORTHODONTIC ARTICLES AND METHODS OF MAKING AND POSTPROCESSING SAME

TECHNICAL FIELD

The present disclosure broadly relates to orthodontic articles and methods of making the orthodontic articles, such as additive manufacturing methods.

BACKGROUND

The use of stereolithography and inkjet printing to produce three-dimensional articles has been known for a relatively long time, and these processes are generally known as methods of so called 3D printing (or additive manufacturing). In vat polymerization techniques (of which stereolithography is one type), the desired 3D article is built up from a liquid, curable composition with the aid of a recurring, alternating sequence of two steps: in the first step, a layer of the liquid, curable composition, one boundary of which is the surface of the composition, is cured with the aid of appropriate radiation within a surface region which corresponds to the desired cross-sectional area of the shaped article to be formed, at the height of this layer, and in the second step, the cured layer is covered with a new layer of the liquid, curable composition, and the sequence of steps is repeated until a so-called green body (i.e., gelled article) of the desired shape is finished. This green body is often not yet fully cured and must, usually, be subjected to post-curing. The mechanical strength of the green body immediately after curing, otherwise known as green strength, is relevant to further processing of the printed articles.

Other 3D printing techniques use inks that are jetted through a print head as a liquid to form various three-dimensional articles. In operation, the print head may deposit curable photopolymers in a layer-by-layer fashion. Some jet printers deposit a polymer in conjunction with a support material or a bonding agent. In some instances, the build material is solid at ambient temperatures and converts to liquid at elevated jetting temperatures. In other instances, the build material is liquid at ambient temperatures.

SUMMARY

In a first aspect, a method of making an orthodontic article is provided. The method includes (a) providing a photopolymerizable composition; (b) selectively curing the photopolymerizable composition using actinic radiation to form an article in the shape of an orthodontic article including a plurality of layers of at least one photopolymerized polymer; and (c) moving the article and thereby generating a mass inertial force in the uncured photopolymerizable composition. The article has a first surface, and no more than 75% of the first surface has a slope magnitude greater than 2.5 degrees.

In a second aspect, an orthodontic article is provided. The orthodontic article is prepared by the method according to the first aspect.

In a third aspect, another orthodontic article is provided. The orthodontic article includes a plurality of layers of at least one photopolymerized crosslinked polymer. The orthodontic article has a first surface, and no more than 75% of the first surface has a slope magnitude greater than 2.5 degrees.

In a fourth aspect, a further orthodontic article is provided. The orthodontic article includes a plurality of layers of at least one photopolymerized crosslinked polymer. The orthodontic article includes 0.05% by weight or less of extractable components, based on the total weight of the orthodontic article, when extracted with 5 volume percent ethanol in water.

In a fifth aspect, another method is provided. The method includes (a) providing a first composition comprising a photopolymerizable composition; (b) selectively curing the first composition using actinic radiation to form an article in the shape of an orthodontic article including a plurality of layers of at least one photopolymerized polymer; (c) removing uncured first composition from the article; (d) applying a second composition comprising a polymerizable composition or a polymer to the article, wherein the first composition is different from the second composition; (e) moving the article and thereby generating a mass inertial force in the uncured photopolymerizable composition or polymer; (f) optionally subjecting the article to actinic radiation to photopolymerize uncured photopolymerizable composition; and (g) optionally subjecting the article to heat before, during, or after step (e).

It has been discovered that generating a mass inertial force in uncured photopolymerizable composition remaining on an article may form a coating layer on the article, and curing the coating layer can form a surface having low slope magnitude. The low slope magnitude tends to correlate to a low haze, high gloss, and high clarity appearance of the surface of the article.

Orthodontic aligners, dogbones, and rectangular test articles made according to at least certain embodiments of this disclosure were found to show one or more advantageous properties of low surface height variation, low haze, or high clarity, in addition to good mechanical properties.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Figure 1:
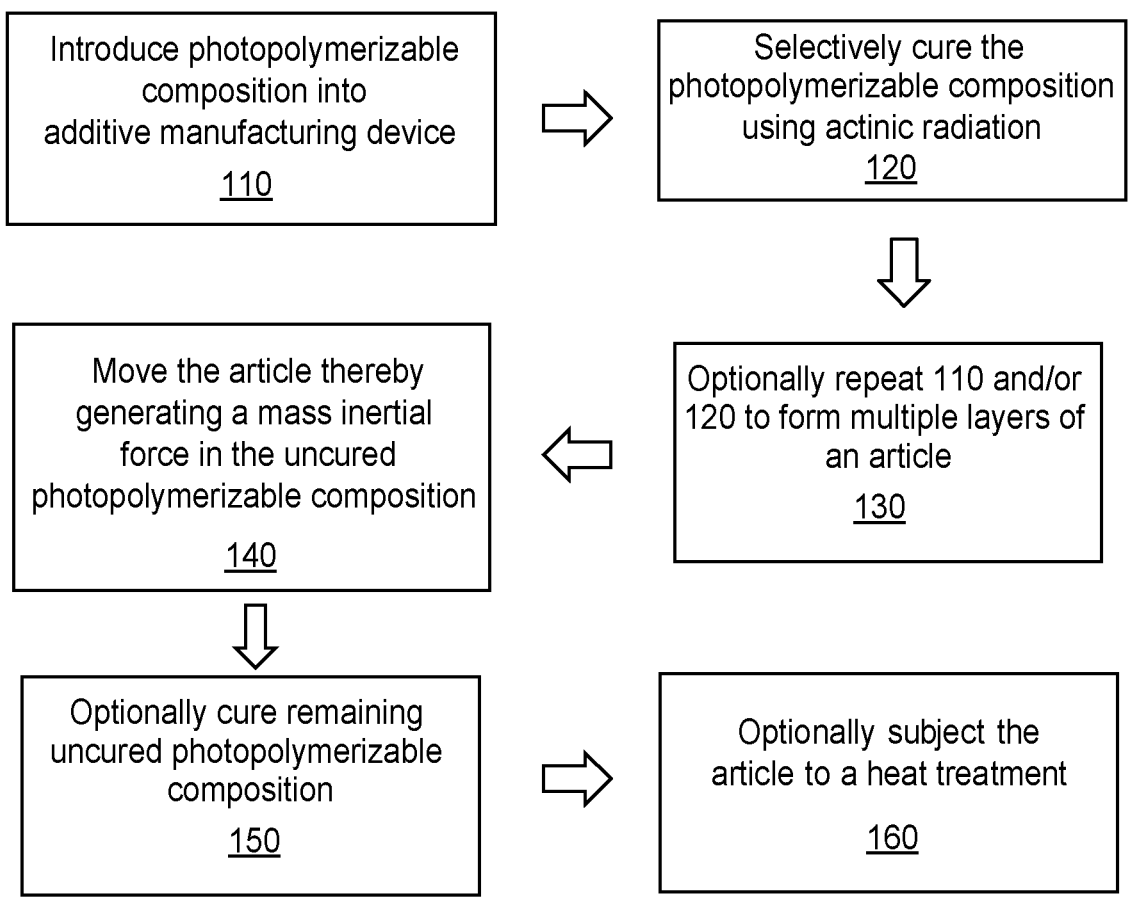
FIG. 1 is a flowchart of a process for building an article using the photopolymerizable compositions disclosed herein.

While the above-identified figures set forth several embodiments of the disclosure other embodiments are also contemplated, as noted in the description. The figures are not necessarily drawn to scale. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION OF ILLUSTRATIVE EMBODIMENTS

As used herein, "aliphatic group" means a saturated or unsaturated linear, branched, or cyclic hydrocarbon group. This term is used to encompass alkyl, alkenyl, and alkynyl groups, for example.

As used herein, "alkyl" means a linear or branched, cyclic or acyclic, saturated monovalent hydrocarbon having from one to thirty-two carbon atoms, e.g., methyl, ethyl, 1-propyl, 2-propyl, pentyl, and the like.

As used herein, "alkylene" means a linear saturated divalent hydrocarbon having from one to twelve carbon atoms or a branched saturated divalent hydrocarbon radical having from three to twelve carbon atoms, e.g., methylene, ethylene, propylene, 2-methylpropylene, pentylene, hexylene, and the like.

As used herein, each of "alkenyl" and "ene" refers to a monovalent linear or branched unsaturated aliphatic group with one or more carbon-carbon double bonds, e.g., vinyl.

As used herein, the term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

As used herein, "aralkylene" refers to a divalent group that is an alkylene group substituted with an aryl group or an alkylene group attached to an arylene group. The term "alkarylene" refers to a divalent group that is an arylene group substituted with an alkyl group or an arylene group attached to an alkylene group. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms.

As used herein, the term "essentially free" in the context of a composition being essentially free of a component, refers to a composition containing less than 1% by weight (wt. %), 0.5 wt. % or less, 0.25 wt. % or less, 0.1 wt. % or less, 0.05 wt. % or less, 0.001 wt. % or less, or 0.0001 wt. % or less of the component, based on the total weight of the composition.

As used herein, the term "glass transition temperature" ($T_g$), of a polymer refers to the transition of a polymer from a glassy state to a rubbery state and can be measured using Differential Scanning calorimetry (DSC), such as at a heating rate of 10° C. per minute in a nitrogen stream. When the $T_g$ of a monomer is mentioned, it is the $T_g$ of a homopolymer of that monomer. The homopolymer must be sufficiently high molecular weight such that the $T_g$ reaches a limiting value, as it is generally appreciated that a $T_g$ of a homopolymer will increase with increasing molecular weight to a limiting value. The homopolymer is also understood to be substantially free of moisture, residual monomer, solvents, and other contaminants that may affect the $T_g$. A suitable DSC method and mode of analysis is as described in Matsumoto, A. et. al., J. Polym. Sci. A., Polym. Chem. 1993, 31, 2531-2539.

As used herein, the terms "hardenable" refers to a material that can be cured or solidified, e.g., by heating to remove solvent, heating to cause polymerization, chemical crosslinking, radiation-induced polymerization or crosslinking, or the like.

As used herein, "curing" means the hardening or partial hardening of a composition by any mechanism, e.g., by heat, light, radiation, e-beam, microwave, chemical reaction, or combinations thereof.

As used herein, "cured" refers to a material or composition that has been hardened or partially hardened (e.g., polymerized or crosslinked) by curing.

As used herein, "integral" refers to being made at the same time or being incapable of being separated without damaging one or more of the (integral) parts.

As used herein, the term "(meth)acrylate" is a shorthand reference to acrylate, methacrylate, or combinations thereof, "(meth)acrylic" is a shorthand reference to acrylic, methacrylic, or combinations thereof, and "(meth)acryl" is a shorthand reference to acryl and methacryl groups. "Acryl"

refers to derivatives of acrylic acid, such as acrylates, methacrylates, acrylamides, and methacrylamides. By "(meth)acryl" is meant a monomer or oligomer having at least one acryl or methacryl groups, and linked by an aliphatic segment if containing two or more groups. As used herein, "(meth)acrylate-functional compounds" are compounds that include, among other things, a (meth)acrylate moiety.

The term "mass inertial force" as referred to herein may be specified as force per unit mass and therefore may be specified in the unit m/s$^2$. Further, the mass inertial force can be expressed by the G-force which is a factor of the acceleration of gravity. For the purposes of the present specification the acceleration of gravity is 9.81 m/s$^2$. Consequently, for example a mass inertial force of 9.81 m/s$^2$ can be expressed as 1 G.

As used herein, "polymerizable composition" means a hardenable composition that can undergo polymerization upon initiation (e.g., free-radical polymerization initiation). Typically, prior to polymerization (e.g., hardening), the polymerizable composition has a viscosity profile consistent with the requirements and parameters of one or more 3D printing systems. In some embodiments, for instance, hardening comprises irradiating with actinic radiation having sufficient energy to initiate a polymerization or cross-linking reaction. For instance, in some embodiments, ultraviolet (UV) radiation, e-beam radiation, or both, can be used. When actinic radiation can be used, the polymerizable composition is referred to as a "photopolymerizable composition".

As used herein, a "resin" contains all polymerizable components (monomers, oligomers and/or polymers) being present in a hardenable composition. The resin may contain only one polymerizable component compound or a mixture of different polymerizable compounds.

As used herein, the "residue of a diisocyanate", is the structure of the diisocyanate after the —NCO groups are removed. For example, 1,6-hexamethylene diisocyanate has the structure OCN—(CH$_2$)$_6$—NCO, and its residue, $R_{di}$, after removal of the isocyanate groups is —(CH$_2$)$_6$—.

As used herein, the "residue of a polycarbonate polyol", is the structure of the polycarbonate polyol after the —OH groups are removed. For example, a polycarbonate diol having the structure H(O—R$_1$—O—C(=O))$_m$O—R$_2$—OH, has a residue, $R_{dOH}$, after removal of the end —OH groups, of —(R$_1$—O—C(=O)NH-Q-(O—C(=O))$_m$R$_2$—, wherein each R$_1$ in each repeat unit and R$_2$ is independently an aliphatic, cycloaliphatic, or aliphatic/cycloaliphatic alkylene group and m is 2 to 23. Examples of R$_1$ and R$_2$ groups include —CH$_2$—CH$_2$—CH(CH$_3$)—CH$_2$—CH$_2$—, —CH$_2$—C(CH$_3$)$_2$—CH$_2$—, —(CH$_2$)$_6$—, —(CH$_2$)$_9$—, and —(CH$_2$)$_{10}$—.

As used herein, "thermoplastic" refers to a polymer that flows when heated sufficiently above its glass transition point and become solid when cooled.

As used herein, "thermoset" refers to a polymer that permanently sets upon curing and does not flow upon subsequent heating. Thermoset polymers are typically cross-linked polymers.

As used herein, "voxel" refers to a volume element and represents a value on a regular grid in three-dimensional space. In some examples, voxels may also be an array of elements of volume that constitute a notional three-dimensional space. That is, each voxel in a plurality of voxels may form an array of discrete volume elements into which a representation of a three-dimensional object may be divided. In some examples, a voxel may be a volume element, where the volume element includes a particular volume (amount) of one or more polymeric materials.

As used herein, "occlusal" means in a direction toward the outer tips of the patient's teeth or where the upper and lower teeth come together; "facial" or "labial" means in a direction toward the patient's lips or cheeks; and "lingual" means in a direction toward the patient's tongue.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

In a first aspect, the present disclosure provides a method of making an orthodontic article. The method comprises:
  a) providing a photopolymerizable composition;
  b) selectively curing the photopolymerizable composition using actinic radiation to form an article in the shape of an orthodontic article comprising a plurality of layers of at least one photopolymerized polymer; and
  c) moving the article and thereby generating a mass inertial force in the uncured photopolymerizable composition,
wherein the article has a first surface, wherein no more than 75% of the first surface has a slope magnitude greater than 2.5 degrees.

One method of determining slope magnitude includes taking a confocal scanning laser microscopy (CSLM) image of a sample, then analyzing the surface height map H(x,y) of the sample. The height map gives the height of the surface at coordinates (x,y). A suitable method is described in detail in the Examples below.

Optionally, the method further comprises d) subjecting the article to actinic radiation to photopolymerize uncured photopolymerizable composition after step c) and/or e) subjecting the article to heat before, during, and/or after step c). For instance, heating the article at any point may be used to decrease the viscosity of uncured photopolymerizable composition present on the article, as well as removing low viscosity components.

In some embodiments, the photopolymerizable composition is a first composition and the uncured photopolymerizable composition is a second composition including a polymer that is different from the first composition. In such embodiments, the method further comprises (f) removing excess first composition from the article (e.g., by washing with at least one solvent and/or generating a mass inertial force in the first composition; and (g) applying the second composition to the article. Steps f) and g) are performed after step b) and before step c). After step g), the method further optionally comprises h) subjecting the article to actinic radiation to photopolymerize uncured first composition, uncured second composition, or both.

The second composition can also be applied to the article using dip coating, spray coating, vacuum deposition, painting, or brushing. Accordingly, an outer layer of the article is formed of a different composition than the layer directly adjacent to the outer layer. This may be advantageous when the composition of the outer layer imparts at least one desirable property to the article, such as high gloss, scratch resistance, etc., that may not be as necessary for the interior layers of the article.

In some embodiments, a second composition is used that is polymerizable by a method other than photopolymerization (e.g., thermal polymerization), or is already cured but applicable as a liquid. Hence, the second composition may include any of the components described below with respect to suitable photopolymerizable compositions, as well as thermally polymerizable compositions. Thus, another method comprises:

(a) providing a first composition comprising a photopolymerizable composition;
(b) selectively curing the first composition using actinic radiation to form an article in the shape of an orthodontic article including a plurality of layers of at least one photopolymerized polymer;
(c) removing uncured first composition from the article;
(d) applying a second composition comprising a polymerizable composition or a polymer to the article, wherein the first composition is different from the second composition;
(e) moving the article and thereby generating a mass inertial force in the uncured photopolymerizable composition or polymer;
(f) optionally subjecting the article to actinic radiation to photopolymerize uncured photopolymerizable composition; and
(g) optionally subjecting the article to heat before, during, or after step (e).

In some embodiments, the second composition includes at least one of a (meth)acryl component, an epoxy component, a polyalkylene component, a polyalkylene oxide component, a polyester component, a polycarbonate component, a urethane component, a polyamide component, a thiol component, an ene component that is not the (meth)acryl component, or combinations thereof.

Fabricating an Orthodontic Article

A generalized method 100 for creating three-dimensional articles from photopolymerizable compositions is illustrated in FIG. 1. Each step in the method will be discussed in greater detail below. First, in Step 110 the desired photopolymerizable composition is provided and introduced into a reservoir, cartridge, or other suitable container for use by or in an additive manufacturing device. The additive manufacturing device selectively cures the photopolymerizable composition according to a set of computerized design instructions in Step 120. The term "selectively cure" as used herein refers to the location(s) of photopolymerizable composition in the container that is subjected to actinic radiation, to cure selected area(s) of the photopolymerizable composition. In Step 130, Step 110 and/or Step 120 is repeated to form multiple layers to create the article comprising a three-dimensional structure (i.e., an orthodontic article). A mass inertial force is generated in the uncured photopolymerizable composition in Step 140, optionally, the article is subjected to additional curing to polymerize remaining uncured photopolymerizable components in the article in Step 150, and further optionally, the article is subjected to a heat treatment in Step 160. In some embodiments, Step 160 is performed before, during, and/or after Step 150.

Methods of printing a three-dimensional article or object described herein can include forming the article from a plurality of layers of a photopolymerizable composition described herein in a layer-by-layer manner. Further, the layers of a build material composition can be deposited according to an image of the three-dimensional article in a computer readable format. In some or all embodiments, the photopolymerizable composition is deposited according to preselected computer aided design (CAD) parameters (e.g., a data file).

Additionally, it is to be understood that methods of manufacturing a 3D article described herein can include so-called "stereolithography/vat polymerization" 3D printing methods. Other techniques for three-dimensional manufacturing are known, and may be suitably adapted to use in the applications described herein. More generally, three-dimensional fabrication techniques continue to become available. All such techniques may be adapted to use with photopolymerizable compositions described herein, provided they offer compatible fabrication viscosities and resolutions for the specified article properties. Fabrication may be performed using any of the fabrication technologies described herein, either alone or in various combinations, using data representing a three-dimensional object, which may be reformatted or otherwise adapted as necessary for a particular printing or other fabrication technology.

It is entirely possible to form a 3D article from a photopolymerizable composition described herein using vat polymerization (e.g., stereolithography). For example, in some cases, a method of printing a 3D article comprises retaining a photopolymerizable composition described herein in a fluid state in a container and selectively applying energy to the photopolymerizable composition in the container to solidify at least a portion of a fluid layer of the photopolymerizable composition, thereby forming a hardened layer that defines a cross-section of the 3D article. Additionally, a method described herein can further comprise raising or lowering the hardened layer of photopolymerizable composition to provide a new or second fluid layer of unhardened photopolymerizable composition at the surface of the fluid in the container, followed by again selectively applying energy to the photopolymerizable composition in the container to solidify at least a portion of the new or second fluid layer of the photopolymerizable composition to form a second solidified layer that defines a second cross-section of the 3D article. Further, the first and second cross-sections of the 3D article can be bonded or adhered to one another in the z-direction (or build direction corresponding to the direction of raising or lowering recited above) by the application of the energy for solidifying the photopolymerizable composition. Moreover, selectively applying energy to the photopolymerizable composition in the container can comprise applying actinic radiation, such as UV radiation, visible radiation, or e-beam radiation, having a sufficient energy to cure the photopolymerizable composition. A method described herein can also comprise planarizing a new layer of fluid photopolymerizable composition provided by raising or lowering an elevator platform. Such planarization can be carried out, in some cases, by utilizing a wiper or roller or a recoater. Planarization corrects the thickness of one or more layers prior to curing the material by evening the dispensed material to remove excess material and create a uniformly smooth exposed or flat up-facing surface on the support platform of the printer.

It is further to be understood that the foregoing process can be repeated a selected number of times to provide the 3D article. For example, in some cases, this process can be repeated "n" number of times. Further, it is to be understood that one or more steps of a method described herein, such as a step of selectively applying energy to a layer of photopolymerizable composition, can be carried out according to an image of the 3D article in a computer-readable format. Suitable stereolithography printers include the Viper Pro SLA, available from 3D Systems, Rock Hill, SC and the Asiga PICO PLUS 39, available from Asiga USA, Anaheim Hills, CA.

Figure 2:
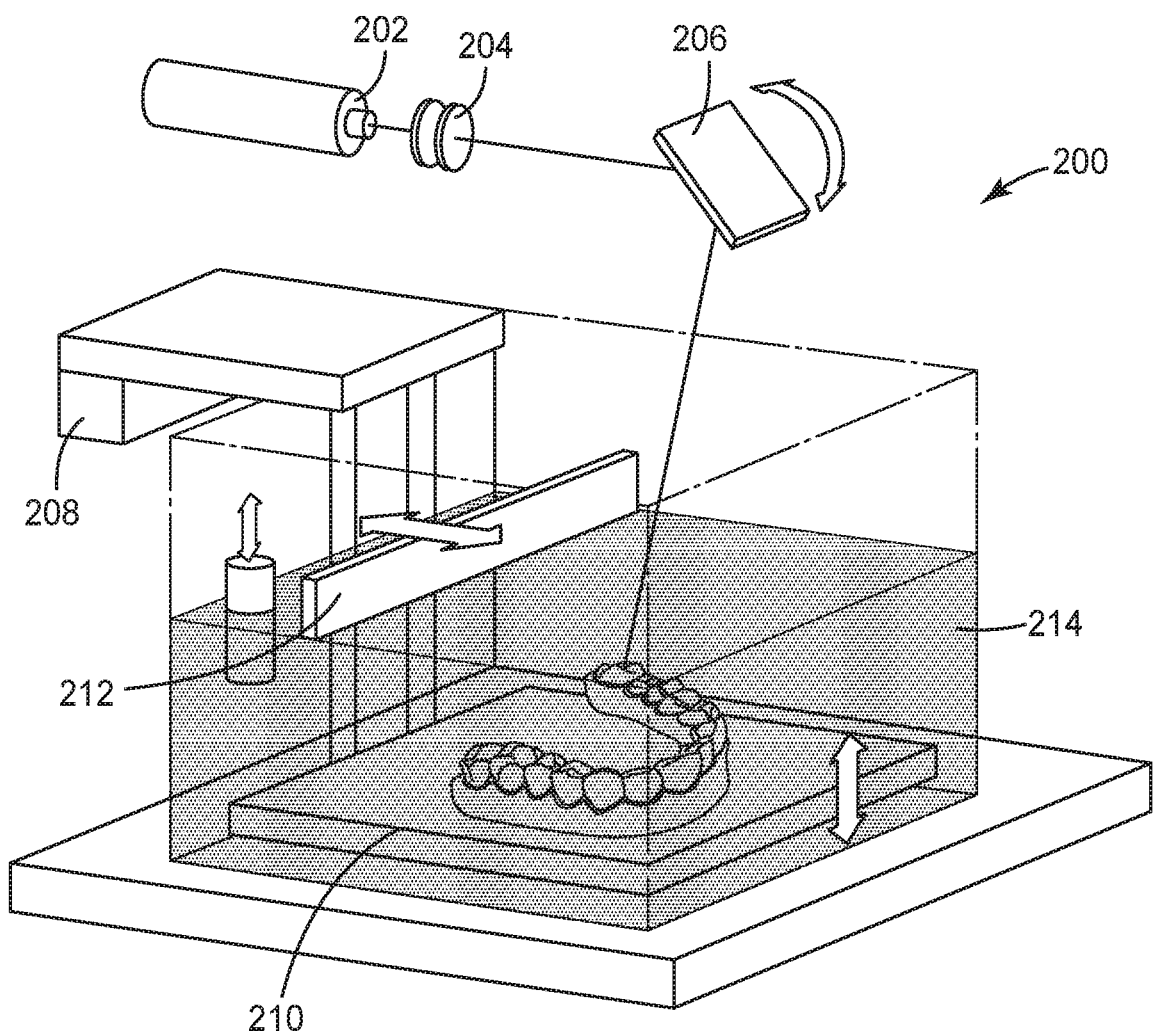
FIG. 2 is a generalized schematic of a stereolithography apparatus.

FIG. 2 shows an exemplary stereolithography apparatus ("SLA") that may be used with the photopolymerizable compositions and methods described herein. In general, the SLA 200 may include a laser 202, optics 204, a steering lens 206, an elevator 208, a platform 210, and a straight edge 212, within a vat 214 filled with the photopolymerizable composition. In operation, the laser 202 is steered across a surface of the photopolymerizable composition to cure a cross-section of the photopolymerizable composition, after which the elevator 208 slightly lowers the platform 210 and another cross section is cured. The straight edge 212 may sweep the surface of the cured composition between layers to smooth and normalize the surface prior to addition of a new layer. In other embodiments, the vat 214 may be slowly filled with liquid resin while an article is drawn, layer by layer, onto the top surface of the photopolymerizable composition.

A related technology, vat polymerization with Digital Light Processing ("DLP"), also employs a container of curable polymer (e.g., photopolymerizable composition). However, in a DLP based system, a two-dimensional cross section is projected onto the curable material to cure the desired section of an entire plane transverse to the projected beam at one time. All such curable polymer systems as may be adapted to use with the photopolymerizable compositions described herein are intended to fall within the scope of the term "vat polymerization system" as used herein. In certain embodiments, an apparatus adapted to be used in a continuous mode may be employed, such as an apparatus commercially available from Carbon 3D, Inc. (Redwood City, CA), for instance as described in U.S. Pat. Nos. 9,205,601 and 9,360,757 (both to DeSimone et al.).

Figure 5:
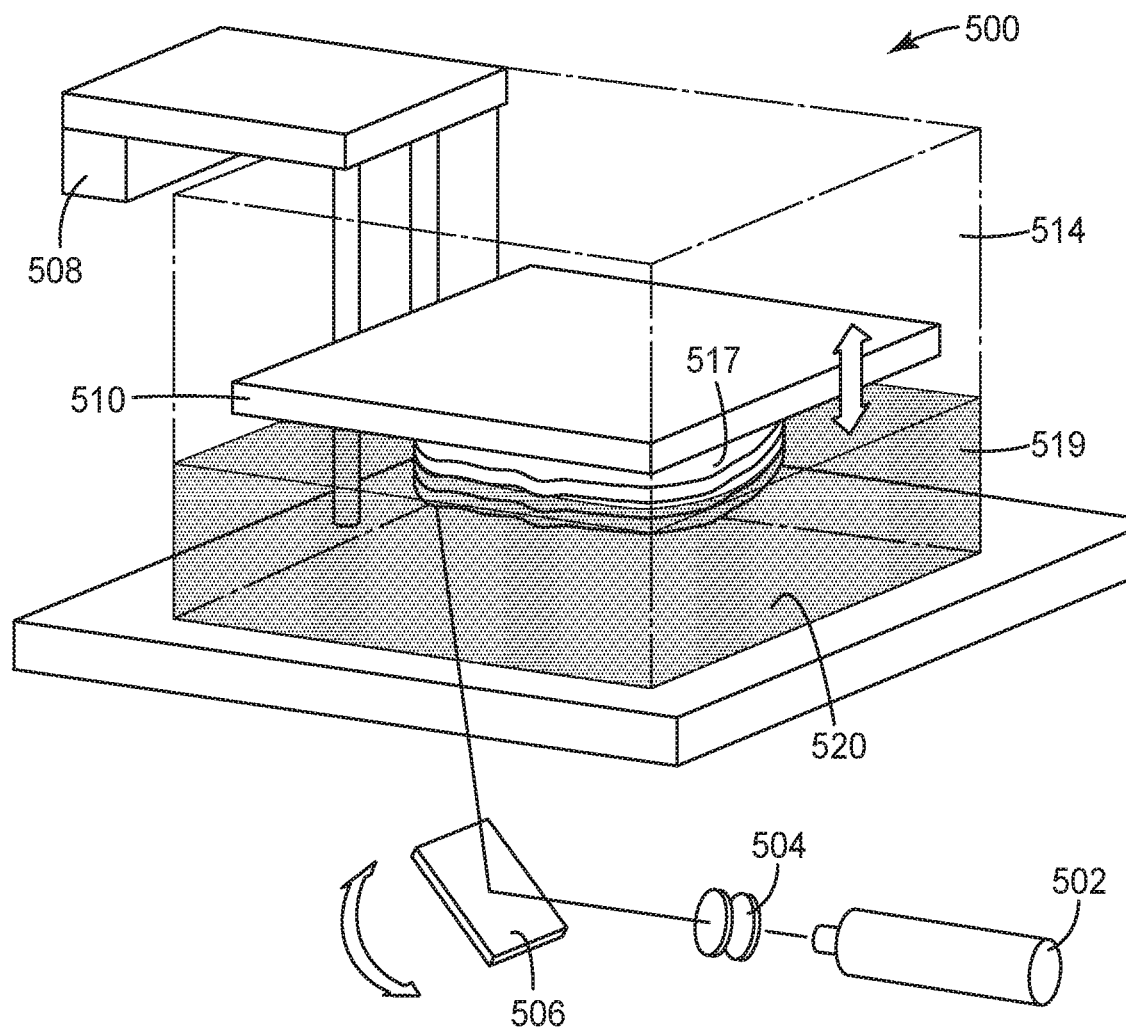
FIG. 5 is a generalized schematic of an apparatus in which radiation is directed through a container.

Referring to FIG. 5, a general schematic is provided of another SLA apparatus that may be used with photopolymerizable compositions and methods described herein. In general, the apparatus 500 may include a laser 502, optics 504, a steering lens 506, an elevator 508, and a platform 510, within a vat 514 filled with the photopolymerizable composition 519. In operation, the laser 502 is steered through a wall 520 (e.g., the floor) of the vat 514 and into the photopolymerizable composition to cure a cross-section of the photopolymerizable composition 519 to form an article 517, after which the elevator 508 slightly raises the platform 510 and another cross section is cured.

More generally, the photopolymerizable composition is typically cured using actinic radiation, such as UV radiation, e-beam radiation, visible radiation, or any combination thereof. The skilled practitioner can select a suitable radiation source and range of wavelengths for a particular application without undue experimentation.

In certain embodiments, the curing of layers of a photopolymerizable composition can leave evidence of the computer-readable data file of the image of the 3D article. For instance, a plurality of voxels in the layers of the article may be visible either to a human observer or under a microscope, evidencing the volume of polymeric material cured in a discrete three-dimensional space.

It is expected in certain embodiments of the present disclosure that the formed article obtained in Step 120 will shrink (i.e., reduce in volume) such that the dimensions of the article after (optional) Step 150 will be smaller than expected. For example, a cured article may shrink less than 5% in volume, less than 4%, less than 3%, less than 2%, or even less than 1% in volume, which is contrast to other compositions that provide articles that shrink about 6-8% in volume upon optional post curing. The amount of volume percent shrinkage will not typically result in a significant distortion in the shape of the final object. It is particularly contemplated, therefore, that dimensions in the digital representation of the eventual cured article may be scaled according to a global scale factor to compensate for this shrinkage. For example, in some embodiments, at least a portion of the digital article representation can be at least 101% of the desired size of the printed appliance, in some embodiments at least 102%, in some embodiments at least 104%, in some embodiments, at least 105%, and in some embodiments, at least 110%.

A global scale factor may be calculated for any given photopolymerizable composition formulation by creating a calibration part according to Steps 110 and 120 above. The dimensions of the calibration article can be measured prior to post curing.

After the 3D article has been formed, it is typically removed from the additive manufacturing apparatus and at least a portion of the uncured photopolymerizable composition is removed from the cured, solid state article (e.g., green body). Conventional methods of removing uncured photopolymerizable composition include rinsing, (e.g., an ultrasonic, or bubbling, or spray rinse in a solvent, which would dissolve a portion of the uncured photopolymerizable composition but not the solid state article. Suitable solvents include for instance, propylene carbonate, isopropanol, methanol, di(ethylene glycol) ethyl ether, tripropylene glycol monomethyl ether, diethylene glycol monobutyl ether, a blend of dipropylene glycol monomethyl ether with [2-(2-methoxymethylethoxy)methylethoxy]propanol, or any combination thereof. At this stage, the three-dimensional article typically has sufficient green strength for handling in the remaining optional steps of method 100.

In general, the three-dimensional article formed by initial additive manufacturing in Step 120, as discussed above, is not fully cured, by which is meant that not all of the photopolymerizable material in the composition has polymerized even after rinsing. Some uncured photopolymerizable material is typically removed from the surface of the printed article during a cleaning process. The article surface, as well as the bulk article itself, typically still retains uncured photopolymerizable material, suggesting further cure. Removing residual uncured photopolymerizable composition is particularly useful when the article is going to subsequently be post cured, to minimize uncured residual photopolymerizable composition from undesirably curing directly onto the article, for instance pooling in a concave shaped portion of the article.

Further curing can be accomplished by further irradiating with actinic radiation, heating, or both. Exposure to actinic radiation can be accomplished with any convenient radiation source, generally UV radiation, visible radiation, and/or e-beam radiation, for a time ranging from about 10 to over 60 minutes. Heating is generally carried out at a temperature in the range of about 75-150° C., for a time ranging from about 10 to over 60 minutes in an inert atmosphere. So called post cure ovens, which combine UV radiation and thermal energy, are particularly well suited for use in the post cure processes of Step 150 and/or Step 160. In general, post curing improves the mechanical properties and stability of the three-dimensional article relative to the same three-dimensional article that is not post cured.

Additionally, post processing of an article may include subjecting the article to vacuum, for a time of about 30 minutes to 24 hours, such as about 2 hours, either at ambient temperature or at an elevated temperature, e.g., in a vacuum oven set at a temperature of 50° C. or greater, 60° C., 80° C., 100° C., or even 120° C. or greater, such as up to 150° C. Vacuum treatment of an article is usually performed following any post curing processes, and may assist in decreasing the total amount of extractable components in the final article.

One particularly attractive opportunity for 3D printing is in the direct creation of orthodontic (e.g., clear tray) aligners. These aligners, also known as polymeric or shell appliances, are provided in a series and are intended to be worn in succession, over a period of months, in order to gradually move the teeth in incremental steps towards a desired target arrangement. Some types of orthodontic aligners have a row of tooth-shaped receptacles for receiving each tooth of the patient's dental arch, and the receptacles are oriented in slightly different positions from one appliance to the next in order to incrementally urge each tooth toward its desired target position by virtue of the resilient properties of the polymeric material. A variety of methods have been proposed in the past for manufacturing orthodontic aligners and other resilient appliances. Typically, positive dental arch models are fabricated for each dental arch using additive manufacturing methods such as stereolithography described above. Subsequently, a sheet of polymeric material is placed over each of the arch models and formed under heat, pressure and/or vacuum to conform to the model teeth of each model arch. The formed sheet is cleaned and trimmed as needed and the resulting arch-shaped appliance is shipped along with the desired number of other appliances to the treating professional.

Other orthodontic articles that may be prepared using additive manufacturing include retainers and splints. An aligner or other resilient appliance created directly by 3D printing would eliminate the need to print a mold of the dental arch and further thermoform the appliance. It also would allow new aligner designs and give more degrees of freedom in the treatment plan. Exemplary methods of direct printing orthodontic aligners and other resilient orthodontic apparatuses are set forth in PCT Publication Nos. WO2016/109660 (Raby et al.), WO2016/148960 (Cinader et al.), and WO2016/149007 (Oda et al.) as well as US Publication Nos. US2011/0091832 (Kim, et al.) US2013/0095446 (Kitching), WO2013/134031 (Lai et al.), and WO2016/148961 (Cinader et al.).

Figure 11A:
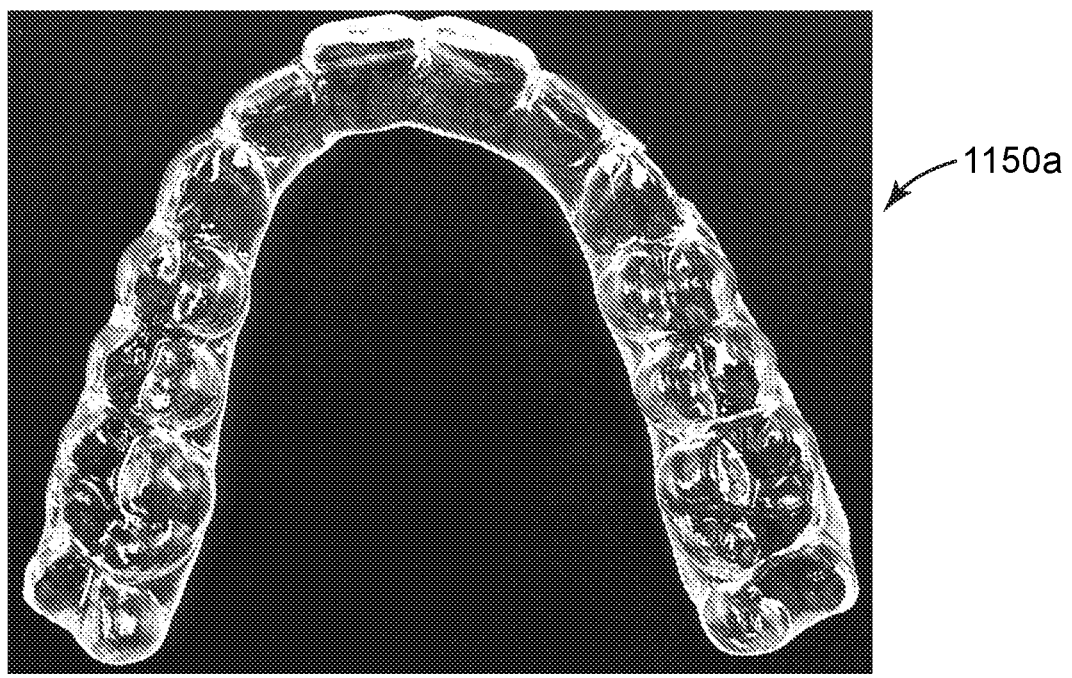
FIG. 11A is a photograph of an exemplary orthodontic article, prepared according to Example 3.
Figure 11B:
FIG. 11B is a photograph of a comparative orthodontic article, prepared according to Comparative Example 4.
Figure 12A:
FIG. 12A is a photograph of another exemplary orthodontic article, prepared according to Example 16.
Figure 12B:
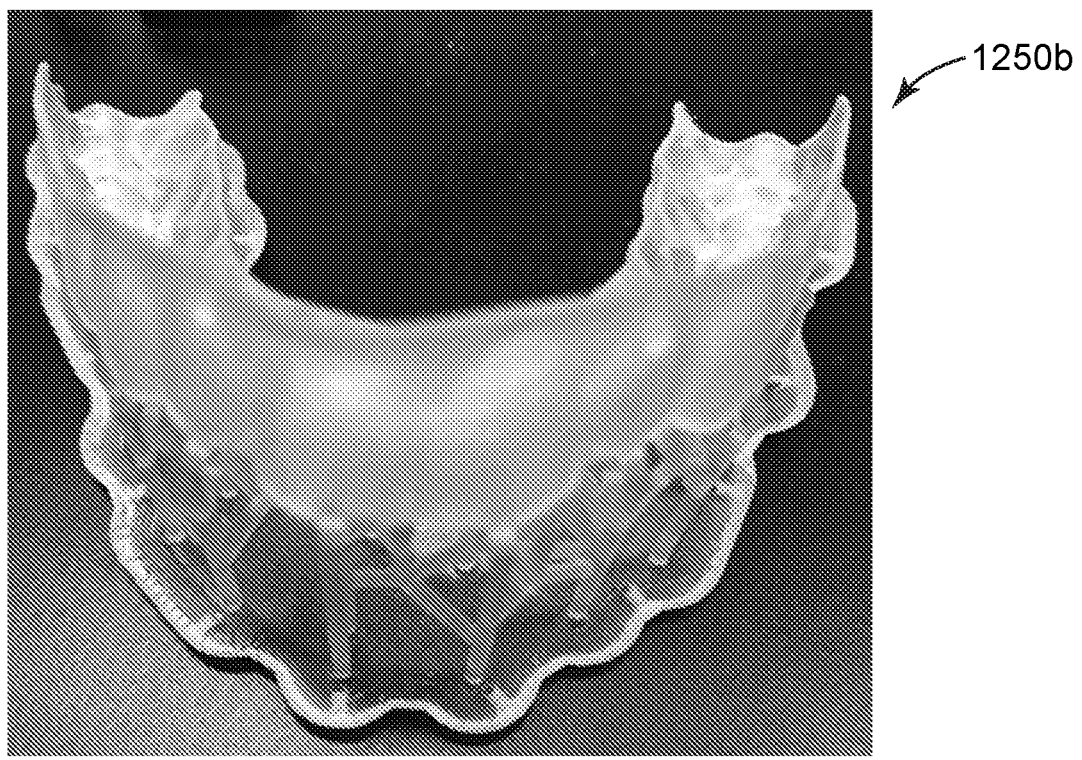
FIG. 12B is a photograph of another comparative orthodontic article, prepared according to Comparative Example 17.
Figure 13A:
FIG. 13A is a photograph of a further exemplary orthodontic article, prepared according to Example 9.
Figure 13B:
FIG. 13B is a photograph of a further comparative orthodontic article, prepared according to Comparative Example 8.

A disadvantage to cleaning a solid state article (e.g., green body) with a solvent or multiple solvents in order to remove residual resins, however, is that the resulting article tends to have a hazy appearance. For instance, each of FIGS. 11B, 12B, and 13B show orthodontic aligners that were formed using additive manufacturing (e.g., polymerization of a photopolymerizable composition) followed by solvent washing of the green body, then subjection to postcuring and a heat treatment. It would be desirable to provide orthodontic articles that have a less hazy, more clear appearance. In particular, it would be advantageous to produce an orthodontic article that has at least a facial surface having a low haze appearance, as typically a surface in a direction toward the patient's lips is most likely to be visible to other people when the orthodontic article is being worn by a patient. It may also be beneficial to provide at least a second surface (e.g., occlusal and/or lingual surface) that has a low haze appearance.

Methods according to the present disclosure include forming a coating layer and typically removing uncured photopolymerizable composition from an article (e.g., following preparation by additive manufacturing), by moving the article and thereby generating a mass inertial force in the uncured photopolymerizable composition (e.g., Step 140 of FIG. 1). Some of the remaining adhering uncured photopolymerizable composition is caused to separate from the article in consequence of an acceleration force or mass inertial force acting on the adherent excess material. The acceleration force or mass inertial force is induced by moving, for example rotating, the article. The wording "caused to separate from the article" in that regard covers that portions of the adhering uncured photopolymerizable composition that separate out of the material that covers the overall surface of the article. The mass inertial force acting on the article forms a coating layer of uncured photopolymerizable composition on the article, the coating layer having a thickness of 20 micrometers or greater (e.g., 25, 30, 35, 40, 45, or 50 micrometers or greater). The coating layer typically has a thickness of 150 micrometers or less. The coating layer may be post-cured and therefore forms a (e.g., integral) part of the article, e.g., an outer layer of the article.

At least one of the plurality of layers typically has a thickness of no greater than 125 micrometers. Optionally, each of the plurality of layers of the additive manufactured article, except for an outer layer, has a thickness of no greater than 130 micrometers, 120 micrometers, 110 micrometers, 100 micrometers, 90 micrometers, 80 micrometers, 70 micrometers, 60 micrometers, 50 micrometers, 40 micrometers, or 30 micrometers.

It has been discovered that the formation of a cured coating layer from uncured photopolymerizable composition present on an (e.g., additive manufactured) article using mass inertial force can provide an article having a low surface height variation (e.g., as determined by analyzing the slope magnitude of the surface). Preferably, the article includes at least one surface with no more than 75% of the surface having a slope magnitude greater than 2.5 degrees. The smooth surface tends to impart an appearance to the surface that is low in haze and high in clarity and gloss to the human eye. For instance, FIG. 11A shows an orthodontic aligner 1150a formed using additive manufacturing (e.g., polymerization of a photopolymerizable composition including both a (meth)acryl component and a polycarbonate urethane methacrylate component) followed by mass inertial force (i.e., centrifugation) to form a coating layer on a surface of the article and to (e.g., typically) remove some of the uncured photopolymerizable composition, then subjection to postcuring and a heat treatment. In contrast to the article 1150a that was centrifuged, the article 1150b of FIG. 11B is visibly hazy. The article 1150b was prepared according to Comparative Example 4 from the same photopolymerizable composition but then washed to remove uncured photopolymerizable composition, then subjected to postcuring and a heat treatment. Hence, a comparison of the haze appearance of the article 1150a of FIG. 11A to the article 1150b of FIG. 11B, for example, illustrates a significant difference between the use of mass inertial force (FIG. 11A) and the use of solvent washing (FIG. 11B) to remove at least some uncured photopolymerizable composition from a surface of the article.

Figure 12C:
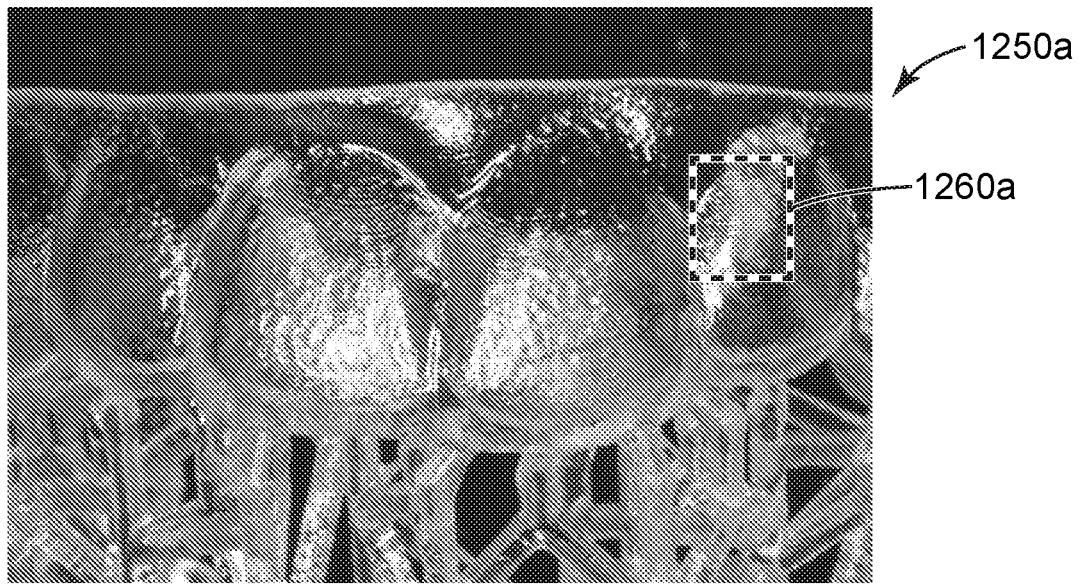
FIG. 12C is another photograph of the exemplary orthodontic article of FIG. 12A.
Figure 12D:
FIG. 12D is another photograph of the comparative orthodontic article of FIG. 12B.

Without wishing to be bound by theory, it is not believed that the exact formulation of the photopolymerizable composition is particularly limiting in methods according to the present disclosure. For instance, FIG. 12A is a photograph of an exemplary orthodontic article 1250a made from a commercially available photopolymerizable composition obtained under the trade designation "DENTAL LT CLEAR" from formlabs (Sommerville, MA), prepared according to Example 16. The composition is reported to include a methacrylic oligomer and a glycol methacrylate. Similar to the orthodontic articles of FIGS. 11A and 11B, the orthodontic article 1250a of FIG. 12A has a lower haze to its appearance, while the orthodontic article 1250b of FIG. 12B, prepared according to Comparative Example 17, has a hazy appearance. After formation using additive manufacturing, the exemplary article 1250a had a coating layer formed and uncured photopolymerizable composition removed using mass inertial force, whereas the comparative article 1250b had uncured photopolymerizable composition removed using solvent washing. For a closer view of a portion of each of the articles 1250a and 1250b, FIGS. 12C and 12D, respectively, are provided. Interestingly, despite the visibility of lines 1260a imparted during the additive manufacturing process, the article 1250a in FIG. 12C still has a low haze appearance.

Use of just any selected mass inertial force, however, will not necessarily result in an article having a surface with no more than 75% of the surface having a slope magnitude greater than 2.5 degrees, such as no more than no more than 60% or no more than 45%. The maximum amount of the surface having a slope magnitude greater than 2.5 degrees will vary according to the requirements of a particular article. Without wishing to be bound be theory, it is believed that the coating layer must have a certain minimum thickness to smooth out surface height variation that was imparted by the additive manufacturing method, to provide the desired low haze appearance to the final article. For example, while a comparison of the haze appearance of the article 1350a of FIG. 13A and the article 1350b of FIG. 13B shows a significant difference between the use of mass inertial force (FIG. 13A) and the use of solvent washing (FIG. 13B) to remove at least some uncured photopolymerizable composition from a surface of the article, a comparison of the haze appearance of the articles of FIGS. 11A and 13A shows that the article 1350a of FIG. 13A has a noticeably greater haze appearance than the article 1150a of FIG. 11A. The article 1350a of FIG. 13A was prepared according to Example 9 using a low viscosity photopolymerizable composition (including a urethane component, a polyalkylene oxide component, and (meth)acrylate components) and subjected to a high enough mass inertial force to result in a coating layer that was measured to be only about half as thick as the coating layer of the article 1150a of FIG. 11A. For certain applications, the extent of haziness visible for the article of FIG. 13A would be acceptable, whereas for other applications, it would be considered too hazy, and the maximum amount of the surface having a slope magnitude greater than 2.5 degrees can be selected accordingly, to either include or exclude a particular level of haziness. Surface height measurements of the articles of FIGS. 11, 12, and 13 are discussed further below in the Examples section. Accordingly, removal of too much of the uncured photopolymerizable composition is undesirable because it does not result in the formation of a sufficiently thick coating layer on a surface of the article to generate a low surface height variation (e.g., in certain select embodiments, no more than 45% of the surface having a slope magnitude greater than 2.5 degrees) and provide a desired low haze appearance of that surface.

Figure 14A:
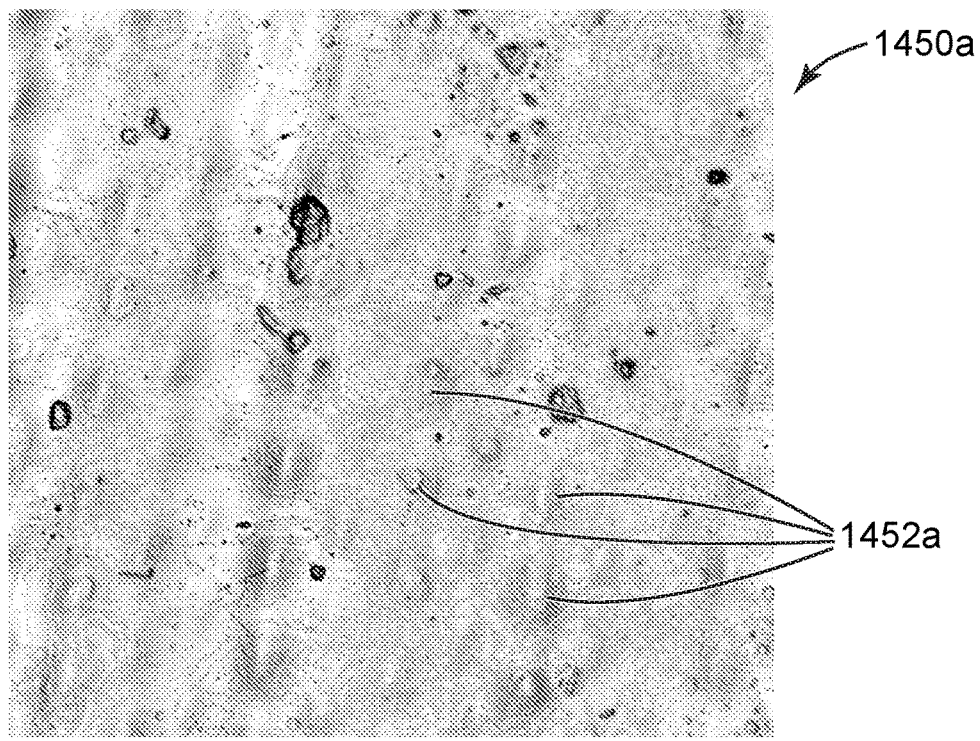
FIG. 14A is a confocal scanning laser microscopy (CSLM) laser image of an exemplary orthodontic article, prepared according to Example 9.
Figure 14B:
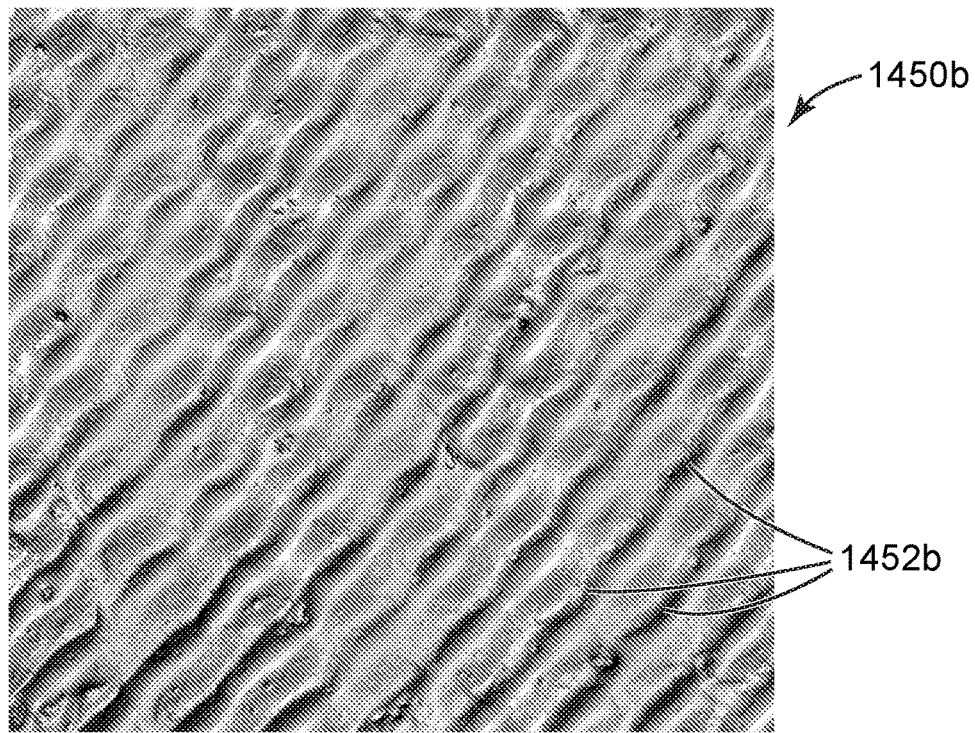
FIG. 14B is a CSLM laser image of another comparative orthodontic article, prepared according to Comparative Example 8.
Figure 15A:
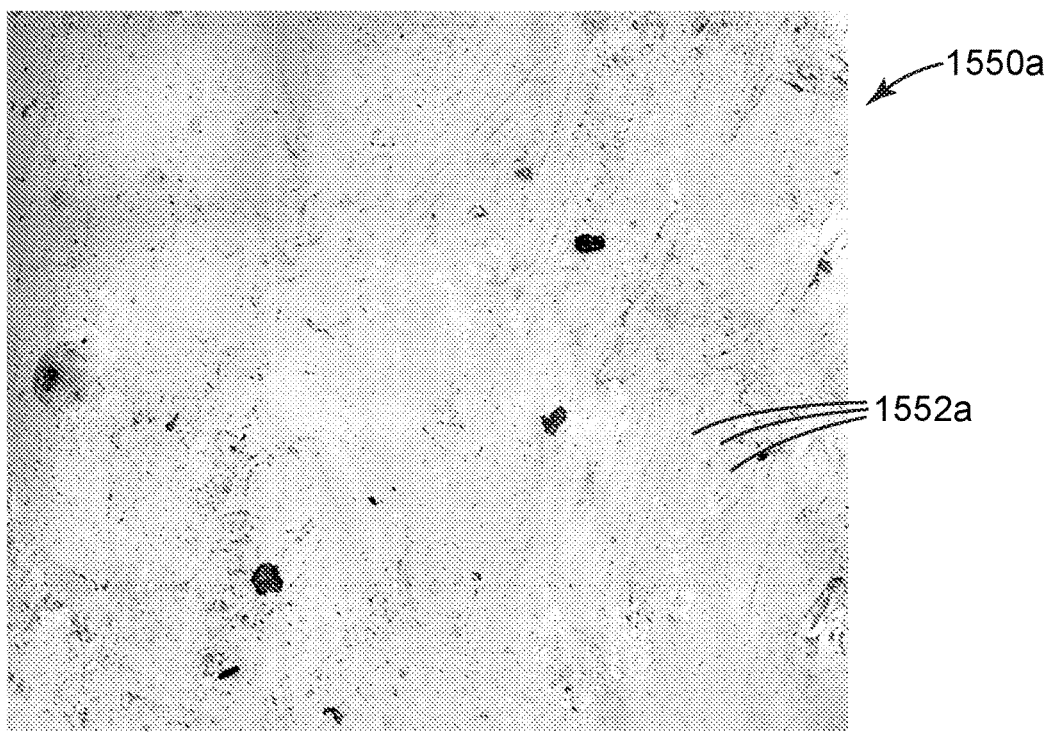
FIG. 15A is a CSLM laser image of a first surface of the exemplary orthodontic article of Example 3.
Figure 15B:
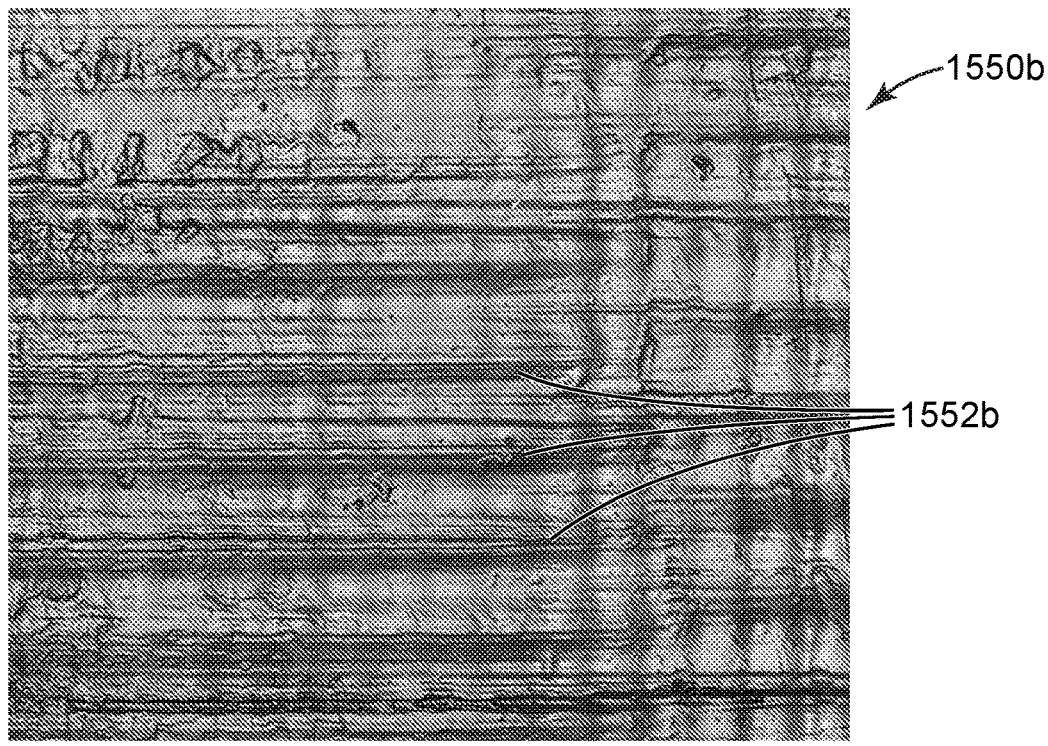
FIG. 15B is a CSLM laser image of a first surface of the comparative orthodontic article of Comparative Example 4.

Surfaces of an article can be imaged, for instance using confocal scanning laser microscopy (CSLM) to view surface height appearances. For instance, FIGS. 14A and 14B are CSLM laser images of the orthodontic article 1450a of Example 9 and the orthodontic article 1450b of Comparative Example 8, respectively. The solvent washed orthodontic article 1450b has a regular scalloped pattern 1452b visible across its surface, whereas the centrifuged orthodontic article 1450a has a more faint pattern including linear series of circular/elliptical shapes 1452a visible across its surface. The orthodontic article 1450a appears to have had more uncured photopolymerizable material removed from the article following additive manufacturing of the article than the article of Example 3 shown in FIG. 15A, leaving enough surface height variation to impart some haze to the appearance of the article 1450a. FIGS. 15A and 15B are CSLM laser images of the orthodontic article 1550a of Example 3 and the orthodontic article 1550b of Comparative Example 4, respectively. The orthodontic article 1550a has a plurality of faint lines 1552a distributed on its surface, whereas the orthodontic article 1550b has a series of substantially parallel dark lines 1552b across its surface. It appears that the mass inertial force on the uncured photopolymerizable composition in the exemplary article 1550a resulted in significantly smoothing uncured photopolymerizable composition over the surface height variation of the article following additive manufacturing, whereas the solvent washing of the comparative article 1550b revealed the surface height variation to view.

Figure 15C:
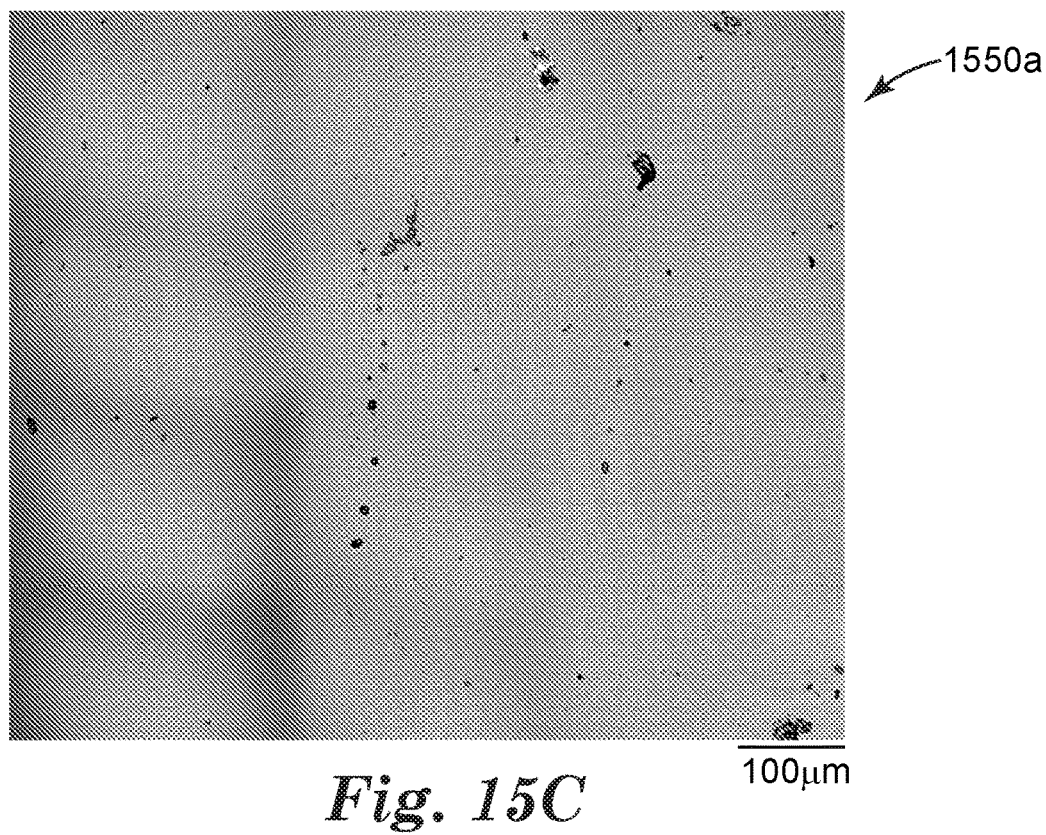
FIG. 15C is a CSLM laser image of a second surface of the exemplary orthodontic article of Example 3.
Figure 15D:
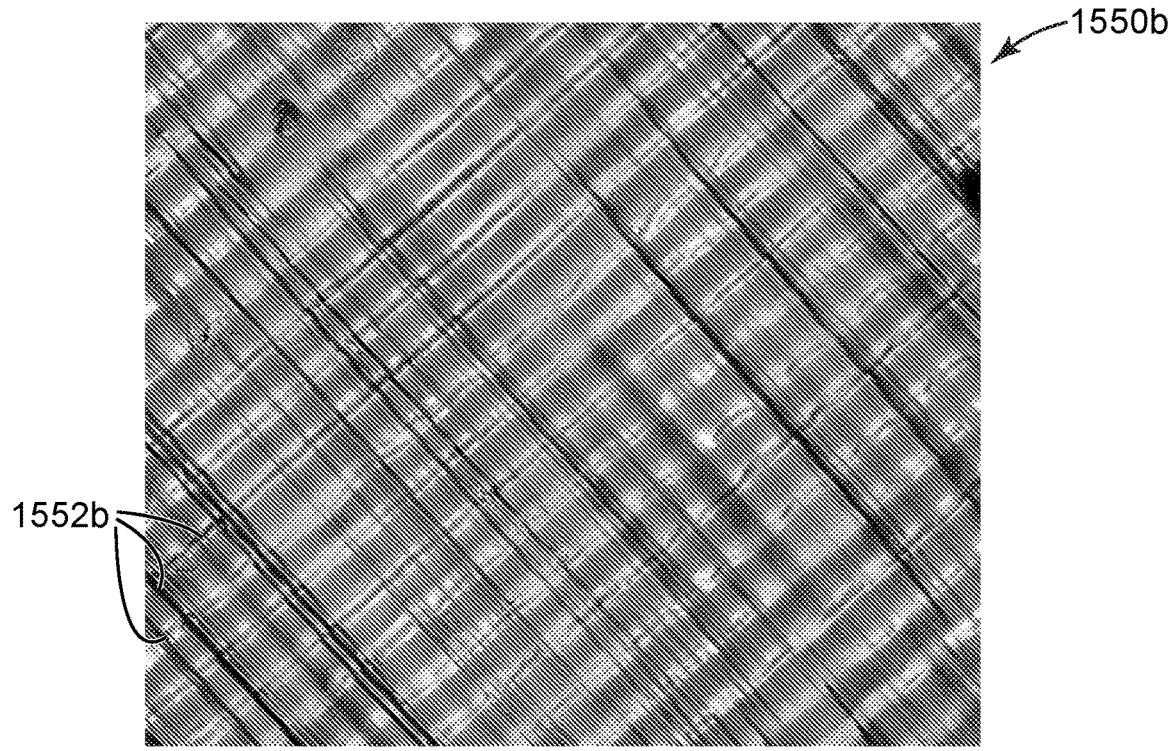
FIG. 15D is a CSLM laser image of a second surface of a comparative orthodontic article of Comparative Example 4.

The "first" surface can refer to any surface of the article. Often, the (e.g., first) surface having a low surface height variation is an outer surface. In some embodiments, though, the first surface is an inner surface. For an orthodontic article, an inner surface refers to a surface configured to contact a patient's teeth and/or gums, including a cavity to retain a tooth. In some embodiments, an outer surface refers to a surface that is generally opposite the inner surface. Preferably, the first surface is a facial or labial side surface. An advantage of the first surface being a facial side surface is that a facial side surface is more likely to be visible to someone looking at a patient wearing the article. FIGS. 15C and 15D show that the methods can also work on an inner surface of an article. For instance, the CSLM laser image of FIG. 15A is of an outer surface of the orthodontic article 1550a of Example 3 and FIG. 15C is a CSLM laser image of an opposing, inner surface of the same orthodontic article 1550a. Similar to the outer surface, the inner surface of the exemplary orthodontic article 1550a appears substantially smooth. In contrast to the inner surface of the orthodontic article 1550a, the inner surface of the orthodontic article 1550b of Comparative Example 4 includes a plurality of grid lines 1552b (e.g., which may correspond to a grid of voxels formed during additive manufacturing of the article).

Figure 16:
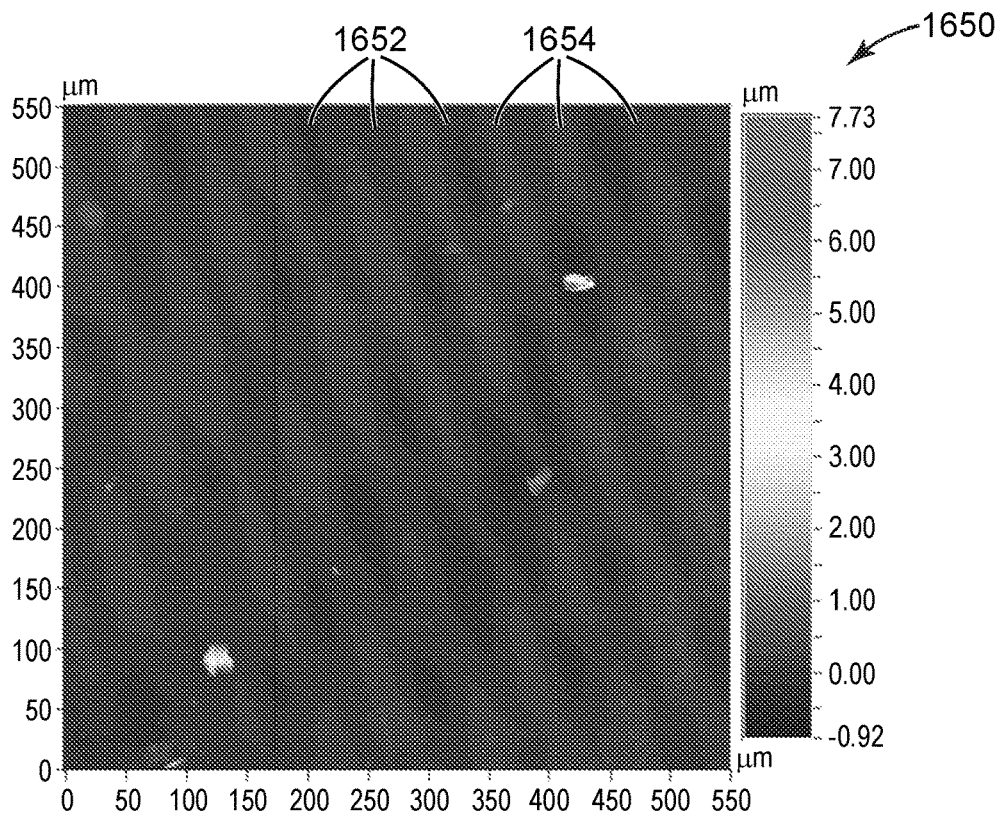
FIG. 16 is a CSLM height image of the exemplary orthodontic article of Example 3.
Figure 17A:
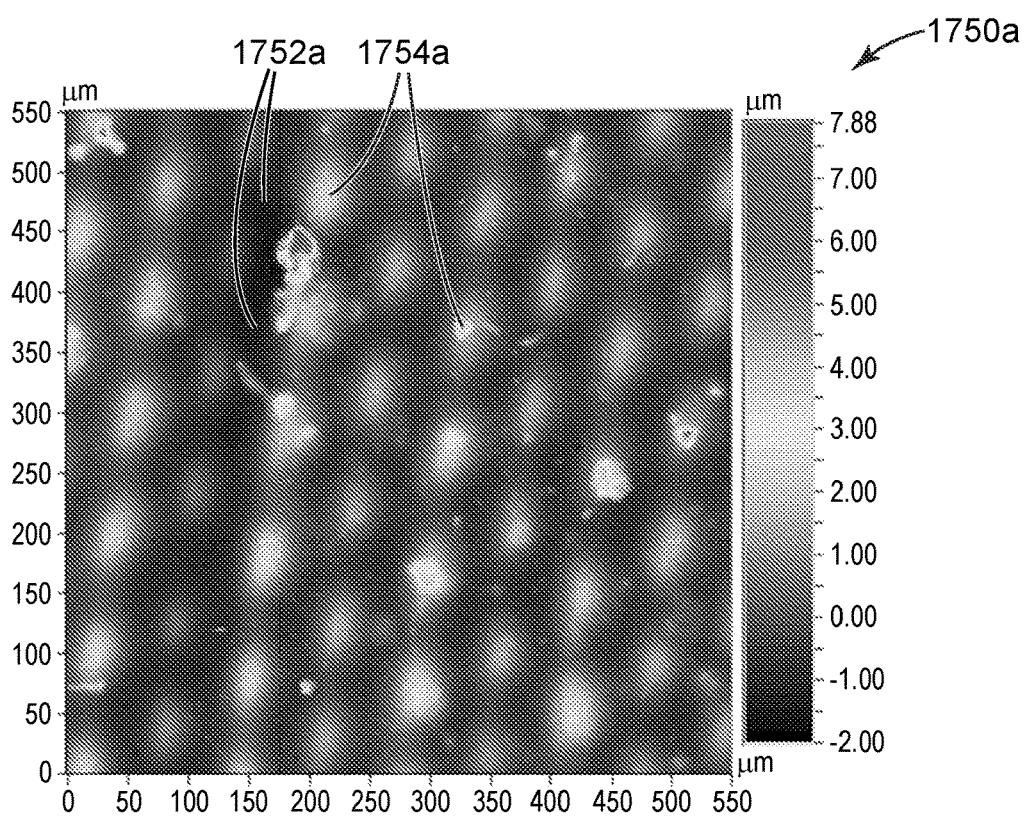
FIG. 17A is an CSLM height image of the exemplary orthodontic article of Example 9.
Figure 17B:
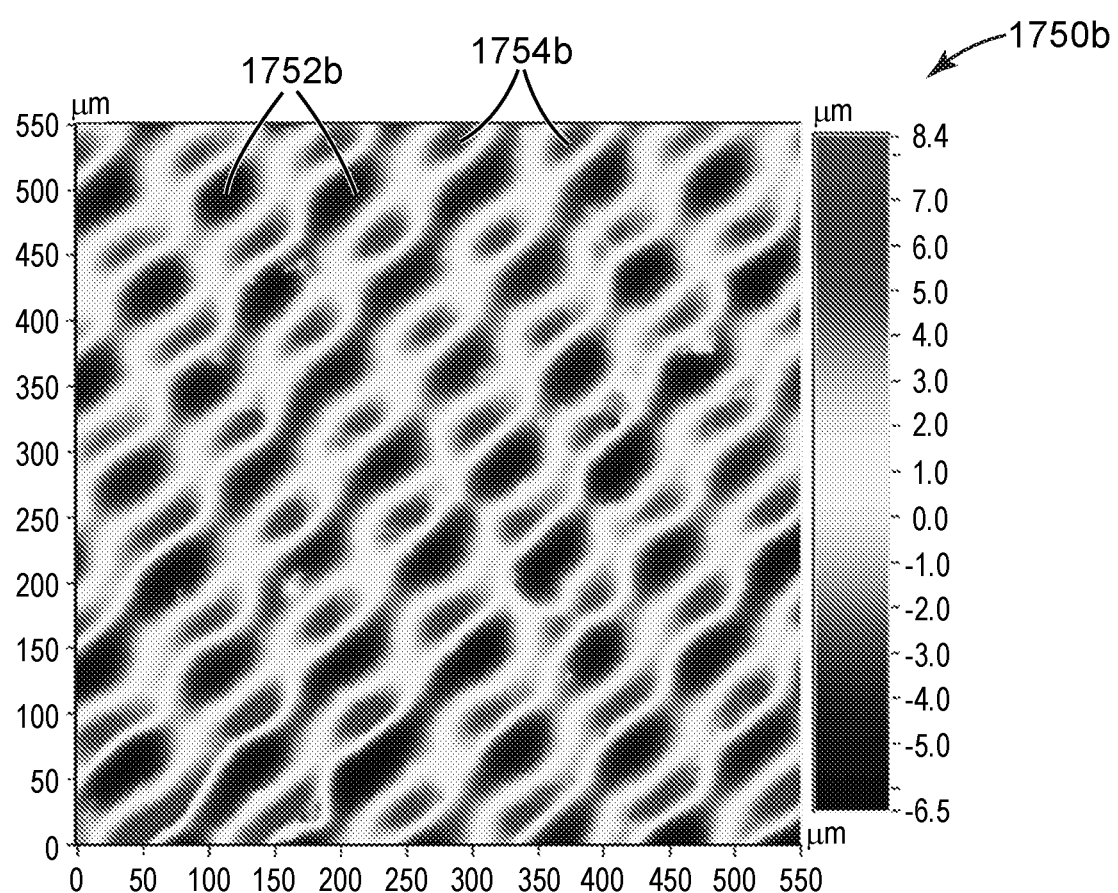
FIG. 17B is an CSLM height image of the comparative orthodontic article of Comparative Example 8.

Referring to FIG. 16, a CSLM height image is provided of the exemplary orthodontic article 1650 of Example 3. The majority of the image shows a height variation of less than about 2 micrometers, between generally scalloped lines 1652 and the areas 1654 between the lines 1652. In contrast, referring to FIGS. 17A and 17B, the CSLM height images show the exemplary orthodontic article 1750a of Example 9 and the comparative orthodontic article 1750b of Comparative Example 8. The solvent washed orthodontic article 1750b shows a height variation of about 13 micrometers, between the highest surface areas (e.g., protrusions) 1754b and the lowest areas 1752b between the highest areas 1754b, whereas the centrifuged orthodontic article 1750a shows a height variation of about 6 micrometers, between the highest surface areas (e.g., protrusions) 1754a and the lowest areas 1752a between the highest areas 1754a. The orthodontic article 1750a appears to have had more uncured photopolymerizable material removed from the article following additive manufacturing of the orthodontic article 1750a than removed from the article shown in FIG. 16, resulting in the height variation of about 6 micrometers (instead of about 2 micrometers for the exemplary orthodontic article 1650).

Typically, the mass inertial force employed to form a coating layer and to remove a portion of the uncured photopolymerizable composition from an article provides a G-force of 2 G or more, such as up to 4,000 G. In some embodiments, the mass inertial force provides a G-force of 5 G or more, 10 G, 15 G, 20 G, 40 G, 60 G, 80 G, 100 G, 150 G, 200 G, 300 G, 400 G, 500 G, 600 G, 700 G, 800 G, 900 G, or 1,000 G or more; and 4,000 G or less, 3,750 G, 3,500 G, 3,250 G, 3,000 G, 2,750 G, 2,500 G, 2,250 G, 2,000 G, 1,750 G, 1,500 G, or 1,250 G or less. The mass inertial force can be determined by the following formula:

$$a = (2 * \pi * n)^2 * r$$

In the above formula, a is the mass inertial force in units of meters (m) per square seconds (s$^2$), n is the rotation speed in units of rotations per second (rps), and r is the radius of a point or area of the article positioned farthest away from the rotation axis the article in units of millimeters (mm). The G-force can be determined by the following formula:

$$G = \frac{a}{9.81 \ m/s^2}$$

The skilled person will recognize that the mass inertial force required may be lower for lower viscosity materials and higher for higher viscosity materials. The mass inertial force can typically be adjusted by adjusting the rotation speed. For example, the radius is typically determined by the size of the object and the configuration of the post-processing device, so that the mass inertial force can be adjusted by the rotation speed at which the object is moved. Preferably the movement is performed with the article (including the uncured photopolymerizable composition) being surrounded by air (in particular ambient air). This means that the excess uncured photopolymerizable composition is in direct contact with air.

The source of the mass inertial force is not particularly limited, but may be generated using a centrifuge, a shaker, or a mixer that spins along one or more axes. Often, the mass inertial force is generated using a centrifuge. In some embodiments, the moving of the object is a rotation or spinning of the object. Accordingly, the mass inertial force may be generated by a centrifugal force. One suitable mixer that spins along more than one axis is a dual asymmetric centrifugal mixer, such as the DAC 400 FVZ available from Flacktek, Landrum, SC A dual asymmetric centrifugal mixer provides simultaneous dual axis spinning that automatically reorients the article during spinning, which tends to pull uncured composition out of concave features of the article in a short period of time (e.g., 20 seconds or less, 15 seconds or less, or 10 seconds or less).

In select embodiments, the rotation of the article is performed about at least a first rotation axis and a second rotation axis, and may comprise multiple revolutions. Often, the rotation about each rotation axis is performed for a time period of at least 5 seconds, for such as between κ seconds and 15 seconds, 5 seconds and 30 seconds, 5 seconds and 60 seconds, or 5 seconds and 300 seconds. The first rotation axis and the second rotation axis have different orientations. The rotation of the article may be performed about a plurality of rotation axes or a rotation axis which can continuously incline in one, two, or three dimensions, which may be achieved by a gimbal or Cardan suspension. The rotation of the article about more than one rotation axis (e.g., two rotation axes) are generally performed at the same rotation speed. In some embodiments, a first orientation of the first rotation axis and a different second orientation of the second rotation axis are adjustable or adjusted. In some instances, rotations about each axis are conducted sequentially, in others, these rotations occur simultaneously.

In one embodiment, a centrifuge comprises a motor and a spindle that is drivable or driven by the motor. The spindle is provided for retaining the article thereon. In a further embodiment, a centrifuge comprises a motor drivable or motor driven rotor at which one or more holders are suspended. Preferably the holders are pivotably suspended at the rotor so that during a rotation of the rotor the holder(s) pivot radially outwardly in consequence of a centrifugal force. The holders are typically provided for receiving an object for centrifuging. Further, a receptacle may be provided for positioning and retaining the object therein. The receptacle may be further retainable and/or receivable within the holder.

In an embodiment, the shaker comprises a motor and a converter for converting a rotation of the rotor in a movement along a non-full-circular path. The non-full-circular path may be a linear or partial circular movement (for example, over less than 360 degrees). Thus, the shaker may move the article between two extreme positions. Upon approaching and leaving the extreme positions the article (and therefore the excess uncured photopolymerizable composition) is exposed to mass inertial forces due to the deceleration and acceleration, respectively. A similar effect can be reached by movement on alternative paths. Such alternative paths may be a combination of a linear (partial circular) and a full circular movement. For example, a non-full-circular path may be a movement along a path that is shaped like an eight (or essentially like an eight) or a movement along an oval (or essentially an oval). Further, there are shakers which provide a movement generally linearly or partial circular but which allow for an additional movement laterally of the linear (partial circular) movement. In such a shaker the non-full-circular path is composed of a relatively arbitrary lateral movement and a linear (or partial circular) movement. Shakers that are based on the principles disclosed herein are for example used in the field of dentistry for mixing amalgam or powder liquid materials.

In an embodiment, the article may be placed in a receptacle, preferably a receptacle for receiving the article. The receptacle may be placed in the holder of a centrifuge as described above prior to centrifuging the article within the receptacle by the centrifuge. Thereby, some of the uncured photopolymerizable composition is removed from the article. In some cases, the orientation of the part and supports on the additive manufacturing build platform is preplanned to provide optimized positioning of the part for subsequent centrifugation steps.

Orthodontic articles according to the present disclosure may comprise one or more various suitable polymers. For instance, the photopolymerized polymer may include at least one of a (meth)acryl polymer, a thioether polymer, an epoxy polymer, or combinations thereof. In some embodiments, one or more photopolymerized polymers include a urethane (meth)acryl polymer. In some embodiments, one or more photopolymerized polymers include a polyalkylene oxide (meth)acryl polymer. In some embodiments, one or more photopolymerized polymers include a polyalkylene oxide urethane (meth)acryl polymer. In some embodiments, one or more photopolymerized polymers include a polyester urethane (meth)acryl polymer. In some embodiments, one or more photopolymerized polymers include a polycarbonate urethane (meth)acryl polymer. In some embodiments, one or more photopolymerized polymers include an epoxy (meth) acrylate polymer. Any combination of the aforementioned polymers is contemplated. In select embodiments, the photopolymerized polymer includes a polycarbonate urethane (meth)acryl polymer. Suitable components for inclusion in photopolymerizable compositions are described in detail below.

Photopolymerizable compositions described herein can be mixed by known techniques. In some embodiments, for instance, a method for the preparation of a photopolymerizable composition described herein comprises the steps of mixing all or substantially all of the components of the photopolymerizable composition, heating the mixture, and optionally filtering the heated mixture. Softening the mixture, in some embodiments, is carried out at a temperature in a range from about 35° C. to about 85° C. In some embodiments, a photopolymerizable composition described herein is produced by placing all or substantially all components of the composition in a reaction vessel and heating the resulting mixture to a temperature ranging from about 35° C. to about 50° C. with stirring. The heating and stirring are continued until the mixture attains a substantially homogenized state.

In many embodiments, the photopolymerizable composition is vat polymerized, as discussed in detail above.

Orthodontic articles according to the present disclosure preferably exhibit at least one desirable physical property. The conformability and durability of a cured orthodontic article made from the photopolymerizable compositions of the present disclosure can be determined in part by standard tensile, modulus, and/or elongation testing. Desirable physical properties include any one or more of the following: surface height variation, haze, clarity, weight percent extractable components, initial relaxation modulus, elongation at break, tensile strength, relaxation modulus at 30 minutes, and percent loss of relaxation modulus. Preferably, the orthodontic article exhibits at least two different desirable physical properties, more preferably at least three different desirable physical properties, and most preferably at least low surface height variation, low haze, and low weight percent extractable components. The values of these different physical properties are described below.

An orthodontic article optionally exhibits a (e.g., first) surface wherein no more than 70% of the first surface has a slope magnitude greater than 2.5 degrees, no more than 65%, no more than 60%, no more than 55%, no more than 50%, no more than 45%, no more than 40%, no more than 35%, no more than 30%, no more than 25%, no more than 20%, no more than 15%, no more than 12%, no more than 10%, no more than 8%, no more than 5%, or no more than 3% of the first surface has a slope magnitude greater than 2.5 degrees. The slope angle measured with respect to surface height variation does not have to be 2.5 degrees but can vary, such as 5.5 degrees from a plane. For instance, in certain embodiments, no more than 20% of the first surface has a slope magnitude greater than 5.5 degrees, no more than 18%, no more than 15%, no more than 12%, no more than 10%, no more than 8%, no more than 7%, no more than 6%, no more than 5%, or no more than 3% of the first surface has a slope magnitude greater than 5.5 degrees. In certain embodiments, the article further includes a second surface (e.g, opposite the first surface) in which no more than 95% of the second surface has a slope magnitude greater than 2.5 degrees. Such a second surface may be an inner surface of the article, including a cavity configured to retain a tooth. In some embodiments, no more than 90% of the second surface has a slope magnitude greater than 2.5 degrees, no more than 85%, no more than 80%, no more than 75%, no more than 70%, no more than 65%, no more than 60%, more than 55%, no more than 50%, no more than 45%, no more than 40%, no more than 35%, no more than 30%, no more than 25%, no more than 20%, no more than 15%, or no more than 10% of the second surface has a slope magnitude greater than 2.5 degrees. In some embodiments, no more than 85% of the second surface has a slope magnitude greater than 5.5 degrees, no more than 80%, no more than 75%, no more than 70%, no more than 60%, no more than 50%, no more than 40%, no more than 30%, no more than 20%, or no more than 10% of the second surface has a slope magnitude greater than 5.5 degrees.

An orthodontic article optionally exhibits a haze of 65% or less, 60% or less, 55% or less, 50% or less, 45% or less, 40% or less, 35% or less, 30% or less, 25% or less, 20% or less, or 15% or less. In some embodiments, the haze is measured on a rectangular test object as described in detail in the Examples below.

An orthodontic article optionally exhibits a clarity of 35% or greater, 40% or greater, 45% or greater, 50% or greater, 55% or greater, or 60% or greater. In some embodiments, the clarity is measured on a rectangular test object as described in detail in the Examples below.

In certain embodiments, an orthodontic article comprises 0.05 wt. % or less extractable components, 0.045 wt. % or less, 0.040 wt. %, 0.035 wt. %, 0.030 wt. %, 0.025 wt. %, or even 0.020 wt. % or less extractable components, based on the total weight of the article. Either an organic solvent or water can be used to extract component (e.g., 5 volume percent ethanol in water), as described in detail in the Examples below. Surprisingly, methods of the present disclosure tend to result in orthodontic articles having a lower extractable component content than the same orthodontic articles which were solvent washed (instead of using mass inertial force).

An orthodontic article optionally (and preferably) exhibits high fidelity to the data file from which the orthodontic article was generated using additive manufacturing. It is an advantage of at least certain embodiments of the present disclosure that an orthodontic article can be manufactured such that a minimal amount of uncured photopolymerizable composition pools in one or more concave portions (e.g., portions configured to receive a tooth during use) and becomes part of the orthodontic article upon final curing process(es). It is believed that the mass inertial force to which the orthodontic article is subjected can remove sufficient uncured photopolymerizable composition from the complex shape of the orthodontic article to achieve a final article that is close in dimensions to the dimensions of the data file employed during additive manufacturing of the article. Thus, in some embodiments, the article includes a portion including a concave shape, wherein the concave shape has a maximum thickness within 5% of a thickness of the concave shape in a data file of the article used to selectively cure the photopolymerizable composition. In the case of complex shapes, such as custom orthodontic articles covering multiple teeth, many concave shapes are present and thoughtful orientation of the part and multi-axis spinning can be very useful in forming a thin and uniform residual surface layer for a high fidelity part.

An orthodontic article optionally exhibits an initial relaxation modulus of 100 megapascals (MPa) or greater measured at 37° C. and 2% strain, as determined by Dynamic Mechanical Analysis (DMA) following conditioning (i.e., soaking) of a sample of the material of the orthodontic article in deionized water for 48 hours at room temperature (i.e., 22 to 25° C.) ("Water Conditioning"). The DMA procedure is described in detail in the Examples below. Preferably, an orthodontic article exhibits an initial relaxation modulus of 200 MPa or greater, 300 MPa or greater, 400 MPa or greater, 500 MPa or greater, 600 MPa or greater, 700 MPa or greater, 800 MPa or greater, 900 MPa or greater, 1,000 MPa or greater, 1,100 MPa or greater, or even 1,200 MPa or greater. In some embodiments, the initial relaxation modulus is no greater than about 3000, 2500, 2000, or 1500 MPa.

An orthodontic article optionally exhibits a (e.g., 30 minute) relaxation modulus of 100 MPa or greater as determined by DMA following 30 minutes of soaking in water at 37° C. under a 2% strain. The DMA procedure for relaxation modulus is described in detail in the Examples below, and is performed on a sample of the material of the orthodontic article following Water Conditioning and initial relaxation modulus testing. Preferably, an orthodontic article exhibits a (e.g., 30 minute) relaxation modulus of 200 MPa or greater, 300 MPa or greater, 400 MPa or greater, 500 MPa or greater, 600 MPa or greater, 700 MPa or greater, 800 MPa or greater, 900 MPa or greater, or even 1,000 MPa or greater. In some embodiments, the (e.g., 30 minute) relaxation modulus is no greater than about 1500, 1200, 1000, or 800 MPa.

An orthodontic article optionally exhibits a percent loss of relaxation modulus of 70% or less as determined by DMA. The loss is determined by comparing the initial relaxation modulus to the (e.g., 30 minute) relaxation modulus at 37° C. and 2% strain. It was discovered that orthodontic articles according to at least certain embodiments of the present disclosure exhibit a smaller loss in relaxation modulus following exposure to water than articles made of different materials. Preferably, an orthodontic article exhibits loss of relaxation modulus of 65% or less, 60% or less, 55% or less, 50% or less, 45% or less 40% or less, or even 35% or less. In some embodiments, the loss of relaxation modulus is 10%, 15%, or 20% or greater.

An orthodontic article optionally exhibits an elongation at break of a printed article of 20% or greater, as determined according to the Examples section below, after conditioning (i.e., soaking) of a sample of the material of the orthodontic article in phosphate-buffered saline having a pH of 7.4, for 24 hours at a temperature of 37° C. ("PBS Conditioning"). High elongation at break helps prevent the orthodontic article from being too brittle and potentially breaking during use by a patient. Preferably, an orthodontic article exhibits an elongation at break of 25% or greater, 30% or greater, 35% or greater, 40% or greater, 45% or greater, 50% or greater, 55% or greater, 60% or greater, 65% or greater, 70% or greater, 75% or greater, 80% or greater, 85% or greater, 90% or greater, 95% or greater, 100% or greater, 110% or greater, or even 120% or greater. In some embodiments, the elongation at break is no greater than 250%, 240%, 230%, 220%, 210%, 200%, 190%, 180%, 170%, 160%, 150%, or 140%.

An orthodontic article optionally exhibits a tensile strength at yield (or maximum) of 14 MPa or greater as determined, as determined according to ASTM-D638-14, using test specimen V, after PBS Conditioning. High tensile strength contributes to the orthodontic article having sufficient strength to be resilient during use in a patient's mouth. Preferably, an orthodontic article exhibits a tensile strength of 15 MPa or greater, 17 MPa or greater, 20 MPa or greater, 25 MPa or greater, 30 MPa or greater, 35 MPa or greater, 40 MPa or greater, 45 MPa or greater, 50 MPa or greater, or even 55 MPa or greater. In some embodiments, the elongation at break is no greater than 100 MPa, 95 MPa, 90 MPa, 85 MPa, 80 MPa, 75 MPa, or 70 MPa.

In select embodiments, an orthodontic article exhibits an initial relaxation modulus of 100 MPa, an elongation at break of 20% or greater, and a tensile strength of 14 MPa or greater. Similarly, an article may exhibit any combination of the preferred values described above, of each of the initial relaxation modulus, elongation at break, and tensile strength at yield.

The above mechanical properties are particularly well suited for orthodontic articles that require resiliency and flexibility, along with adequate wear strength and low hygroscopicity. Surprisingly, methods of the present disclosure tend to result in printed articles that show higher yield strength, higher modulus, and lower drop in relaxation modulus compared to articles of the same composition that were solvent washed.

Photopolymerizable Compositions

Various photopolymerizable compositions are suitable for use in the methods according to the present disclosure. The compositions include at least one polymerizable component. The term "component" encompasses compounds, monomers, oligomers, and polymers. A "polymerizable component," for reference purposes herein, comprises a hardenable component that can be cured to provide a printed article. In some embodiments, for instance, hardening comprises irradiating with actinic radiation having sufficient energy to initiate a polymerization or cross-linking reaction. For instance, in some embodiments, ultraviolet (UV) radiation, e-beam radiation, or both, can be used.

In any embodiment, the photopolymerizable composition includes at least one of a (meth)acryl component, an epoxy component, a polyalkylene component, a polyalkylene oxide component, a polyester component, a polycarbonate component, a urethane component, a polyamide component, a thiol component, ene component that is different from the (meth)acryl component, or combinations thereof. In some embodiments, a photopolymerizable composition includes a (meth)acryl component in combination with one or more of an epoxy component, a polyalkylene component, a polyalkylene oxide component, a polyester component, a polycarbonate component, a urethane component, and/or a polyamide component.

More particularly, in some embodiments, the photopolymerizable composition is selected from the compositions described in co-owned U.S. Application Nos. 62/769,081; 62/850,747; International Application No. US2019/033252 (Klun et al.); WO 2019/175716 (Abuelyaman et al.); International Application No. US2018/060014 (Parkar et al.); International Application No. US2018/042595 (Parkar et al.); and/or WO 2018/119026 (Parkar et al.). These applications are incorporated herein by reference in their entireties. Compositions according to International Application No. US2019/033252 (Klun et al.) are described in detail below, and the compositions according to the other listed applications are summarized below.

Photopolymerizable Compositions Comprising a (Meth) Acryl Component and a Polyalkylene Oxide Component (e.g., Described in International Application No. US2019/033252 (Klun et al.)):

A suitable photopolymerizable composition comprises:
i) a monofunctional (meth)acrylate monomer whose cured homopolymer has a $T_g$ of 90° C. or greater;
ii) a photoinitiator; and
iii) a polymerization reaction product of components, the components comprising:
  1) an isocyanate;
  2) a (meth)acrylate mono-ol;
  3) a polycarbonate diol of Formula (I):

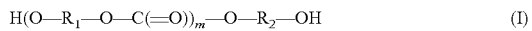

H(O—R$_1$—O—C(=O))$_m$—O—R$_2$—OH    (I)

wherein each of $R_1$ in each (O—R$_1$—O—C(=O)) repeat unit and each $R_2$ are independently an aliphatic, cycloaliphatic, or aliphatic/cycloaliphatic alkylene group and an average number of carbon atoms in a combination of all the $R_1$ and $R_2$ groups is 4 to 10, and m is 2 to 23; and
  4) a catalyst.

The components (i) through (iii) (and 1) through 4)) are discussed in detail below:

Monofunctional (Meth)Acrylate Monomer

In any embodiment, the photopolymerizable composition comprises a monofunctional (meth)acrylate monomer having a high glass transition temperature ($T_g$), i.e., whose cured homopolymer has a $T_g$ of 90° C. or greater. In some embodiments, a monofunctional (meth)acrylate monomer is present whose cured homopolymer has a $T_g$ of 100° C. or greater, 110° C. or greater, 120° C. or greater, 125° C. or greater, 130° C. or greater, 135° C. or greater, 140° C. or greater, 145° C. or greater, 150° C. or greater, 155° C. or greater, 160° C. or greater, 165° C. or greater, 170° C. or greater, 175° C. or greater, 180° C. or greater, 185° C. or greater, 190° C. or greater, or even 195° C. or greater. The $T_g$ of the homopolymer of the monofunctional (meth)acrylate monomer is typically no greater than about 260° C. For example, 1-adamantyl methacrylate decomposes at about 260° C. In some embodiment, the $T_g$ of the homopolymer of the monofunctional (meth)acrylate monomer is no greater than 255° C., 250° C., 245° C., 240° C., 235° C., 230° C., 225° C., 220° C., 215° C., 210° C., 205° C. or 200° C. The inclusion of one or more monofunctional (meth)acrylate monomers whose cured homopolymer has a $T_g$ of 90° C. or greater in a photopolymerizable composition contributes to increasing the relaxation modulus of a photopolymerization reaction product of the composition as measured after soaking in deionized water. Often, the $T_g$ of a homopolymer of a monomer can be found in the literature.

In some embodiments, the monofunctional (meth)acrylate monomer comprises a cycloaliphatic monofunctional (meth) acrylate. Suitable monofunctional (meth)acrylate monomers include for instance and without limitation, dicyclopentadienyl acrylate, dicyclopentanyl acrylate, dimethyl-1-adamantyl acrylate, cyclohexyl methacrylate, butyl methacrylate (e.g., tert-butyl methacrylate), 3,3,5-trimethylcyclohexyl methacrylate, butyl-cyclohexylmethacrylate (e.g., cis-4-tert-butyl-cyclohexylmethacrylate, 73/27 trans/cis-4-tert-butyl-cyclohexylmethacrylate, or trans-4-tert-butylcyclohexyl methacrylate), 2-decahydronapthyl methacrylate, 1-adamantyl acrylate, dicyclopentadienyl methacrylate, dicyclopentanyl methacrylate, isobornyl methacrylate (e.g., d,l-isobornyl methacrylate), dimethyl-1-adamantyl methacrylate, bornyl methacrylate (e.g., d,l-bornyl methacrylate), 3-tetracyclo[4.4.0.1.1]dodecyl methacrylate, 1-adamantyl methacrylate, isobornyl acrylate, or combinations thereof. In an embodiment, the monofunctional (meth) acrylate monomer comprises isobornyl methacrylate.

In certain embodiments, the weight ratio of the monofunctional (meth)acrylate monomer to the polyurethane (meth)acrylate polymer is 60:40 to 40:60, 55:45 to 45:55, or 50:50.

In some embodiments of the invention, the cured material will be in contact with an aqueous environment. In those cases, it is advantageous to utilize materials which have low affinity for water. The affinity for water of certain (meth) acrylate monomers can be estimated by the calculation of a partition coefficient (P) between water and an immiscible solvent, such as octanol. This can serve as a quantitative descriptor of hydrophilicity or lipophilicity. The octanol/water partition coefficient can be calculated by software programs such as ACD ChemSketch, (Advanced Chemistry Development, Inc., Toronto, Canada) using the log of octanol/water partition coefficient (log P) module. In embodiments of the present invention, the calculated log P value is greater than 1, 1.5, 2, 2.5, 3, 3.5, or 4. The calculated log P value is typically no greater than 12.5. In some embodiments, the calculated log P value is no greater than 12, 11.5, 11, 10.5, 10, 9.5, 9, 8.5, 8, 7.5, 7, 6.5, 6, or 5.5. Moreover, in some embodiments, photopolymerizable compositions exclude the presence of a significant amount of hydrophilic (meth)acrylate monomers by being essentially free of any monofunctional (meth)acrylate monomer having a log P value of less than 3, less than 2, or less than 1.

Components

Orthodontic articles according to the present disclosure comprise a polymerized reaction product of components. The components include at least one isocyanate, at least one (meth)acrylate mono-ol, at least one polycarbonate diol, and at least one catalyst. Each of these components is discussed in detail below.

Suitable amounts of each of the isocyanate, (meth)acrylate mono-ol, and polycarbonate diol present in the components are based on molar ratios of each of these components to the others. For instance, a ratio of the isocyanate (e.g., a diisocyanate, which has 2 isocyanate equivalents per mole of isocyanate compound) to the polycarbonate diol typically ranges from 4 molar equivalents of the isocyanate to 1 molar equivalent of the alcohol of the polycarbonate diol, to 4 molar equivalents of the isocyanate to 3 molar equivalents of the alcohol of the polycarbonate diol. Stated another way, a ratio of the isocyanate (e.g., a diisocyanate) to the polycarbonate diol typically ranges from 4 molar equivalents of the isocyanate to 1 molar equivalent of the alcohol of the polycarbonate diol, to 1.3 molar equivalents of the isocyanate to 1 molar equivalent of the alcohol of the polycarbonate diol. In select embodiments, a ratio of the isocyanate to the polycarbonate diol is 4 molar equivalents of isocyanate to 2 molar equivalents of the alcohol of the polycarbonate diol, or stated another way, 2 molar equivalents of isocyanate to 1 molar equivalent of alcohol of the polycarbonate diol. The closer the ratio of the isocyanate to the polycarbonate diol is to 1 molar equivalent of isocyanate to 1 molar equivalent of the alcohol of the polycarbonate diol, the higher the weight average molecular weight of the resulting polyurethane (meth)acrylate polymer produced in the polymerization reaction product of components.

A ratio of the isocyanate (e.g., a diisocyanate) to the (meth)acrylate mono-ol typically ranges from 4 molar equivalents of the isocyanate to 3 molar equivalents of the (meth)acrylate mono-ol, to 4 molar equivalents of the isocyanate to 1 molar equivalent of the (meth)acrylate mono-ol. Stated another way, a ratio of the isocyanate (e.g., a diisocyanate) to the (meth)acrylate mono-ol typically ranges from 1.3 molar equivalents of the isocyanate to 1 molar equivalent of the (meth)acrylate mono-ol, to 4 molar equivalents of the isocyanate to 1 molar equivalent of the (meth)acrylate mono-ol. In select embodiments, a ratio of the isocyanate to the (meth)acrylate mono-ol is 4 molar equivalents of the isocyanate to 2 molar equivalents of the (meth)acrylate mono-ol, or stated another way, 2 molar equivalents of the isocyanate to 1 molar equivalents of the (meth)acrylate mono-ol.

A ratio of the polycarbonate diol to the (meth)acrylate mono-ol typically ranges from 1 molar equivalent of the alcohol of the polycarbonate diol to 3 molar equivalents of the (meth)acrylate mono-ol, to 3 molar equivalents of the polycarbonate diol to 1 molar equivalents of the (meth)acrylate mono-ol. Stated another way, a ratio of the polycarbonate diol to the (meth)acrylate mono-ol typically ranges from 1 molar equivalent of the alcohol of the polycarbonate diol to 3 molar equivalents of the (meth)acrylate mono-ol, to 1 molar equivalent of the alcohol of the polycarbonate diol to 0.3 molar equivalents of the (meth)acrylate mono-ol. In select embodiments, a ratio of the polycarbonate diol to the (meth)acrylate mono-ol is 1 molar equivalent of the alcohol of the polycarbonate diol to 1 molar equivalent of the (meth)acrylate mono-ol.

Isocyanate

The components (e.g., included in the polymerization reaction product of components) comprise at least one isocyanate. Polyisocyanates which can be employed in the components can be any organic isocyanate having at least two free isocyanate groups. Included are aliphatic, cycloaliphatic, aromatic and araliphatic isocyanates. Any of the known polyisocyanates such as alkyl and alkylene polyisocyanates, cycloalkyl and cycloalkylene polyisocyanates, and combinations such as alkylene and cycloalkylene polyisocyanates can be employed.

In some embodiments, diisocyanates having the formula $R_{di}(NCO)_2$ can be used, with $R_{di}$ as defined above.

Specific examples of suitable diisocyanates include for instance and without limitation, 2,6-toluene diisocyanate (TDI), 2,4-toluene diisocyanate, methylenedicyclohexylene-4,4'-diisocyanate (H12MDI), 3-isocyanatomethyl-3,5-5-trimethylcyclohexyl isocyanate (IPDI), 1,6-diisocyanatohexane (HDI), tetramethyl-m-xylylene diisocyanate, a mixture of 2,2,4- and 2,4,4-trimethyl-1,6-diisocyanatohexane (TMXDI), trans-1,4-hydrogenated xylylene diisocyanates (H6XDI), cyclohexyl-1,4-diisocyanate, 4,4'-methylene diphenyl diisocyanate, 2,4'-methylene diphenyl diisocyanate, a mixture of 4,4'-methylene diphenyl diisocyanate and 2,4'-methylene diphenyl diisocyanate, 1,5-naphthalene diisocyanate, 1,4-tetramethylene diisocyanate, 1,4-phenylene diisocyanate, 2,6- and 2,4-toluene diisocyanate, 1,5-naphthylene diisocyanate, 2,4' and 4,4'-diphenylmethane diisocyanate, pentamethylene diisocyanate, dodecamethylene diisocyanate, 1,3-cyclopentane diisocyanate, 1,3-cyclohexane diisocyanate, methyl 2,4-cyclohexane diisocyanate, methyl-2,6-cyclohexane diisocyanate, 1,4-bis (isocyanatomethyl) cyclohexane, 1,3-bis (isocyanatomethyl) cyclohexane, 4,4'-toluidine diisocyanate, 4,4'-diphenyl ether diisocyanate, 1,3- or 1,4-xylylene diisocyanate, lysine diisocyanate methyl ester, 3,3'-dimethyl-4,4'-diphenylmethane diisocyanate, 3,3'-dimethyl-phenylene diisocyanate, 2,5-bis (isocyanate methyl)-bicyclo[2.2.1]heptane, 2,6-bis (isocyanate methyl)-bicyclo[2.2.1]heptane, bis (2-isocyanate ethyl) fumarate, 4-diphenylpropane diisocyanate, trans-cyclohexane-1,4-diisocyanatehydrogenated dimer acid diisocyanate, a norbornene diisocyanate, methylenebis 6-isopropyl-1,3-phenyl diisocyanate, and any combination thereof. In select embodiments, the diisocyanate comprises IPDI. It is also possible to use higher-functional polyisocyanates known from polyurethane chemistry or else modified polyisocyanates, for example containing carbodiimide groups, allophanate groups, isocyanurate groups and/or biuret groups.

(Meth)Acrylate Mono-Ol

The components (e.g., included in the polymerization reaction product of components) comprise a (meth)acrylate mono-ol. Typically, the (meth)acrylate mono-ol comprises a hydroxy functional (meth)acrylate of Formula (II):

$$HO-Q-(A)_p \qquad (II)$$

wherein Q is a polyvalent organic linking group, A is a (meth)acryl functional group of the formula —XC(=O)C(R_3)=CH_2, wherein X is O, S, or NR_4, R_4 is H or alkyl of 1 to 4 carbon atoms, R_3 is a lower alkyl of 1 to 4 carbon atoms or H, and wherein p is 1 or 2.

Q can be a straight or branched chain or cycle-containing connecting group. Q can include a covalent bond, an alkylene, an arylene, an aralkylene, an alkarylene. Q can optionally include heteroatoms such as O, N, and S, and combinations thereof. Q can also optionally include a heteroatom-containing functional group such as carbonyl or sulfonyl, and combinations thereof. In some embodiments, Q is a straight chain, branched chain, or cycle-containing connecting group selected from arylene, aralkylene, and alkarylene. In yet other embodiments, Q is a straight chain, branched chain, or cycle-containing connecting group containing heteroatoms such as O, N, and S and/or a heteroatom containing functional group such as carbonyl and sulfonyl. In other embodiments, Q is a branched or cycle-containing alkylene group that optionally contains heteroatoms selected from O, N, S, and/or a heteroatom-containing functional group such as carbonyl and sulfonyl.

In some embodiments, in the hydroxy functional (meth) acrylate of Formula (II), Q is an alkylene group, p is 1, and in the (meth)acryl functional group A, X is O and $R_2$ is methyl or H. In certain preferred embodiments, in the hydroxy functional (meth)acrylate of Formula (II), Q is an alkylene group, p is 1, and in the (meth)acryl functional group A, X is O and $R_2$ is methyl.

Suitable example (meth)acrylate mono-ols include for instance and without limitation, 2-hydroxyethyl (meth)acrylate, hydroxypropyl acrylate (all isomers), hydroxybutyl acrylate (all isomers), poly(e-caprolactone) mono[2-(meth)acryloxy ethyl] esters such as caprolactone monoacrylate available under the trade designation "SR-495" from Sartomer USA (Arkema Group) (Exton, PA), glycerol dimethacrylate, 1-(acryloxy)-3-(methacryloxy)-2-propanol, 2-hydroxy-3-phenyloxypropyl (meth)acrylate, 2-hydroxyalkyl (meth)acryloyl phosphate, 4-hydroxycyclohexyl (meth)acrylate, trimethylolpropane di(meth)acrylate, trimethylolethane di(meth)acrylate, 1,4-butanediol mono(meth)acrylate, neopentyl glycol mono(meth)acrylate, 1,6-hexanediol mono (meth)acrylate, 3-chloro-2-hydroxypropyl (meth)acrylate, 2-hydroxy-3-alkyloxy(meth)acrylate, polyethylene glycol mono(meth)acrylate, polypropylene glycol mono(meth)acrylate, ethylene oxide-modified phthalic acid (meth)acrylate, and 4-hydroxycyclohexyl (meth)acrylate.

Polycarbonate Diol

The components (e.g., included in the polymerization reaction product of components) comprise a polycarbonate diol, which was found to contribute to less water being absorbed during contact with water than orthodontic articles containing polyurethanes having alternate linking groups, such as polyethers. As orthodontic articles are used in the moisture-rich environment of a patient's mouth, the extent of water absorption is relevant to the composition of an orthodontic article. Select articles absorb less than 3%, less than 2.5%, less than 2%, less than 1.5%, or even less than 1% water when soaked in deionized water for 7 days at 37° C. The polycarbonate diol is of Formula (I):

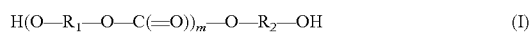

$$H(O-R_1-O-C(=O))_m-O-R_2-OH \quad (I)$$

wherein each of $R_1$ in each $(O-R_1-O-C(=O))$ repeat unit, and $R_2$ are independently an aliphatic, cycloaliphatic, or aliphatic/cycloaliphatic alkylene group and an average number of carbon atoms in a combination of all the $R_1$ and $R_2$ groups is 4 to 10, and m is (an integer of) 2 to 23. Stated another way, while some repeat units of $R_1$ and/or $R_2$ may have a carbon number of less than 4 (e.g., 2 or 3), enough of the repeat units have a sufficiently high carbon number that when the carbon numbers of all the repeat units of $R_1$ and $R_2$ in the polycarbonate diol of Formula (I) are averaged, that average falls within the range of 4 to 10, or any of 4 to 6, 4 to 7, 4 to 8, 4 to 9, 5 to 7, 5 to 8, 5 to 9, 5 to 10, 6 to 8, 6 to 9, 6 to 10, 7 to 9, 7 to 10, or 8 to 10. In select embodiments, at least one of $R_1$ or $R_2$ is $-CH_2CH_2CH(CH_3)CH_2CH_2-$, $-(CH_2)_6-$, or $-(CH_2)_4-$, and preferably a combination of $-CH_2CH_2CH(CH_3)CH_2CH_2-$, and $-(CH_2)_6-$.

In some embodiments, either the polycarbonate diol has a number average molecular weight (Mn) of greater than 1,000 grams per mole (g/mol) or a weighted average of all polycarbonate diols present in the components has a Mn of greater than 1,000 g/mol, wherein Mn is determined by OH value. Stated a different way, when the components contain a single polycarbonate diol of Formula (I), the polycarbonate diol has a Mn higher than 1,000 g/mol. When the components contain two or more polycarbonate diols (e.g., one or more being of Formula (I)), the Mn of at least one of the polycarbonate diols may be 1,000 g/mol or less with the proviso that a weighted average of all the Mn values of the two or more polycarbonate diols is higher than 1,000 g/mol. For instance, components containing two polycarbonate diols could include a molar ratio of a first polycarbonate diol having a Mn of about 500 g/mol of 1 to a second polycarbonate diol having a Mn of about 1,500 g/mol of 2, resulting in a weighted average Mn of 1,167 g/mol. In certain embodiments, a polycarbonate diol (or a weighted average of all the polycarbonate diols present in the components) has a number average molecular weight of 1,500 g/mol or higher.

In some embodiments, one or more polycarbonate diols are present having a Mn of 450 grams per mole (g/mol) or greater, 500 g/mol or greater, 550 g/mol or greater, 600 g/mol or greater, 650 g/mol or greater, 700 g/mol or greater, 750 g/mol or greater, 800 g/mol or greater, 850 g/mol or greater, 900 g/mol or greater, 950 g/mol or greater, or 1,000 g/mol or greater; and 3,200 g/mol or less, 3,100 g/mol or less, 3,000 g/mol or less, 2,900 g/mol or less, 2,800 g/mol or less, 2,700 g/mol or less, 2,600 g/mol or less, 2,500 g/mol or less, 2,400 g/mol or less, 2,300 g/mol or less, 2,200 g/mol or less, 2,100 g/mol or less, 2,000 g/mol or less, 1,900 g/mol or less, 1,800 g/mol or less, or 1,700 g/mol or less. Stated another way, the polycarbonate diol may have a Mn of 450 g/mol to 3,200 g/mol, 800 g/mol to 3,200 g/mol, 1,000 g/mol to 3,200 g/mol, 1,500 g/mol to 3,200 g/mol, 1,800 g/mol to 3,200 g/mol, 450 g/mol to 2,200 g/mol, 800 g/mol to 2,200 g/mol, 1,000 g/mol to 2,200 g/mol, 1,500 g/mol to 2,200 g/mol, or 1,800 g/mol to 2,200 g/mol. Inclusion of a polycarbonate diol having a Mn of greater than 3,200 g/mol, on the other hand, may negatively impact the stiffness of a photopolymerization reaction product of the photopolymerization composition, by increasing the elastomeric character of the photopolymerization reaction product. In select embodiments, the photopolymerizable composition is essentially free of any diols that have a Mn lower than the one or more polycarbonate diols present in the components.

Suitable polycarbonate diols for use in the components include for instance and without limitation, those commercially available from Kuraray Co. Ltd. (Tokyo, JP) under the trade designation "KURARAY POLYOL", e.g., specifically, each of the KURARAY POLYOL C series: C-590, C-1090, C-2050, C-2090, and C-3090; from Covestro LLC (Pittsburgh, PA) under the trade designation "DESMOPHEN", e.g., specifically, each of the DESMOPHEN C series: C-2100, C-2200, and C XP-2613.

Catalyst

The components (e.g., included in the polymerization reaction product of components) comprise a catalyst to catalyze the reaction of the at least one isocyanate, at least one (meth)acrylate mono-ol, and at least one polycarbonate diol. Typically, catalyst is included in an amount of 0.01 wt. % to 5 wt. %, based on the total weight of the polymerizable components.

Examples of suitable catalysts include for instance and without limitation, dioctyl dilaurate (DOTDL), stannous octoate, dibutyltin diacetate, dibutyltin dilaurate, dibutyltin mercaptide, dibutyltin thiocarboxylate, dibutyltin dimaleate, dioctyltin mercaptide, dioctyltin thiocarboxylate, lead 2-ethylhexanoate, tetra-alkyl titanates such as tetrabutyl titanate (TBT), triethylamine, N, N-dimethylcyclohexylamine, N-methylmorpholine, N-ethylmorpholine, N, N-dimethyl-p-toluidine, beta-(dimethylamino) propionitrile, N-methylpyrrolidone, N, N-dicyclohexylmethylamine, dimethylaminoethanol, dimethylamino-ethoxyethanol, triethylenediamine, N, N, N'-trimethyl aminoethyl ethanol amine, N, N, N', N'-tetramethylethylenediamine, N, N, N', N'-tetramethyl-1, 3-diamine, N, N, N', N'-tetramethyl-1,6-hexanediol-di-amine, bis(N, N-dimethylaminoethyl) ether, N'-cyclohexyl-N, N-dimethyl-formamidine, N, N'-dimethylpiperazine, trimethyl piperazine, bis(aminopropyl) piperazine, N—(N, N'-dimethylaminoethyl) morpholine, bis(morpholinoethyl)

ether, 1,2-dimethyl imidazole, N-methylimidazole, 1,4-diamidines, diazabicyclo-[2.2.2]-octane (DABCO), 1,4-diazabicyclo [3.3.0]-oct-4-ene (DBN), 1,8-diazabicyclo-[4.3.0]-non-5-ene (DBN), 1,8-diazabicyclo[5.4.0]-undec-7-ene (DBU), and phenol salts, salts such as octyl acid salts, N, N, N', N''-pentamethyldiethylenetriamine, N, N, N', N''-pentamethyl dipropylenetriamine, tetramethylguanidine, N-cyclohexyl-N', N', N'', N''-tetramethyl guanidine, N-methyl-N'-(2-dimethyl amino ethyl) piperazine, 1,3,5-tris (N, N-dimethyl-propyl)-hexahydro-1,3,5-triazine.

In any embodiment, the catalyst comprises zinc, an amine, tin, zirconium, or bismuth. The catalyst can comprise tin, such as dibutyltin diacrylate. Preferably, however, the catalyst is free of tin, as tin catalysts may not be desirable to include in orthodontic articles that will be in contact with a patient's mouth.

The catalyst may comprise an organometallic zinc complex that is free of 2-ethylhexyl carboxylate and 2-ethylhexanoic acid, such as the zinc catalyst commercially available from King Industries, Inc. (Norwalk, CT) under the trade designation K-KAT XK-672, and/or other zinc catalysts available from King Industries, such as K-KAT XK-661, and K-KAT XK-635. Another suitable catalyst is bismuth neodecanoate, for instance commercially available from Sigma-Aldrich (St. Louis, MO), as well as bismuth catalysts available from King Industries under the trade designations K-KAT XK-651 and K-KAT 348. Available aluminum based catalysts include K-KAT 5218 from King Industries. Further, zirconium based catalysts include K-KAT 4205 and K-KAT 6212 available from King Industries.

Polymerized Reaction Product of Components

Orthodontic articles according to the present disclosure comprise a polymerized reaction product of components, which were described above. The polymerized reaction product of components contains at least one polyurethane (meth)acrylate polymer. Urethanes are prepared by the reaction of an isocyanate with an alcohol to form carbamate linkages. The polyurethane (meth)acrylate polymer typically provides toughness (e.g., at least a minimum tensile strength and/or modulus and flexibility, (e.g., at least a minimum elongation at break)) to the final orthodontic article. In addition to the urethane functionality, the polyurethane (meth)acrylate polymer further comprises a polycarbonate linking group. The linking group is a functional group that connects two or more urethane groups, and may be divalent, trivalent, or tetravalent, and preferably divalent. In addition, the polyurethane (meth)acrylate polymer optionally further comprises one or more functional groups selected from hydroxyl groups, carboxyl groups, amino groups, and siloxane groups. These functional groups can be reactive with other components of the photopolymerizable composition during polymerization. The polyurethane (meth)acrylate polymer preferably has a weight average molecular weight (Mw) of 3,000 g/mol to 50,000 g/mol, 6,000 g/mol to 40,000 g/mol, 6,000 g/mol to 18,000 g/mol, 6,000 g/mol to 35,000 g/mol, or 8,000 g/mol to 32,000 g/mol. Higher molecular weight of the polyurethane (meth)acrylates will result in higher viscosity resin formulations with comparable compositions and loadings, which makes them less flowable; lower molecular weight of the polyurethane (meth)acrylates will reduce their toughening effect on the cured orthodontic articles.

In some embodiments, the polyurethane (meth)acrylate is of Formula (VI):

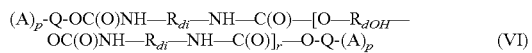

(VI)

wherein, A has the formula $-OC(=O)C(R_3)=CH_2$ wherein $R_3$ is an alkyl of 1 to 4 carbon atoms (e.g. methyl) or H, p is 1 or 2, Q is a polyvalent organic linking group as described above, $R_{di}$ is the residue of a diisocyanate, $R_{dOH}$ is the residue of a polycarbonate polyol, and r averages from 1 to 15. In some embodiments, r is no greater than 15, 14, 13, 12, 11, or 10. In some embodiments, r averages at least 2, 3, 4, or 5. In some embodiments, A is a methacryl functional group, such as methacrylate.

In some embodiments, the polymerized reaction product of components further comprises one or more side reaction products in addition to the polyurethane (meth)acrylate polymer. Depending on the selectivity of the catalyst and/or the weight ratios of the components, oligomers of the reactants may be produced. The order of addition of components in preparing the photopolymerizable composition affects the relative amounts of polymers and oligomers produced in the photopolymerized reaction product. For instance, adding the isocyanate to the polycarbonate diol first, followed by adding the monofunctional (meth)acrylate results in a higher ratio of polyurethane (meth)acrylate polymer to side products such as oligomers, than instead adding the monofunctional (meth)acrylate to the isocyanate first, followed by adding the polycarbonate diol.

Oligomers having a structure of monofunctional (meth)acrylate monomer-isocyanate-monofunctional (meth)acrylate monomer have been found to be a byproduct of the polymerization reaction of components in certain embodiments. It is possible to purify the polyurethane (meth)acrylate polymer to remove such side products. Alternatively, additional side products such as oligomers may be added to the polymerized reaction product, particularly when a specific reaction generates a small amount of one or more side products. It has been discovered that some side product components can improve at least one of modulus or extent of crosslinking after the photopolymerizable composition has been cured.

For example, photopolymerizable compositions optionally comprise a compound of Formula (III):

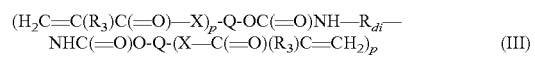

(III)

wherein X, Q, p, and $R_3$ are as defined for Formula (II), and $R_{di}$ is the residue of a diisocyanate as defined above. Typically, the compound of Formula (III) is produced during the polymerization of the components, as described above. The specific formulation of the components will affect how much of a compound of Formula (III) is made during the polymerization of components. For instance, the specificity of the catalyst towards catalyzing the formation of the polyurethane (meth)acrylate polymer can affect the amount of the compound of Formula (III) generated during the polymerization of the components. In certain embodiments, the compound of Formula (III) is added to the photopolymerizable composition, particularly when a smaller amount of the compound of Formula (III) is produced by the polymerization of components than desired. In any embodiment, the compound may advantageously improve crosslinking during the photopolymerization reaction, increase the modulus or the photopolymerization reaction product, or both. Regardless of if the compound of Formula (III) is formed during the polymerization of the components, added separately to the photopolymerizable composition, or both, in some embodiments the compound of Formula (III) is present in an amount of 0.05 weight percent (wt. %) or greater, based on the weight of the polymerizable composition, 0.1 wt. % or greater, 0.5 wt. % or greater, 1 wt. % or greater, 1.5 wt. % or greater, 2.5 wt. % or greater, 2 wt. % or greater, 3 wt. % or greater, 4 wt. % or greater, 5 wt. % or greater, 6 wt. % or greater, 7 wt. % or greater, 8 wt. % or greater, or 9 wt. % or greater; and 20 wt. % or less, 18 wt. % or less, 16 wt. % or less, 15 wt. % or less, 14 wt. % or less, 12 wt. % or less, or 10 wt. % or less, based on the weight of the polymerizable composition. Stated another way, the compound of Formula (III) may be present in the photopolymerizable composition in an amount of 0.05 to 20 weight percent (wt. %), 1.5 to 12 wt. %, 2.5 to 12 wt. %, 5 to 15 wt. %, 5 to 12 wt. %, 7 to 15 wt. %, 7 to 12 wt. %, or 5 to 20 wt. %, based on the weight of the polymerizable composition. Optionally, X is O in the compound of Formula (III). In select embodiments, the compound of Formula (III) is of Formula (IV):

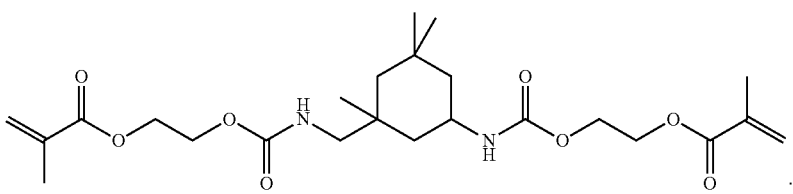

(IV)

Second Polymerization Reaction Product of Components:

In any embodiment, the photopolymerizable composition further comprises a second polymerization reaction product of components. The use of a second polyurethane(meth) acrylate polymer may provide somewhat different mechanical properties to the orthodontic article than using a single polyurethane(meth)acrylate polymer in the photopolymerizable composition. The components of the second polymerization reaction product comprise:

1) an isocyanate functional (meth)acrylate compound of the Formula (VII):

wherein A, p, and Q are as defined for Formula (II);
2) a polycarbonate diol of Formula (I):

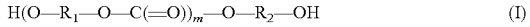

wherein each of $R_1$ in each $(O-R_1-O-C(=O))$ repeat unit and each $R_2$ are independently an aliphatic, cycloaliphatic, or aliphatic/cycloaliphatic alkylene group and an average number of carbon atoms in a combination of all the $R_1$ and $R_2$ groups is 4 to 10, and m is 2 to 23; and
3) a catalyst.

The second polymerization reaction product comprises a polyurethane (meth)acrylate polymer that is different from the first polyurethane (meth)acrylate polymer. In select embodiments, the second polymerization reaction product comprises a compound of Formula (VIII):

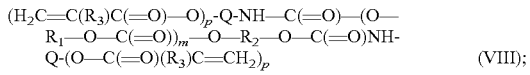

wherein Q, p, and $R_3$ are as defined for Formula (II) and $R_1$ and $R_2$ are as defined for Formula (I).

The compound of Formula (VIII) is typically obtained by reaction of a polycarbonate diol with an isocyanate functional (meth)acrylate compound in the presence of a catalyst. Examples of the isocyanate functional (meth)acrylate include isocyanatoethyl methacrylate, isocyanatoethoxyethyl methacrylate, isocyanatoethyl acrylate, and 1,1-(bisacryloyloxymethyl) ethyl isocyanate, which are for instance commercially available from Showa. Denko (Tokyo, Japan).

In embodiments in which the diisocyanate is asymmetric, during polymerization the orientation of attachment of the residue of the diisocyanate to the nitrogen atoms of the carbamate linkages will vary and the polymerized reaction product will accordingly contain multiple polyurethane methacrylate structures.

Photoinitiator

Photopolymerizable compositions of the present disclosure include at least one photoinitiator. Suitable exemplary photoinitiators are those available under the trade designations OMNIRAD from IGM Resins (Waalwijk, The Netherlands) and include 1-hydroxycyclohexyl phenyl ketone (OMNIRAD 184), 2,2-dimethoxy-1,2-diphenylethan-1-one (OMNIRAD 651), bis(2,4,6 trimethylbenzoyl)phenylphosphineoxide (OMNIRAD 819), 1-[4-(2-hydroxyethoxy)phenyl]-2-hydroxy-2-methyl-1-propane-1-one (OMNIRAD 2959), 2-benzyl-2-dimethylamino-1-(4-morpholinophenyl) butanone (OMNIRAD 369), 2-Dimethylamino-2-(4-methyl-benzyl)-1-(4-morpholin-4-yl-phenyl)-butan-1-one (OMNIRAD 379), 2-methyl-1-[4-(methylthio)phenyl]-2-morpholinopropan-1-one (OMNIRAD 907), Oligo[2-hydroxy-2-methyl-1-[4-(1-methylvinyl)phenyl]propanone] ESACURE ONE (Lamberti S.p.A., Gallarate, Italy), 2-hydroxy-2-methyl-1-phenyl propan-1-one (DAROCUR 1173), 2, 4, 6-trimethylbenzoyldiphenylphosphine oxide (OMNIRAD TPO), and 2, 4, 6-trimethylbenzoylphenyl phosphinate (OMNIRAD TPO-L). Additional suitable photoinitiators include for example and without limitation, benzyl dimethyl ketal, 2-methyl-2-hydroxypropiophenone, benzoin methyl ether, benzoin isopropyl ether, anisoin methyl ether, aromatic sulfonyl chlorides, photoactive oximes, and combinations thereof.

Difunctional Component

The photopolymerizable compositions of the present disclosure optionally include at least one difunctional component, such as a difunctional (meth)acrylate monomer or oligomer. A difunctional component present in a photopolymerizable composition can co-react with the polyurethane (meth)acrylate polymer (e.g., is capable of undergoing addition polymerization).

A difunctional component (e.g., monomer) is optionally present in an amount of up to 15 wt. %, based on the total weight of the photopolymerizable composition, up to 12 wt. %, up to 10 wt. %, or up to 8 wt. %, based on the total weight of the photopolymerizable composition. Including more than 15 wt. % difunctional components may lead to more crosslinking than desired and decrease the elongation of the orthodontic article.

Suitable difunctional monomers include for instance and without limitation, compounds having the Formula (IX):

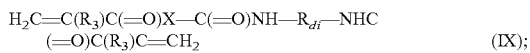

(IX);

wherein R₃ is as defined for Formula (II) and R_di is the residue of a diisocyanate, compounds having the Formula (X):

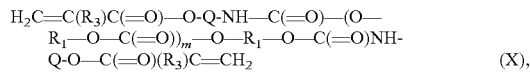

(X), wherein Q, and R₃ are as defined for Formula (II) and R₁ is as defined for Formula (I), hydroxyethyl methacrylate diester of terephthalic acid, 1,12-dodecanediol dimethacrylate, or combinations thereof. Additional suitable difunctional monomers include alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate, or any combination thereof. Further suitable difunctional monomers include the dimethacrylates of each of the above listed diacrylates. Typically, the photopolymerizable compositions are essentially free of trihydric alcohols, which are alcohols having three hydroxyl groups. This is due to such alcohols increasing the hydrophilicity of the photopolymerizable composition, which may result in an undesirably high water absorption during use of an orthodontic article prepared from the photopolymerizable composition.

Additives

Photopolymerizable compositions described herein, in some instances, further comprise one or more additives, such as one or more additives selected from the group consisting of inhibitors, stabilizing agents, sensitizers, absorption modifiers, fillers and combinations thereof. In many embodiments, the photopolymerizable compositions are free of inorganic fillers, colorants, or both.

In addition, a photopolymerizable material composition described herein can further comprise one or more sensitizers to increase the effectiveness of one or more photoinitiators that may also be present. In some embodiments, a sensitizer comprises isopropylthioxanthone (ITX) or 2-chlorothioxanthone (CTX). Other sensitizers may also be used. If used in the photopolymerizable composition, a sensitizer can be present in an amount ranging of about 0.01% by weight or about 1% by weight, based on the total weight of the photopolymerizable composition.

A photopolymerizable composition described herein optionally also comprises one or more polymerization inhibitors or stabilizing agents. A polymerization inhibitor is often included in a photopolymerizable composition to provide additional thermal stability to the composition. A stabilizing agent, in some instances, comprises one or more anti-oxidants. Any anti-oxidant not inconsistent with the objectives of the present disclosure may be used. In some embodiments, for example, suitable anti-oxidants include various aryl compounds, including butylated hydroxytoluene (BHT), which can also be used as a polymerization inhibitor in embodiments described herein. In addition to or as an alternative, a polymerization inhibitor comprises methoxyhydroquinone (MEHQ).

In some embodiments, a polymerization inhibitor, if used, is present in an amount of about 0.001-2% by weight, 0.001 to 1% by weight, or 0.01-1% by weight, based on the total weight of the photopolymerizable composition. Further, if used, a stabilizing agent is present in a photopolymerizable composition described herein in an amount of about 0.1-5% by weight, about 0.5-4% by weight, or about 1-3% by weight, based on the total weight of the photopolymerizable composition.

A photopolymerizable composition as described herein can also comprise one or more UV absorbers including dyes, optical brighteners, pigments, particulate fillers, etc., to control the penetration depth of actinic radiation. One particularly suitable UV absorber is Tinuvin 326 (2-(5-chloro-2H-benzotriazol-2-yl)-6-(1,1-dimethylethyl)-4-methylphenol, obtained from BASF Corporation, Florham Park, NJ Another particularly suitable UV absorber that is an optical brightener that is Tinopal OB, a benzoxazole, 2,2'-(2,5-thiophenediyl)bis[5-(1,1-dimethylethyl)], also available from BASF Corporation. Another suitable UV absorber is an optical brightener comprising a compound of Formula (V):

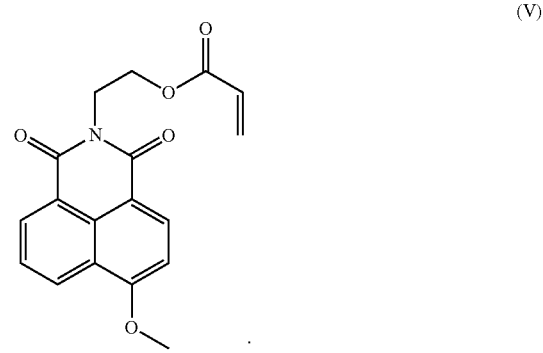 [SMILES: C=CC(=O)OCCN1C(=O)c2cccc3c(OC)ccc(c23)C1=O]

(V)

The compound of Formula V may be synthesized as described in detail in co-owned International Application No. US2019/033252 (Klun et al.).

The UV absorber, if used, can be present in an amount of about 0.001-5% by weight, about 0.01-1% by weight, about 0.1-3% by weight, or about 0.1-1% by weight, based on the total weight of the photopolymerizable composition.

If desired, the compositions of the disclosure may contain other additives such as indicators, accelerators, surfactants, wetting agents, antioxidants, tartaric acid, chelating agents, buffering agents, and other similar ingredients that will be apparent to those skilled in the art. Additionally, medicaments or other therapeutic substances can be optionally added to the photopolymerizable compositions. Examples include, but are not limited to, fluoride sources, whitening agents, anticaries agents (e.g., xylitol), remineralizing agents (e.g., calcium phosphate compounds and other calcium sources and phosphate sources), enzymes, breath fresheners, anesthetics, clotting agents, acid neutralizers, chemotherapeutic agents, immune response modifiers, thixotropes, polyols, anti-inflammatory agents, antimicrobial agents, antifungal agents, agents for treating xerostomia, desensitizers, and the like, of the type often used in dental compositions.

Combinations of any of the above additives may also be employed. The selection and amount of any one such additive can be selected by one of skill in the art to accomplish the desired result without undue experimentation.

Photopolymerizable Compositions Comprising a (Meth) Acryl Component and a Polyester Component (e.g., Described in U.S. Application No. 62/769,081):

A suitable photopolymerizable composition comprises:
a) 30-70 parts by weight of monofunctional (meth)acrylate monomer, wherein a cured homopolymer of at least one monofunctional (meth)acrylate monomer has a $T_g$ of at least 60° C.; and
b) urethane (meth)acrylate polymer comprising polymerized units of an aliphatic polyester diol.

Monofunctional (Meth)Acrylate Monomer

In some embodiments, the monofunctional (meth)acrylate monomer comprises a cyclic moiety. Although the cyclic moiety may be aromatic, in typical embodiments, the cyclic moiety is a cycloaliphatic. Suitable monofunctional (meth) acrylate monomers include for instance and without limitation, tetrahydrofurfuryl methacrylate, 3,3,5-trimethylcyclohexyl (meth)acrylate, butyl-cyclohexyl(meth)acrylate, 2-decahydronapthyl (meth)acrylate, 1-adamantyl (meth) acrylate, dicyclopentadienyl (meth)acrylate, bornyl (meth) acrylate including isobornyl (meth)acrylate, dimethyl-1-adamantyl (meth)acrylate, and 3-tetracyclo[4.4.0.1.1] dodecyl methacrylate.

Urethane (Meth)Acrylate Polymer

Various polyester urethane (meth)acrylate polymers are commercially available. Other polyester urethane (meth) acrylate polymers can be synthesized. In typical embodiments, aliphatic polyester diols are utilized in the preparation of the polyester urethane (meth)acrylate polymer.

In some embodiments, the polyester diol has Formula (XI), as follows:

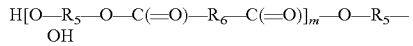

wherein $R_5$ and $R_6$ are independently straight or branched chain or cycle-containing alkylene, groups, that optionally include heteroatoms, such as oxygen. $R_5$ and $R_6$ independently comprise 2 to 40 carbon atoms. The subscript "m" is typically at least 2, 3, 4, 5, 6, or 7. The subscript "m" is typically no greater than 50, 45, 40, 35, 30, 25, 20, or 15. In some embodiments, the $R_5$ and $R_6$ are alkylene.

Representative polyester diols include for example neopentyl glycol adipate diol, butane diol adipate diol; 3-methyl-1,5-pentanediol adipate diol; and 3-methyl-1,5-pentanediol sebecate diol, and dimer acid based polyols in which the dimer acid is derived for example from dimerization of two 18 carbon diacids such as linoleic acid.

In some embodiments, such as the diols just described, the polyester diol comprises a single $R_5$ group (e.g. neopentyl or 3-methyl-1,5-pentyl) and a single $R_6$ group (e.g. adipate).

In other embodiments, the aliphatic polyester diol can be prepared from more than one diol and more than one acid. In this embodiment, the diol can contain two or more different $R_5$ groups and two or more different $R_6$ groups such as in the case of ethylene glycol-hexane diol/adipate-azelate copolyester diol.

In some embodiments, each of the $R_5$ and $R_6$ groups of Formula (XI) are alkylene groups independently comprising at least 4, 5, or 6 carbon atoms.

The value of m is chosen such that the molecular weight (Mn) of the diol is at least 500, 600, 700, 800, 900, or 1000 g/mole. In some embodiments, the molecular weight (Mn) of the diol is at least 1100, 1200, 1300, 1400, 1500 g/mole. In some embodiments, the molecular weight (Mn) of the diol is at least 1600, 1700, 1800, 1900, or 2000 g/mole. In some embodiments, the molecular weight (Mn) of the diol is no greater than 10,000; 9,000; 8,000; 7,000; 6,000; 5000; 4000; or 3000 g/mole. When the molecular weight is too low the elongation can be insufficient (i.e. less than 15-20%). The values of m, n, and o can vary widely due to the range of carbons for the $R_5$ and $R_6$ groups.

In one embodied synthetic route, the polyester urethane (meth)acrylate polymer is a reaction product of an aliphatic polyester diol; an (e.g. aliphatic and/or aromatic) diisocyanate, and an (e.g. aliphatic and/or aromatic) hydroxy functional (meth)acrylate.

Such polyester urethane (meth)acrylate polymer can be represented by the following Formula (XII):

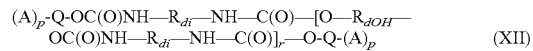

wherein, A has the formula —OC(=O)C($R_7$)=CH$_2$ wherein $R_7$ is H or alkyl of 1 (e.g. methyl) to 4 carbon atoms, p is 1 or 2, Q is a polyvalent organic linking group as described above, $R_{di}$ is the residue of a diisocyanate, $R_{doH}$ is the residue of a polyester polyol, and r averages from 1 to 15. In some embodiments, r is no greater than 15, 14, 13, 12, 11, or 10. In some embodiments, r averages at least 2, 3, 4, or 5. In some embodiments, A is methacrylate.

As evident by such formula, the polyester urethane (meth) acrylate polymer may comprise a central polymerized unit of an aliphatic polyester diol. The aliphatic polyester polymerized unit (derived from the diol) is bonded via urethane linkages formed from one of the isocyanate groups of polymerized units of diisocyanate. The polyester urethane (meth)acrylate polymer comprises terminal groups derived from reaction with a hydroxy functional (meth)acrylate and the opposing isocyanate group of the diisocyanate. When r is 1, the molar ratio of polymerized units of aliphatic polyester diol to polymerized units of diisocyanate is 1:2. When r is a value greater than 1, the molar ratio of polymerized units of aliphatic polyester diol to polymerized units of diisocyanate is 1:greater than 1. For example, when r is 10, the molar ratio of polymerized units of aliphatic polyester diol to polymerized units of diisocyanate is 10:11, or in other words 1:1.1.

One representative reaction product prepared from 2 equivalents of neopentyl glycol adipate based polyester diol, 4 equivalents of isophorone diisocyanate (IPDI), and 2 equivalents of hydroxyl ethyl methacrylate is as follows:

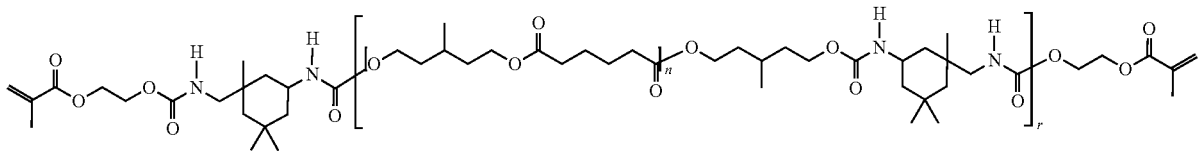

Although the reaction product can have a mixture of polyester urethane (meth)acrylate polymers, wherein r ranges from 1-10 as described above, in some embodiments, the major polyester urethane (meth)acrylate polymer of the above formulas is wherein r=1.

Photopolymerizable Compositions Comprising a (Meth) Acryl Component (e.g., Described in WO 2018/119026 (Parkar et al.)):

A suitable photopolymerizable composition comprises:

(a) 1 to 50 wt. %, inclusive, of a polymer;

(b) 5 to 50 wt. %, inclusive, of a polymerizable component;

(c) 10 to 80 wt. %, inclusive, of a temporary solvent;

(d) 0.1 to 5 wt. %, inclusive, of a photoinitiator; and (e) an optional inhibitor in an amount of 0.001 to 1 wt. %, inclusive, if present; based on the total weight of the printable composition.

Polymers

Suitable polymers for component (a) comprise for instance and without limitation, polyethylene (PE), poly(meth)acrylate, polypropylene, polyurethane, sulfopolyester, polycarbonate, polyethylene terephthalate (PET), a thermoplastic fluoropolymer, and combinations thereof. In select embodiments, the polymer comprises poly(meth)acrylate (e.g., poly(methylmethacrylate) (PMMA)).

Polymerizable Components

Suitable polymerizable components for component (b) contain at least one ethylenically unsaturated bond, and are capable of undergoing addition polymerization. Such free-radically polymerizable materials include mono-, di-, tri-, or other poly-acrylates and methacrylates such as methyl acrylate, methyl methacrylate, ethyl acrylate, isopropyl methacrylate, n-hexyl acrylate, stearyl acrylate, allyl acrylate, glycerol diacrylate, the diurethane dimethacrylate called UDMA (mixture of isomers, e.g., Röhm Plex 6661-0) being the reaction product of 2-hydroxyethyl methacrylate (HEMA) and 2,2,4-trimethylhexamethylene diisocyanate (TMDI), glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyl-dimethylmethane, and trishydroxyethyl-isocyanurate trimethacrylate; the bis-acrylates and bis-methacrylates of polyethylene glycols of molecular weight 200-500, copolymerizable mixtures of acrylated monomers such as those in U.S. Pat. No. 4,652,274 (Boettcher et al.), and acrylated oligomers such as those of U.S. Pat. No. 4,642,126 (Zador et al.); polyfunctional (meth)acrylates comprising urethane, urea or amide groups, as those of EP2008636 (Hecht et al.). The polymerizable component optionally includes urethane groups, epoxy groups, or both. The polymerizable component also may comprise silicone acrylate oligomers, epoxy (meth)acrylate oligomers, polyester (meth)acrylate oligomers or chlorinated polyester (meth)acrylates, allylic oligomers and (meth)acrylic oligomers. Mixtures of two or more of these free radically polymerizable materials can be used if desired.

Suitable temporary solvents of component (c) include one or more of water, propylene carbonate, methanol, isopropyl alcohol, and tripropylene glycol methyl ether (TPM), ethanol, acetone, ethyl acetate, methyl ethyl ketone, and mixtures thereof.

Photopolymerizable Compositions Comprising a Urethane Component (e.g., Described in International Application No. US2018/042595 (Parkar et al.)):

A suitable photopolymerizable composition comprises:

(a) 50 to 90 wt. %, inclusive, of at least one urethane component;

(b) 5 to 50 wt. %, inclusive, of at least one reactive diluent;

(c) 0.1 to 5 wt. %, inclusive, of a photoinitiator; and (d) an optional inhibitor in an amount of 0.001 to 1 wt. %, inclusive, if present; based on the total weight of the photopolymerizable composition.

Urethane Component

The "urethane component" of component (a) refers to a compound including one or more carbamate functionalities in the backbone of the compound. In certain embodiments, the carbamate functionality is of Formula (XIII):

—N(H)—C(O)O—    (XIII).

Urethanes are prepared by the reaction of an isocyanate with an alcohol to form carbamate linkages. Moreover, the term "polyurethane" has been used more generically to refer to the reaction products of polyisocyanates with any polyactive hydrogen compound including polyfunctional alcohols, amines, and mercaptans.

The at least one urethane component often comprises a urethane (meth)acrylate, a urethane acrylamide, or combinations thereof, and wherein the at least one urethane component comprises a linking group selected from alkyl, polyalkylene, polyalkylene oxide, aryl, polycarbonate, polyester, polyamide, and combinations thereof. As used herein, "linking group" refers to a functional group that connects two or more urethane groups. The linking group may be divalent, trivalent, or tetravalent. In select embodiments, the at least one urethane component comprises a urethane (meth)acrylate comprising a polyalkylene oxide linking group, a polyamide linking group, or combinations thereof.

Examples of commercially available urethane components include those available under the trade designations of EXOTHANE 108, EXOTHANE 8, and EXOTHANE 10 from Esstech Inc, and DESMA from 3M Company. DESMA is described in, e.g., paragraph [0135] and Table 3 of EP2167013B1 (Hecht et al.).

Reactive Diluent

The "reactive diluent," of component (b) is a component that contains at least one free radically reactive group (e.g., an ethylenically-unsaturated group) that can co-react with the at least one urethane component (e.g., is capable of undergoing addition polymerization). The reactive diluent has a smaller molecular weight than at least one (e.g., high Mn) urethane component, often less than 400 grams per mole, and does not contain any urethane functional groups (e.g., is free of any urethane functional groups).

In select embodiments, the at least one reactive diluent comprises a (meth)acrylate, a polyalkylene oxide di(meth)acrylate, an alkane diol di(meth)acrylate, or combinations thereof, such as a (meth)acrylate. The reactive diluent can comprise one or more poly(meth)acrylates, for example, di-, tri-, tetra- or pentafunctional monomeric or oligomeric aliphatic, cycloaliphatic or aromatic acrylates or methacrylates.

Another suitable class of free radical polymerizable compounds includes aromatic di(meth)acrylate compounds and trifunctional or higher functionality (meth)acrylate compound. Trifunctional or higher functionality meth(acrylates) can be tri-, tetra- or pentafunctional monomeric or oligomeric aliphatic, cycloaliphatic or aromatic acrylates or methacrylates.

In some cases, a reactive diluent comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis(4-hydroxycyclohexyl)propane, or bis(4-hydroxycyclohexyl)methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S. In some cases, a reactive diluent described herein comprises one or more higher functional acrylates or methacrylates such as dipentaerythritol monohydroxy pentaacrylate or bis(trimethylolpropane)tetraacrylate.

Photopolymerizable Compositions Comprising a Urethane Component (e.g., Described in International Application No. US2018/060014 (Parkar et al.)):

A suitable photopolymerizable composition comprises a blend of:
 a) 30 to 70 wt. %, inclusive, of at least one urethane component;
 b) 25 to 70 wt. %, inclusive, of at least one monofunctional reactive diluent, wherein the at least one monofunctional reactive diluent comprises at least one monofunctional reactive diluent having a $T_g$ of up to but not including 25 degrees Celsius;
 c) optionally at least one multifunctional reactive diluent in an amount of 1 to 30 wt. %, inclusive, if present, based on the total weight of the photopolymerizable composition;
 d) 0.1 to 5 wt. %, inclusive, of at least one initiator; and
 e) an optional inhibitor in an amount of 0.001 to 1 wt. %, inclusive, if present, based on the total weight of the photopolymerizable composition.

Urethane Component

The urethane component of component (a) may be as summarized above with respect to International Application No. PCT/US2018/042595 (Parkar et al.)).

Monofunctional Reactive Diluent

The monofunctional reactive diluent of component (b) has a $T_g$ of up to but not including 25° C., 20° C., 15° C., or 10° C. The inclusion of a low $T_g$ monofunctional reactive diluent tends to lower the $T_g$ of a reaction product of the photopolymerizable composition.

In some embodiments, the at least one monofunctional reactive diluent further comprises a second monofunctional reactive diluent, wherein the second monofunctional reactive diluent has a $T_g$ of 25° C. or greater, 30° C. or greater, 35° C. or greater, or 40° C. or greater. The $T_g$ may be 80° C. or less. In some embodiments, a balance of physical properties (e.g., strength and elongation at break) can be obtained in a polymerized article when including both a monofunctional reactive diluent having a $T_g$ of less than 25° C. and a monofunctional reactive diluent having a $T_g$ of 25° C. or greater.

In select embodiments, the (at least one) monofunctional reactive diluent comprises a (meth)acrylate, an alkyl (meth)acrylate, a phenoxy (meth)acrylate, a hydroxy alkyl (meth)acrylate, or a combination thereof. In some preferred embodiments, the monofunctional reactive diluent comprises phenoxy ethyl methacrylate.

Suitable free-radically polymerizable monofunctional diluents include phenoxy ethyl(meth)acrylate, phenoxy-2-methylethyl(meth)acrylate, phenoxyethoxyethyl(meth)acrylate, 3-hydroxy-2-hydroxypropyl(meth)acrylate, benzyl (meth)acrylate, phenylthio ethyl acrylate, 2-naphthylthio ethyl acrylate, 1-naphthylthio ethyl acrylate, 2,4,6-tribromophenoxy ethyl acrylate, 2,4-dibromophenoxy ethyl acrylate, 2-bromophenoxy ethyl acrylate, 1-naphthyloxy ethyl acrylate, 2-naphthyloxy ethyl acrylate, phenoxy 2-methylethyl acrylate, phenoxyethoxyethyl acrylate, 3-phenoxy-2-hydroxy propyl acrylate, 2,4-dibromo-6-sec-butylphenyl acrylate, 2,4-dibromo-6-isopropylphenyl (meth)acrylate, benzyl (meth)acrylate, phenyl (meth)acrylate, tetrahydrofurfuryl (meth)acrylate, alkoxylated tetrahydrofurfuryl acrylate, ethoxylated nonyl phenol (meth)acrylate, alkoxylated lauryl (meth)acrylate, alkoxylated phenol (meth)acrylate, stearyl (meth)acrylate, tetrahydrofurfuryl (meth)acrylate, lauryl (meth)acrylate, isodecyl (meth)acrylate, isooctyl (meth)acrylate, octadecyl (meth)acrylate, tridecyl (meth)acrylate, ethoxylated (4) nonyl phenol (meth)acrylate, caprolactone (meth)acrylate, cyclic trimethylolpropane formal (meth)acrylate, 3,3,5-trimethylcyclohexyl (meth)acrylate, dicyclopentadienyl (meth)acrylate, isobutyl (meth)acrylate, n-butyl (meth)acrylate, ethyl hexyl (meth)acrylate, isobornyl (meth)acrylate, and 2,4,6-tribromophenyl (meth)acrylate.

Multifunctional Reactive Diluent

The optional multifunctional reactive diluent of component (c) may include di-, tri-, or other poly-acrylates and methacrylates such as glycerol diacrylate, ethoxylated bisphenol A dimethacrylate (D-zethacrylate), tetraethylene glycol dimethacrylate (TEGDMA), polyethyleneglycol dimethacrylate (PEGDMA), glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethylmethane, and trishydroxyethyl-isocyanurate trimethacrylate; bis-acrylates of polyesters (e.g., methacrylate-terminated polyesters); the bis-acrylates and bis-methacrylates of polyethylene glycols of molecular weight 200-500, copolymerizable mixtures of acrylated monomers such as those in U.S. Pat. No. 4,652,274 (Boettcher et al.), and acrylated oligomers such as those of U.S. Pat. No. 4,642,126 (Zador et al.); polyfunctional (meth)acrylates comprising urea or amide groups, such as those of EP2008636 (Hecht et al.).

The reactive diluent can comprise one or more poly(meth)acrylates, for example, di-, tri-, tetra- or pentafunctional monomeric or oligomeric aliphatic, cycloaliphatic or aromatic acrylates or methacrylates. Another suitable class of free radical polymerizable compounds includes aromatic di(meth)acrylate compounds and trifunctional or higher functionality (meth)acrylate compound. Trifunctional or higher functionality meth(acrylates) can be tri-, tetra- or pentafunctional monomeric or oligomeric aliphatic, cycloaliphatic or aromatic acrylates or methacrylates.

Photopolymerizable Compositions Comprising a Polyalkylene Oxide Component (e.g., Described in WO 2019/175716 (Abuelyaman et al.)):

A suitable photopolymerizable composition comprises a blend of:
 a) 1 to 80 wt. %, inclusive, of at least one polypropylene oxide component based on the total weight of the photopolymerizable composition, the polypropylene oxide component comprising i) two (meth)acryl groups; ii) one polypropylene oxide segment; and iii) at least two functional groups selected from oxycarbonylamino, oxycarbonyl, amino carbonyloxy, carbonyloxy, amino carbonylamino, aminocarbonyl, carbonylamino, and combinations thereof;

b) optionally 30 wt. % or greater of at least one urethane component, if present, based on the total weight of the photopolymerizable composition; with the proviso that when the at least one urethane component is not present the at least one polypropylene oxide component comprises at least two functional groups selected from oxycarbonylamino, amino carbonyloxy, and combinations thereof;

c) optionally at least one multifunctional reactive diluent in an amount of 1 to 30 wt. %, inclusive, if present, based on the total weight of the photopolymerizable composition;

d) 0.1 to 5 wt. %, inclusive, of at least one initiator; and e) an optional inhibitor in an amount of 0.001 to 1 wt. %, inclusive, if present, based on the total weight of the photopolymerizable composition.

Polypropylene Oxide Component

The "polypropylene oxide component" of component (a) refers to a compound including one or more polypropylene glycol functionalities in the backbone of the compound or polymer. The polypropylene glycol functionality is of the following Formula (XIV):

—CH$_2$CH(CH$_3$)O—       (XIV).

Various commercially available polypropylene oxide polyol materials are referred to by vendors as polypropylene glycol polyol materials. Polypropylene oxides can be prepared by the ring opening polymerization of propylene oxide, initiated by an alcohol and catalyzed by a base (e.g., potassium hydroxide).

The presence of two (or more) (meth)acryl groups helps ensure that the polypropylene oxide component reacts with at least one other (and preferably two) components of the photopolymerizable composition such that it would not be unreacted and able to leach out of the polymerized product. Optionally, the polypropylene oxide component comprises at least two functional groups selected from oxycarbonylamino, amino carbonyloxy, and combinations thereof. These functional groups act as linkers attaching the (meth) acryl groups to the polypropylene oxide segment. Often, the at least one polypropylene oxide component comprises at least two functional groups selected from oxycarbonylamino, oxycarbonyl, amino carbonyloxy, carbonyloxy, and combinations thereof.

Typically, the polypropylene oxide segment can have a molecular weight of 400 g/mol to 2,000 g/mol, 400 g/mol to 1,300 g/mol, or 1,000 g/mol to 2,000 g/mol.

In many embodiments, the polymerizable component can include at least one polypropylene oxide component of Formula (XV):

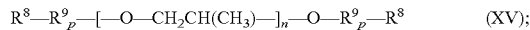
R$^8$—R$^9_p$—[—O—CH$_2$CH(CH$_3$)—]$_n$—O—R$^9_p$—R$^8$       (XV);

wherein n is an integer in a range of 5 to 70, inclusive (e.g., 5 to 60, 5 to 50, 5 to 40, 5 to 30, 5 to 20, 15 to 40, 15 to 30, or 15 to 20); R$^8$ is a monovalent group of Formula (XVI):

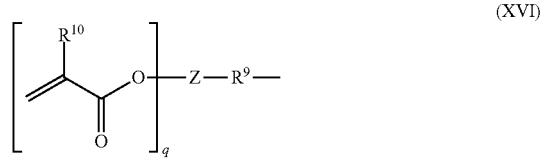
(XVI)

wherein R$^{10}$ is selected from H and CH$_3$; Z is a linking group with a valency of q+1, the linking group containing from 1 to 10 carbon atoms and optionally substituted by at least one of sulfur, nitrogen, and/or oxygen (e.g., examples of Z include linear, cyclic, and/or branched alkylene, with or without substitution of at least one carbon atom by an N, S, or O atom, sulfonyl group, nitro group, carbonyl group, or a combination thereof); q is 1 or 2; and R$^9$ is a divalent group of Formula (XVII), Formula (XVIII), Formula (XIV), or Formula (XX):

(XVII)

wherein R$_{11}$ and R$^{12}$ are independently selected from an alkylene, a heteroalkylene, an alkenediyl, and a heteroalkenediyl;

(XVIII)

wherein R$^{13}$ is an alkylene or an alkenediyl; and R$^{14}$ is H, an alkyl, a heteroalkyl, an alkenyl, or a heteroalkenyl;

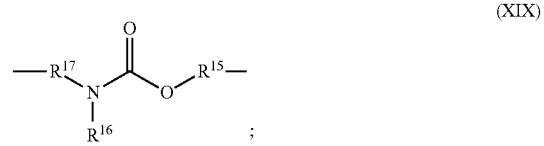
(XIX)

wherein R$^{15}$ and R$^{17}$ are independently selected from an alkylene, a heteroalkylene, an alkenediyl, and a heteroalkenediyl; and R$^{16}$ is H, an alkyl, a heteroalkyl, an alkenyl, or a heteroalkenyl; and

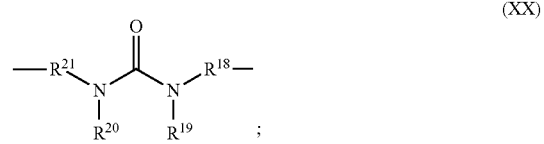
(XX)

wherein R$^{18}$ and R$^{21}$ are independently selected from an alkylene, a heteroalkylene, an alkenediyl, and a heteroalkenediyl; and R$^{19}$ and R$^{20}$ are independently selected from H, an alkyl, a heteroalkyl, an alkenyl, and a heteroalkenyl; p is 0 or 1; and R$^9$ is of Formula (XVII), Formula (XVIII), Formula (XIX), or Formula (XX), wherein the R groups are as defined above for each of Formula (XVII), Formula (XVIII), Formula (XIX), or Formula (XX). In some select embodiments, p is 0, whereas in other select embodiments, p is 1.

Urethane Component

The urethane component of component (b) may be as summarized above with respect to International Application No. PCT/US2018/042595 (Parkar et al.)).

Multifunctional Component

The optional multifunctional component of component (c) may be as summarized above with respect to International Application No. US2018/060014 (Parkar et al.)).

Photopolymerizable Compositions Comprising a Thiol Component in Combination with an Ene Component (e.g., Described in International Application No. IB2019/054158 (Hoffman et al.)):

A suitable photopolymerizable composition comprises:
(a) mercapto-functional Component A comprising at least three mercapto moieties;
(b) crosslinker Component B with at least three vinyl or allyl moieties; and
(c) photo-initiator(s) Component C for initiating a curing reaction between Component A and Component B.

Typically, the composition does not contain more than 4 wt. % of urethane (meth)acrylate oligomers, based on the total weight of the photopolymerizable composition.

Mercapto-Functional Component A

Generally, the mercapto-functional Component A may have the formula $R^{22}$—(SH)$_n$, with $R^{22}$ being an organic radical which is preferably free from ethylenically unsaturated double bonds and n being an integer from 3 to 12 or 3 to 8 or 3 to 6 or 3 to 4. Suitable mercapto-functional components are, for example, polyoxyalkylene triols with mercaptan end moieties. Also useful are the esters of mercaptocarboxylic acids with at least trifunctional alcohols. Examples of this compound class are the mercaptocarboxylic acid esters of trimethylol propane and of pentaerythritol. The mercaptocarboxylic acids used here have carbon skeletons having 2 to 20 carbon atoms, preferably 5 to 15 carbon atoms.

Non-limiting examples of mercapto-functional components include pentaerythritol tetra(3-mercaptopropionate) (PETMP), dipentaerythritol hexa(3-mercaptopropionate) (DiPETMP), trimethylol-propane tri(3-mercaptopropionate) (TMPMP), pentaerythritol tetramercaptoacetate (PETMA), trimethylol-propane trimercaptoacetate (TMPMA), ethoxylated trimethylolpropane tri(3-mercaptopropionate) (ETTMP), propyleneglycol 3-mercaptopropionate (PPGMP), trisp-(3-mercaptopropionyloxy)ethyllisocyanurate (TEMPIC), polycaprolactone tetra 3-mercaptopropionate, 2,3-di((2-mercaptoethyl)thio)-1-propane-thiol (DMPT), pentaerythritol tetrakis(3-mercaptobutylate), and 1,3,5-tris(3-mercaptobutyloxethyl)-1,3,5-triazine-2,4,6(1H, 3H,5H)-5 trione.

Examples of mercapto-functional polyorganosiloxanes include poly(mercaptobutyl)methylsiloxane, poly(mercaptopropyl)methylsiloxane, poly(mercaptoethyl)methylsiloxane, poly-(mercaptomethyl)methylsiloxane, co-poly (merctaptopropyl)methylsiloxane dimethylsiloxane, and mixtures thereof.

Crosslinker Component B

The crosslinker Component B comprises at least 3 vinyl or allyl moieties. Crosslinker components comprising 3 ally moieties can be preferred, as these moieties may have a higher reactivity toward the mercapto moiety of Component A compared to vinyl moieties. The poly-ene may for example have the following structure:

(A)-(X)$_m$, wherein m is at least 3, 4, 5 or 6, and X is selected from the group consisting of —[CR$_2$]$_f$—CR$^{23}$=CR$^{23}$—R$^{23}$ wherein f is an integer from 0 to 9 and R$^{23}$ can be H, F, Cl, furyl, thienyl, pyridyl, phenyl and substituted phenyl, benzyl and substituted benzyl, alkyl and substituted alkyl, alkoxy and substituted alkoxy as well as cycloalkyl and substituted cycloalkyl and in each case may be the same or different, and wherein (A) is an at least trifunctional organic radical which comprises the atoms selected from the group consisting of C, O, N, S, Si and H, with the proviso that urethane (meth) acrylate moieties or (meth)acrylate moieties are not comprised.

Suitable crosslinker components also include the allyl and/or vinyl esters of at least trifunctional carboxylic acids. Suitable as carboxylic acids for this purpose are those with carbon chains of 2 to 20 carbon atoms; also well-suited are allyl and vinyl esters of aromatic tricarboxylic acids such as citric acid, tri-mesic acid and tri-mellitic acid. Suitable are also the allyl ethers of polyfunctional alcohols, for example polyether poly-ols, their copolymers or also copolymers of ethylene oxide and tetrahydrofuran. Preferred are sometimes the allyl ethers of trifunctional alcohols. Examples which can be named are the allyl ethers of trimethylol propane or pentaerythritol or 2,2-bis-oxyphenyl propane-bis-(diallylphosphate). Also well-suited are triallyl-functionalized compounds of the type cyanuric acid, triazine trione and the like, in particular 1,3,5-Triallyl-1,3,5-triazine-2,4,6(1H,3H, 5H)-trione, and mixtures thereof Additional Components In addition to the various photopolymerizable compositions described and/or summarized above, photopolymerizable compositions useful in methods of the present disclosure include commercially available photopolymerizable compositions such as the photoreactive resin under the trade designation "DENTAL LT CLEAR" available from formlabs (Sommerville, MA), which is reported to include methacrylic oligomer and glycol methacrylate. Other components can be included in various combinations, and are described in more detail below.

Amide Component

Suitable amide components to include in the photopolymerizable composition include for instance and without limitation, methacrylamide, N-alkyl substituted and N,N-dialkyl substituted acrylamides or methacrylamides where the alkyl group has up to 3 carbons (e.g., N—(C$_1$-C$_3$)alkyl-substituted methacrylamide, N,N-di(C$_1$-C$_3$)alkyl-substituted acrylamide, N,N-di(C$_1$-C$_3$)alkyl-substituted methacrylamide), 2-hydroxyethyl acrylate (HEA), and 2-hydroxypropyl acrylate (HPA), 4-hydroxybutylacrylate, 2-ethoxyethoxyethyl acrylate, 2-methoxyethoxyethylacrylate, acrylamide (Acm), N-morpholino acrylate (MoA), diacetoneacrylamide, and N-t-octylacrylamide.

Alkylene Component

Suitable alkylene components to include in the photopolymerizable composition include for instance and without limitation, linear saturated divalent hydrocarbon materials having from one to twelve carbon atoms and branched saturated divalent hydrocarbon radicals having from three to twelve carbon atoms, e.g., methylene, ethylene, propylene, 2-methylpropylene, pentylene, hexylene, and the like.

Epoxy Component

Suitable cationically polymerizable components include cyclic ether compounds such as epoxy compounds and oxetanes, cyclic lactone compounds, cyclic acetal compounds, cyclic thioether compounds, spiro orthoester compounds, and vinylether compounds. Epoxy components are particularly suitable. Specific examples of cationically polymerizable components include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resins, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy)-cyclohexane-1,4-dioxane, bis(3,4-epoxycyclohexylmethyl)adipate, vinylcyclohexene oxide, 4-vinylepoxycyclohexane, vinylcyclohexene dioxide, limonene oxide, limonene dioxide, bis(3,4-epoxy-6-methylcyclohexylmethyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'-epoxycyclohexane carboxylates, trimethylcaprolactone-modified 3,4-epoxycyclohexylmethyl-3',4'-epoxycyclohexane carboxylates, β-methyl-δ-valerolactone-modified 3,4-epoxycyclohexcylmethyl-3',4'-epoxycyclohexane carboxylates, methylenebis(3,4-epoxycyclohexane), bicyclohexyl-3,3'-epoxide, bis(3,4-epoxycyclohexyl) with a linkage of —O—, —S—, —SO—, —SO$_2$—, —C(CH$_3$)$_2$—, —CBr$_2$—, —C(CBr$_3$)$_2$—, —C(CF$_3$)$_2$—, —C(CCl$_3$)$_2$—, or —CH(C$_6$H$_5$)—, dicyclopentadiene diepoxide, di(3,4-epoxycyclohexylmethyl) ether of ethylene glycol, ethylenebis(3,4-epoxycyclohexanecarboxylate), epoxyhexahydrodioctylphthalate, epoxyhexahydro-di-2-ethylhexyl phthalate, 1,4-butanediol diglycidyl ether, 1,6-hexanediol diglycidyl ether, neopentylglycol diglycidyl ether, glycerol triglycidyl ether, trimethylolpropane triglycidyl ether, polyethylene glycol diglycidyl ether, polypropylene glycol diglycidyl ether, diglycidyl esters of aliphatic long-chain dibasic acids, monoglycidyl ethers of aliphatic higher alcohols, monoglycidyl ethers of phenol, cresol, butyl phenol, or polyether alcohols obtained by the addition of alkylene oxide to these compounds, glycidyl esters of higher fatty acids, epoxidated soybean oil, epoxybutylstearic acid, epoxyoctylstearic acid, epoxidated linseed oil, epoxidated polybutadiene, 1,4-bis[(3-ethyl-3-oxetanylmethoxy)methyl]benzene, 3-ethyl-3-hydroxymethyloxetane, 3-ethyl-3-(3-hydroxypropyl)oxymethyloxetane, 3-ethyl-3-(4-hydroxybutyl)oxymethyloxetane, 3-ethyl-3-(5-hydroxypentyl)oxymethyloxetane, 3-ethyl-3-phenoxymethyloxetane, bis((1-ethyl(3-oxetanyl))methyl)ether, 3-ethyl-3-((2-ethylhexyloxy)methyl)oxetane, 3-ethyl-((triethoxysilylpropoxymethyl)oxetane, 3-(meth)-allyloxymethyl-3-ethyloxetane, 3-hydroxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]-benzene, [1-(3-ethyl-3-oxetanylmethoxy)ethyl]phenyl ether, isobutoxymethyl(3-ethyl-3-oxetanylmethyl)ether, 2-ethylhexyl(3-ethyl-3-oxetanylmethyl)ether, ethyldiethylene glycol(3-ethyl-3-oxetanylmethyl)ether, dicyclopentadiene (3-ethyl-3-oxetanylmethyl)ether, dicyclopentenyloxyethyl (3-ethyl-3-oxetanylmethyl)ether, dicyclopentenyl(3-ethyl-3-oxetanylmethyl)ether, tetrahydrofurfuyl(3-ethyl-3-oxetanylmethyl)ether, 2-hydroxyethyl(3-ethyl-3-oxetanylmethyl) ether, 2-hydroxypropyl(3-ethyl-3-oxetanylmethyl)ether, and any combination thereof.

A cationically polymerizable component may optionally also contain polyfunctional materials including dendritic polymers such as dendrimers, linear dendritic polymers, dendrigraft polymers, hyperbranched polymers, star branched polymers, and hypergraft polymers with epoxy or oxetane functional groups. The dendritic polymers may contain one type of polymerizable functional group or different types of polymerizable functional groups, for example, epoxy and oxetane functions.

In an embodiment, the epoxide is 3,4-epoxycyclohexylmethyl-3',4-epoxycyclohexanecarboxylate (available as CELLOXIDE 2021P from Daicel Chemical, or as CYRACURE UVR-6105 from Dow Chemical), hydrogenated bisphenol A-epichlorohydrin based epoxy resin (available as EPON 1510 from Momentive), 1,4-cyclohexanedimethanol diglycidyl ether (available as HELOXY 107 from Momentive), a hydrogenated bisphenol A diglycidyl ether (available as EPON 825 from Momentive), and any combination thereof.

In some embodiments, one or more hydroxyl components are used in combination with an epoxy component. Suitable hydroxyl components having a hydroxyl functionality of 1 include alkanols, monoalkyl ethers of polyoxyalkyleneglycols, mohoalkyl ethers of alkyleneglycols, and others, and combinations thereof.

Suitable monomeric polyhydroxy organic materials include alkylene and arylalkylene glycols and polyols, such as 1,2,4-butanetriol, 1,2,6-hexanetriol, 1,2,3-heptanetriol, 2,6-dimethyl-1,2,6-hexanetriol, (2R,3R)-(−)-2-benzyloxy-1,3,4-butanetriol, 1,2,3-hexanetriol, 1,2,3-butanetriol, 3-methyl-1,3,5-pentanetriol, 1,2,3-cyclohexanetriol, 1,3,5-cyclohexanetriol, 3,7,11,15-tetramethyl-1,2,3-hexadecanetriol, 2-hydroxymethyltetrahydropyran-3,4,5-triol, 2,2,4,4-tetramethyl-1,3-cyclobutanediol, 1,3-cyclopentanediol, trans-1,2-cyclooctanediol, 1,16-hexadecanediol, 3,6-dithia-1,8-octanediol, 2-butyne-1,4-diol, 1,3-propanediol, 1,4-butanediol, 1,5-pentanediol, 1,6-hexanediol, 1,7-heptanediol, 1,8-octanediol, 1,9-nonanediol, 1-phenyl-1,2-ethanediol, 1,2-cyclohexanediol, 1,5-decalindiol, 2,5-dimethyl-3-hexyne-2,5-diol, 2,7-dimethyl-3,5-octadiyne-2-7-diol, 2,3-butanediol, 1,4-cyclohexanedimethanol, and combinations thereof.

Suitable oligomeric and polymeric hydroxyl components include polyoxyethylene and polyoxypropylene glycols and triols of molecular weights from about 200 to about 10,000; polytetramethylene glycols of varying molecular weight; poly(oxyethylene-oxybutylene) random or block copolymers; copolymers containing pendant hydroxy groups formed by hydrolysis or partial hydrolysis of vinyl acetate copolymers, polyvinylacetal resins containing pendant hydroxyl groups; hydroxy-terminated polyesters and hydroxy-terminated polylactones; hydroxy-functionalized polyalkadienes, such as polybutadiene; aliphatic polycarbonate polyols, such as an aliphatic polycarbonate diol; and hydroxy-terminated polyethers, and combinations thereof.

If present, suitable hydroxyl-containing monomers include 1,4-cyclohexanedimethanol and aliphatic and cycloaliphatic monohydroxy alkanols. Suitable hydroxyl-containing oligomers and polymers also include hydroxyl and hydroxyl/epoxy functionalized polybutadiene, polycaprolactone diols and triols, ethylene/butylene polyols, monohydroxyl functional monomers, polypropylene glycols of various molecular weights, and glycerol propoxylate-B-ethoxylate triol.

If present, the photopolymerizable composition preferably comprises, relative to the total weight of the resin composition, in an amount of 2 wt. % to 10 wt. % of one or more hydroxyl components.

Additional Photoinitiators

In some embodiments, a cationic photoinitiator is present in compositions that include epoxy component, for example. Further, a thermal initiator can optionally be present in a photopolymerizable composition described herein. For instance, a free-radical photoinitiator, a cationic photoinitiator, a thermal photoinitiator, or any combination thereof may be present in a photopolymerizable composition.

Suitable cationic photoinitiators include for instance and without limitation, bis[4-diphenylsulfoniumphenyl]sulfide bishexafluoroantimonate; thiophenoxyphenylsulfonium hexafluoroantimonate (available as CHIVACURE 1176 from Chitec (Houston, TX), tris(4-(4-acetylphenyl)thiophenyl)sulfonium tetrakis(pentafluorophenyl)borate, tris(4-(4-acetylphenyl)thiophenyl)sulfonium tris[(trifluoromethyl)sulfonyl]methide, and tris(4-(4-acetylphenyl)thiophenyl)sulfonium hexafluorophosphate, [4-(1-methylethyl)phenyl](4-methylphenyl) iodonium tetrakis(pentafluorophenyl)borate, 4-[4-(2-chlorobenzoyl)phenylthio]phenylbis(4-fluorophenyl)sulfonium hexafluoroantimonate, and aromatic sulfonium salts with anions of $(PF_{6-m}(C_nF_{2n+1})_m)^-$ where m is an integer from 1 to 5, and n is an integer from 1 to 4 (available as CPI-200K or CPI-200S, which are monovalent sulfonium salts from San-Apro Ltd., (Kyoto, JP) TK-1 available from San-Apro Ltd., or HS-1 available from San-Apro Ltd.)

In some embodiments, a photoinitiator is present in a photopolymerizable composition in an amount of up to about 5% by weight, based on the total weight of polymerizable components in the photopolymerizable composition. In some cases, a photoinitiator is present in an amount of about 0.1-5% by weight, 0.2-5% by weight, or 0.5-5% by weight, based on the total weight of the photopolymerizable composition.

In some embodiments, a thermal initiator is present in a photopolymerizable composition or in an amount of up to about 5% by weight, based on the total weight of polymerizable components in the photopolymerizable composition. In some cases, a thermal initiator is present in an amount of about 0.1-5% by weight, based on the total weight of polymerizable components in the photopolymerizable composition. Suitable thermal initiators include for instance and without limitation, peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2-azo-bis(isobutyronitrile), and t-butyl perbenzoate. Examples of commercially available thermal initiators include initiators available from DuPont Specialty Chemical (Wilmington, DE) under the VAZO trade designation including VAZO 67 (2,2'-azo-bis(2-methybutyronitrile)) VAZO 64 (2,2'-azo-bis(isobutyronitrile)) and VAZO 52 (2,2'-azo-bis(2,2-dimethyvaleronitrile)), and LUCIDOL 70 from Elf Atochem North America, Philadelphia, PA.

In some embodiments of compositions including free-radically polymerizable components, the composition contains a first free-radical photoinitiator having sufficient absorbance at a first wavelength range; and a second free-radical initiator selected from a second photoinitiator having sufficient absorbance at a second wavelength range, wherein the second wavelength range is different than the first wavelength range, or a thermal free-radical initiator. Some suitable first free-radical photoinitiators include for instance and without limitation, acyl phosphine oxide and alkyl amine acetophenone. Some suitable second free-radical photoinitiators include for instance and without limitation, photoinitiators comprising photoinitiator groups selected from benzil ketal or hydroxy-acetophenone. Suitable thermal free-radical initiators may include a peroxide or azo group. Additional details regarding such combinations of a first free-radical photoinitiator with either a thermal free-radical initiator or a second free-radical photoinitiator are described in co-owned International Application No. PCT/US2018/062085 (Chakraborty et al.).

In some embodiments of compositions including free-radically polymerizable components, the composition contains a polymer or macromolecule comprising a free-radical photoinitiator group, for instance including a polymer or macromolecule backbone and pendent photoinitiator groups. Suitable photoinitiator groups include for instance and without limitation, a hydroxy or alkyl amino acetophenone photoinitiator. Additional details regarding such polymers and macromolecules comprising a free-radical photoinitiator group are described in co-owned International Application No. PCT/US2018/062074 (Chakraborty et al.).

In certain aspects, the use of more than one initiator assists in increasing the percentage of monomer that gets incorporated into the reaction product of polymerizable components and thus decreasing the percentage of the monomer that remains uncured.

Orthodontic Articles

A polymerized reaction product of a photopolymerizable composition according to the above disclosure comprises a shape of an orthodontic article.

In a second aspect, an orthodontic article is provided. The orthodontic article is prepared by the methods according to the first aspect, as described in detail above.

In a third aspect, another orthodontic article is provided. The orthodontic article includes a plurality of layers of at least one photopolymerized crosslinked polymer. The orthodontic article has a first surface, and no more than 75% of the first surface has a slope magnitude greater than 2.5 degrees.

In a fourth aspect, a further orthodontic article is provided. The orthodontic article includes a plurality of layers of at least one photopolymerized crosslinked polymer. The orthodontic article includes 0.05% by weight or less of extractable components, based on the total weight of the orthodontic article, when extracted with 5 volume percent ethanol in water.

The photopolymerized crosslinked polymer is a reaction product of components of a photopolymerizable composition. The components of the photopolymerizable composition are as discussed in detail above. In many embodiments, the photopolymerizable composition is cured (and crosslinked) using actinic radiation comprising UV radiation, e-beam radiation, visible radiation, or a combination thereof. Moreover, the method optionally further comprises post curing the orthodontic article using actinic radiation.

When the orthodontic article comprises a plurality of layers including an outer layer comprising a polymer that is different from the polymer of a layer adjacent to the outer layer, often the outer layer includes a polymer selected from the group consisting of a (meth)acryl polymer, a thioether polymer, an epoxy polymer, or combinations thereof.

In certain embodiments, the method comprises vat polymerization of the photopolymerizable composition. When vat polymerization is employed, the radiation may be directed through a wall of a container (e.g., a vat) holding the photopolymerizable composition, such as a side wall or a bottom wall.

A photopolymerizable composition described herein in a cured state, in some embodiments, can exhibit one or more desired properties. A photopolymerizable composition in a "cured" state can comprise a photopolymerizable composition that includes a polymerizable component that has been at least partially polymerized and/or crosslinked. For instance, in some instances, a cured article is at least about 10% polymerized or crosslinked or at least about 30% polymerized or crosslinked. In some cases, a cured photopolymerizable composition is at least about 50%, at least about 70%, at least about 80%, or at least about 90% polymerized or crosslinked. A cured photopolymerizable composition can also be between about 10% and about 99% polymerized or crosslinked.

Fabricating an Orthodontic Appliance with the Photopolymerizable Compositions

The following describes general methods for creating an orthodontic aligner as printed appliance 300. However, other dental and orthodontic articles can be created using similar techniques and the photopolymerizable compositions of the present disclosure. Representative examples include, but are not limited to, the removable appliances having occlusal windows described in International Application Publication No. WO2016/109660 (Raby et al.), the removable appliances with a palatal plate described in US Publication No. 2014/0356799 (Cinader et al); and the resilient polymeric arch members described in International Application Publication Nos. WO2016/148960 and WO2016/149007 (Oda et al.) and US Publication No. 2008/0248442 (Cinader et al.), ceramic articles described in International Application Publication Nos. WO2016/191162 (Mayr et al), and molding techniques for forming a dental restoration in a mouth as described in WO2016/094272 (Hansen). Moreover, the photopolymerizable compositions can be used in the creation of indirect bonding trays, such as those described in International Publication No. WO2015/094842 (Paehl et al.) and US Publication No. 2011/0091832 (Kim, et al.) and other dental articles, including but not limited to crowns, bridges, veneers, inlays, onlays, fillings, and prostheses (e.g., partial or full dentures). Other orthodontic appliances and devices include, but not limited to, orthodontic brackets, buccal tubes, lingual retainers, orthodontic bands, class II and class III correctors, sleep apnea devices, bite openers, buttons, cleats, and other attachment devices.

Figure 3:
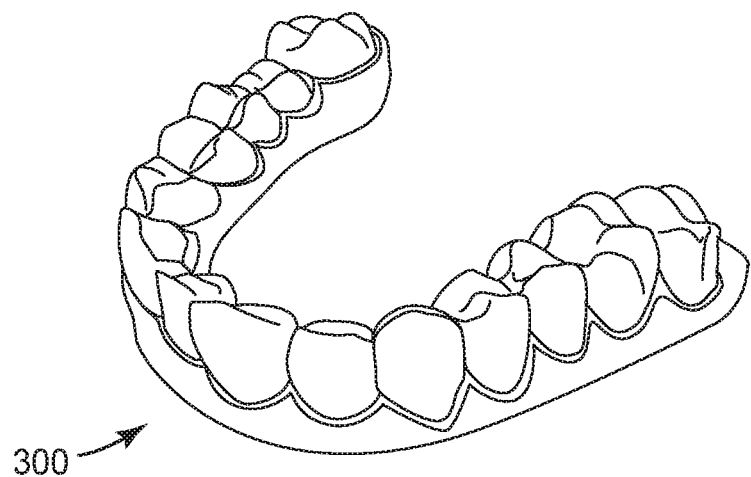
FIG. 3 is an isometric view of a printed orthodontic aligner, according to one embodiment of the present disclosure.

One particularly interesting implementation of an article is generally depicted in FIG. 3. The additive manufactured article 300 is an orthodontic aligner and is removably positionable over some or all of a patient's teeth. In some embodiments, the appliance 300 is one of a plurality of incremental adjustment appliances. The appliance 300 may comprise a shell having an inner cavity. The inner cavity is shaped to receive and resiliently reposition teeth from one tooth arrangement to a successive tooth arrangement. The inner cavity may include a plurality of receptacles, each of which is adapted to connect to and receive a respective tooth of the patient's dental arch. The receptacles are spaced apart from each other along the length of the cavity, although adjoining regions of adjacent receptacles can be in communication with each other. In some embodiments, the shell fits over all teeth present in the upper jaw or lower jaw. Typically, only certain one(s) of the teeth will be repositioned while others of the teeth will provide a base or anchor region for holding the dental appliance in place as it applies the resilient repositioning force against the tooth or teeth to be treated.

In order to facilitate positioning of the teeth of the patient, at least one of the receptacles may be aligned to apply rotational and/or translational forces to the corresponding tooth of the patient when the appliance 300 is worn by the patient in order to eventually align said tooth to a new desired position. In some particular examples, the appliance 300 may be configured to provide only compressive or linear forces. In the same or different examples, the appliance 300 may be configured to apply translational forces to one or more of the teeth within receptacles.

In some embodiments, the shell of the appliance 300 fits over some or all anterior teeth present in an upper jaw or lower jaw. Typically, only certain one(s) of the teeth will be repositioned while others of the teeth will provide a base or anchor region for holding the appliance in place as it applies the resilient repositioning force against the tooth or teeth to be repositioned. An appliance 300 can accordingly be designed such that any receptacle is shaped to facilitate retention of the tooth in a particular position in order to maintain the current position of the tooth.

Figure 4:
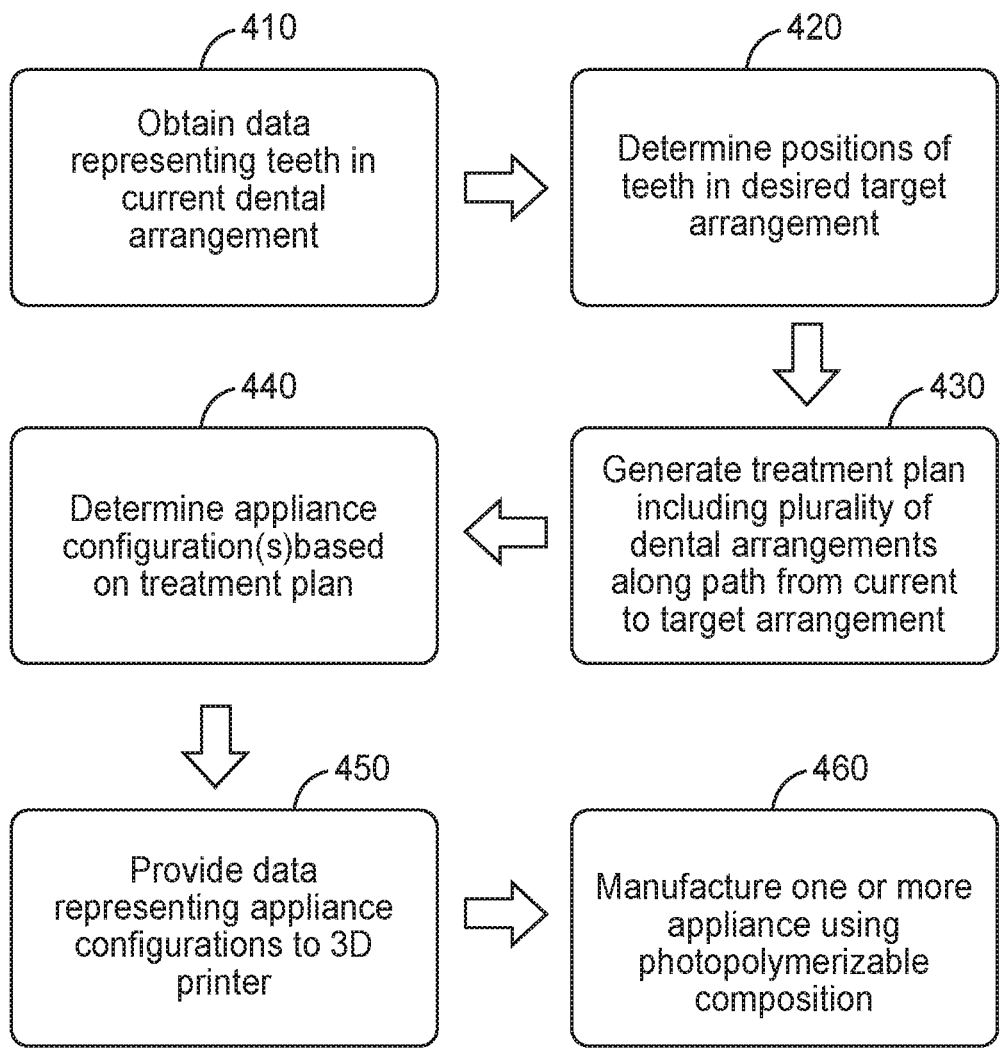
FIG. 4 is a flowchart of a process for manufacturing a printed orthodontic appliance according to the present disclosure.

A method 400 of creating an orthodontic appliance using the photopolymerizable compositions of the present disclosure can include general steps as outlined in FIG. 4. Individual aspects of the process are discussed in further detail below. The process includes generating a treatment plan for repositioning a patient's teeth. Briefly, a treatment plan can include obtaining data representing an initial arrangement of the patient's teeth (Step 410), which typically includes obtaining an impression or scan of the patient's teeth prior to the onset of treatment. The treatment plan will also include identifying a final or target arrangement of the patient's anterior and posterior teeth as desired (Step 420), as well as a plurality of planned successive or intermediary tooth arrangements for moving at least the anterior teeth along a treatment path from the initial arrangement toward the selected final or target arrangement (Step 430). One or more appliances can be virtually designed based on the treatment plan (Step 440), and image data representing the appliance designs can exported in STL format, or in any other suitable computer processable format, to an additive manufacturing device (e.g., a 3D printer system) (Step 450). An appliance can be manufactured using a photopolymerizable composition of the present disclosure retained in the additive manufacturing device (Step 460).

In some embodiments, a (e.g., non-transitory) machine-readable medium is employed in additive manufacturing of articles according to at least certain aspects of the present disclosure. Data is typically stored on the machine-readable medium. The data represents a three-dimensional model of an article, which can be accessed by at least one computer processor interfacing with additive manufacturing equipment (e.g., a 3D printer, a manufacturing device, etc.). The data is used to cause the additive manufacturing equipment to create an article comprising a reaction product of a photopolymerizable composition, and the polymerized reaction product of the photopolymerizable composition has a shape of the orthodontic article. Suitable photopolymerizable compositions are as described above.

Data representing an article may be generated using computer modeling such as computer aided design (CAD) data. Image data representing the (e.g., polymeric) article design can be exported in STL format, or in any other suitable computer processable format, to the additive manufacturing equipment. Scanning methods to scan a three-dimensional object may also be employed to create the data representing the article. One exemplary technique for acquiring the data is digital scanning. Any other suitable scanning technique may be used for scanning an article, including X-ray radiography, laser scanning, computed tomography (CT), magnetic resonance imaging (MRI), and ultrasound imaging. Other possible scanning methods are described, e.g., in U.S. Patent Application Publication No. 2007/0031791 (Cinader, Jr., et al.). The initial digital data set, which may include both raw data from scanning operations and data representing articles derived from the raw data, can be processed to segment an article design from any surrounding structures (e.g., a support for the article). In select embodiments, scanning techniques may include, for example, scanning a patient's mouth to customize an orthodontic article for the patient.

Figure 10:
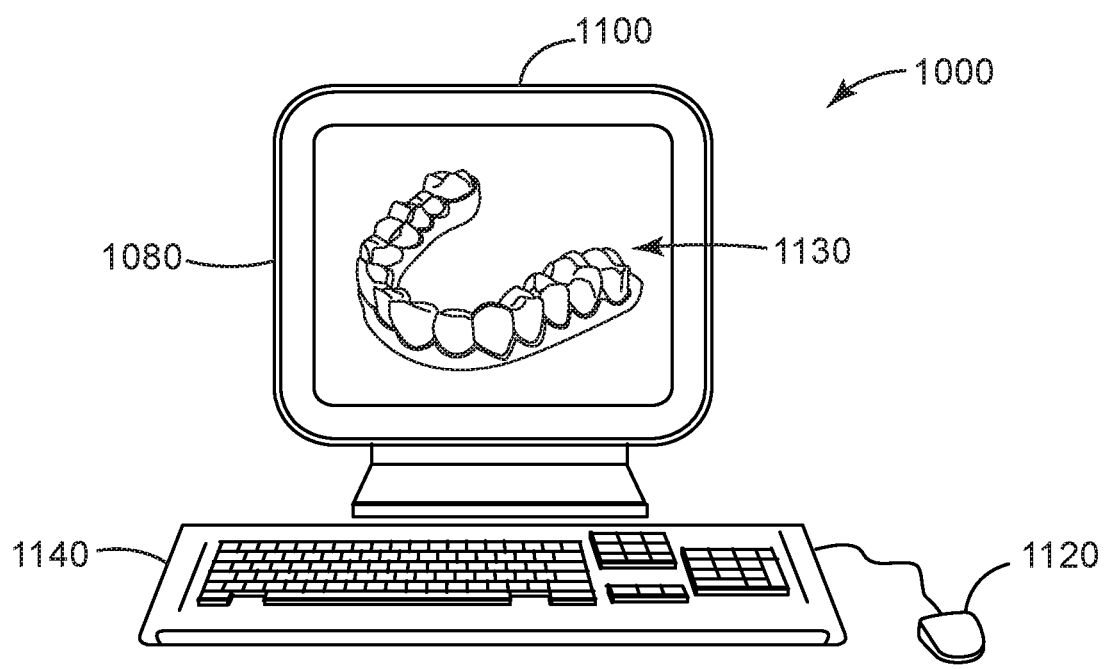
FIG. 10 is a schematic front view of an exemplary computing device 1000.

Often, machine-readable media are provided as part of a computing device. The computing device may have one or more processors, volatile memory (RAM), a device for reading machine-readable media, and input/output devices, such as a display, a keyboard, and a pointing device. Further, a computing device may also include other software, firmware, or combinations thereof, such as an operating system and other application software. A computing device may be, for example, a workstation, a laptop, a personal digital assistant (PDA), a server, a mainframe or any other general-purpose or application-specific computing device. A computing device may read executable software instructions from a computer-readable medium (such as a hard drive, a CD-ROM, or a computer memory), or may receive instructions from another source logically connected to computer, such as another networked computer. Referring to FIG. 10, a computing device 1000 often includes an internal processor 1080, a display 1100 (e.g., a monitor), and one or more input devices such as a keyboard 1140 and a mouse 1120. In FIG. 10, an aligner article 1130 is shown on the display 1100.

Figure 6:
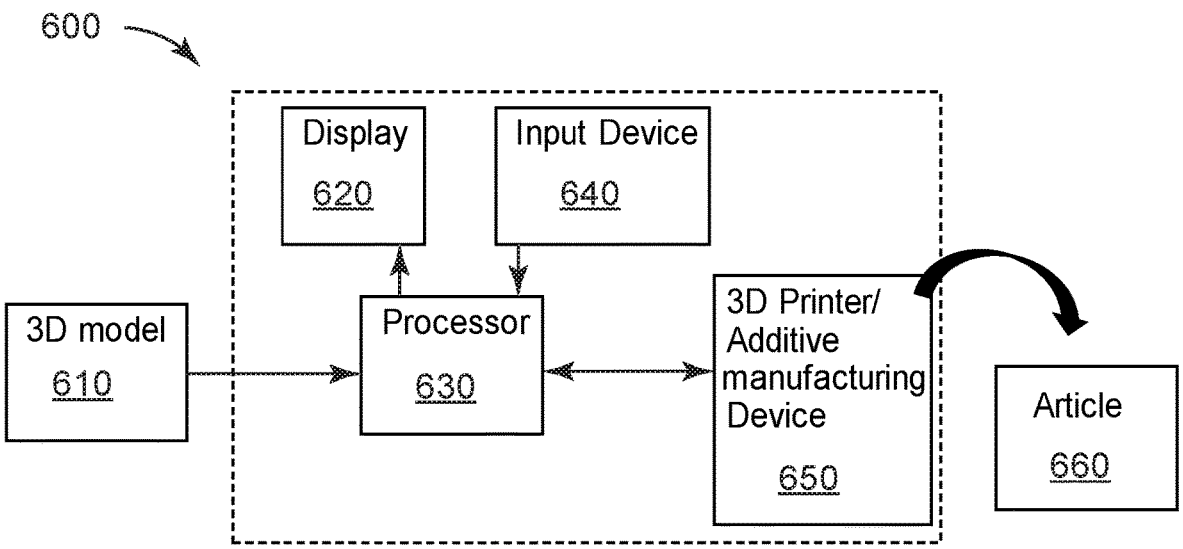
FIG. 6 is a block diagram of a generalized system 600 for additive manufacturing of an article.

Referring to FIG. 6, in certain embodiments, the present disclosure provides a system 600. The system 600 comprises a display 620 that displays a 3D model 610 of an article (e.g., an aligner 1130 as shown on the display 1100 of FIG. 10); and one or more processors 630 that, in response to the 3D model 610 selected by a user, cause a 3D printer/additive manufacturing device 650 to create a physical object of the article 660. Often, an input device 640 (e.g., keyboard and/or mouse) is employed with the display 620 and the at least one processor 630, particularly for the user to select the 3D model 610. The article 660 comprises a reaction product of a photopolymerizable composition, and the polymerized reaction product of the photopolymerizable composition has a shape of the orthodontic article. Suitable photopolymerizable composition are as described above.

Figure 7:
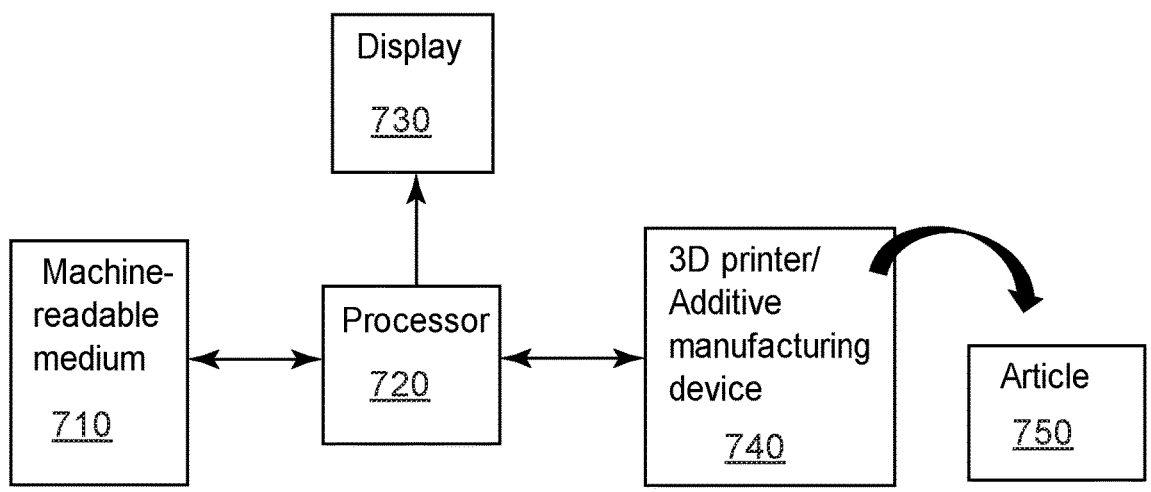
FIG. 7 is a block diagram of a generalized manufacturing process for an article.

Referring to FIG. 7, a processor 720 (or more than one processor) is in communication with each of a machine-readable medium 710 (e.g., a non-transitory medium), a 3D printer/additive manufacturing device 740, and optionally a display 730 for viewing by a user. The 3D printer/additive manufacturing device 740 is configured to make one or more articles 750 based on instructions from the processor 720 providing data representing a 3D model of the article 750 (e.g., an aligner article 1130 as shown on the display 1100 of FIG. 10) from the machine-readable medium 710.

Figure 8:
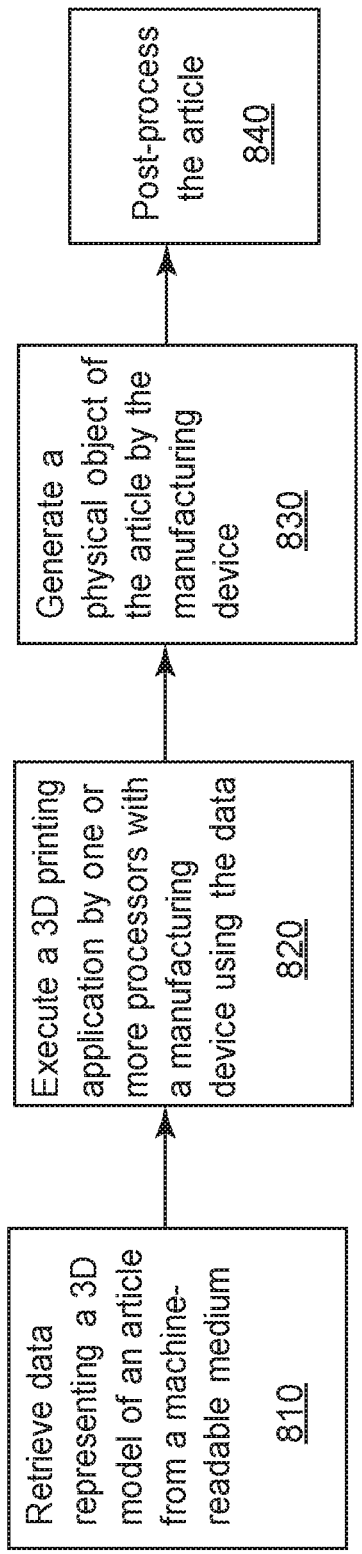
FIG. 8 is a high-level flow chart of an exemplary article manufacturing process.

Referring to FIG. 8, for example and without limitation, an additive manufacturing method comprises retrieving 810, from a (e.g., non-transitory) machine-readable medium, data representing a 3D model of an article according to at least one embodiment of the present disclosure. The method further includes executing 820, by one or more processors, an additive manufacturing application interfacing with a manufacturing device using the data; and generating 830, by the manufacturing device, a physical object of the article. The additive manufacturing equipment can selectively cure a photopolymerizable composition to form an article. The article comprises a reaction product of a photopolymerizable composition, and the polymerized reaction product of the photopolymerizable composition has a shape of the orthodontic article. The details of the photopolymerizable composition are as described above. One or more post-processing steps 840 is also undertaken (e.g., moving the article to generate a mass inertial force in uncured photopolymerizable composition). Typically, remaining unpolymerized photopolymerizable component will be cured.

Figure 9:
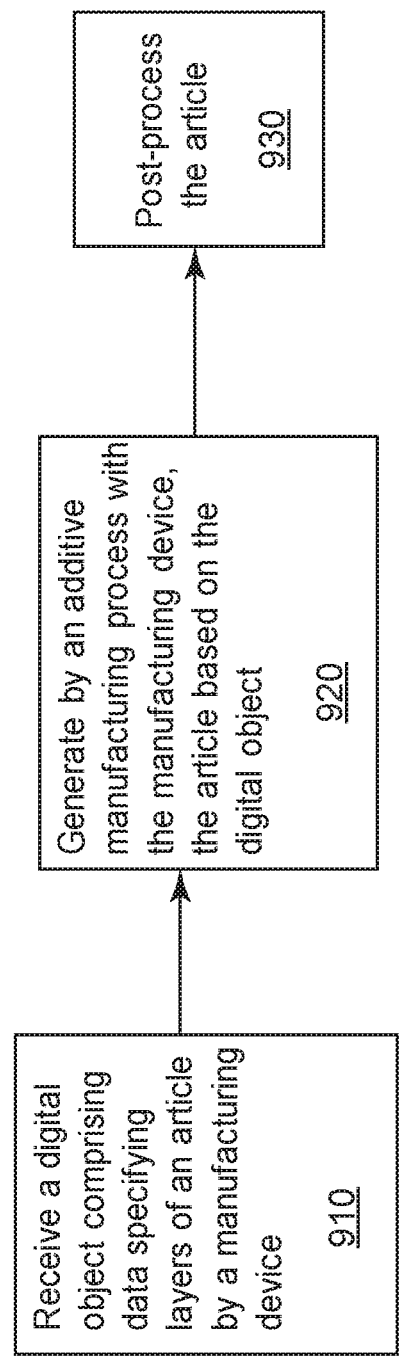
FIG. 9 is a high-level flow chart of an exemplary article additive manufacturing process.

Additionally, referring to FIG. 9, a method of making an article comprises receiving 910, by a manufacturing device having one or more processors, a digital object comprising data specifying a plurality of layers of an article; and generating 920, with the manufacturing device by an additive manufacturing process, the article based on the digital object. Again, the article undergoes one or more steps of post-processing 930 (e.g., moving the article to generate a mass inertial force in uncured photopolymerizable composition).

Select Embodiments of the Disclosure

Embodiment 1 is a method of making an orthodontic article. The method includes (a) providing a photopolymerizable composition; (b) selectively curing the photopolymerizable composition using actinic radiation to form an article in the shape of an orthodontic article including a plurality of layers of at least one photopolymerized polymer; and (c) moving the article and thereby generating a mass inertial force in the uncured photopolymerizable composition. The article has a first surface, and no more than 75% of the first surface has a slope magnitude greater than 2.5 degrees.

Embodiment 2 is the method of embodiment 1, wherein the mass inertial force is generated using a centrifuge, a shaker, or a mixer that spins along one or more axes.

Embodiment 3 is the method of embodiment 1 or embodiment 2, wherein the mass inertial force is generated using a centrifuge or a dual asymmetric centrifugal mixer.

Embodiment 4 is the method of any of embodiments 1 to 3, wherein the mass inertial force provides a G-force of 2 G or greater.

Embodiment 5 is the method of any of embodiments 1 to 4, further including d) subjecting the article to actinic radiation to photopolymerize uncured photopolymerizable composition after step c).

Embodiment 6 is the method of any of embodiments 1 to 5, further including e) subjecting the article to heat before, during, or after step c).

Embodiment 7 is the method of any of embodiments 1 to 5, wherein the generating the mass inertial force forms a coating layer of uncured photopolymerizable composition on the article, the coating layer having a thickness of 20 micrometers or greater, 30 micrometers or greater, 40 micrometers or greater, or 50 micrometers or greater.

Embodiment 8 is the method of any of embodiments 1 to 7, wherein the photopolymerizable composition includes at least one of a (meth)acryl component, an epoxy component, a polyalkylene component, a polyalkylene oxide component, a polyester component, a polycarbonate component, a urethane component, a polyamide component, a thiol component, an ene component that is not the (meth)acryl component, or combinations thereof.

Embodiment 9 is the method of any of embodiments 1 to 8, wherein no more than 70% of the first surface has a slope magnitude greater than 2.5 degrees, no more than 65%, no more than 55%, no more than 45%, no more than 35%, no more than 25%, no more than 15%, no more than 10%, or no more than 5% of the first surface has a slope magnitude greater than 2.5 degrees.

Embodiment 10 is the method of any of embodiments 1 to 9, wherein the article has a clarity of 35% or greater.

Embodiment 11 is the method of any of embodiments 1 to 10, wherein the article includes 0.05% by weight or less of extractable components, based on the total weight of the orthodontic article, when extracted with 5 volume percent ethanol in water.

Embodiment 12 is the method of any of embodiments 1 to 11, wherein the article has a haze of 65% or less.

Embodiment 13 is the method of any of embodiments 1 to 12, wherein the at least one photopolymerized polymer includes at least one of a (meth)acryl polymer, a thioether polymer, an epoxy polymer, or combinations thereof.

Embodiment 14 is the method of any of embodiments 1 to 13, wherein the at least one photopolymerized polymer includes a urethane (meth)acryl polymer, a polyalkylene oxide (meth)acryl polymer, a polyalkylene oxide urethane (meth)acryl polymer, a polyester urethane (meth)acryl polymer, a polycarbonate urethane (meth)acryl polymer, a polyamide polymer, an epoxy (meth)acrylate polymer, or combinations thereof.

Embodiment 15 is the method of any of embodiments 1 to 14, wherein the at least one photopolymerized polymer includes a polycarbonate urethane (meth)acryl polymer.

Embodiment 16 is the method of any of embodiments 1 to 15, wherein the first surface is an outer surface.

Embodiment 17 is the method of any of embodiments 1 to 16, wherein the first surface is a facial side surface.

Embodiment 18 is the method of any of embodiments 1 to 17, wherein the article further includes a second surface, wherein no more than 95% of the second surface has a slope magnitude greater than 2.5 degrees.

Embodiment 19 is the method of embodiment 18, wherein the second surface is an inner surface.

Embodiment 20 is the method of embodiment 18 or embodiment 19, wherein no more than 85% of the second surface has a slope magnitude greater than 5.5 degrees, no more than 80%, no more than 70%, no more than 60%, no more than 50%, no more than 40%, no more than 30%, no more than 20%, or no more than 10% of the second surface has a slope magnitude greater than 5.5 degrees.

Embodiment 21 is the method of any of embodiments 18 to 20, wherein no more than 90% of the second surface has a slope magnitude greater than 2.5 degrees, no more than 80%, no more than 70%, no more than 60%, no more than 50%, no more than 40%, no more than 30%, no more than 20%, or no more than 10% of the second surface has a slope magnitude greater than 2.5 degrees.

Embodiment 22 is the method of any of embodiments 1 to 21, wherein the generating the mass inertial force removes a portion of the uncured photopolymerizable composition from the article.

Embodiment 23 is the method of any of embodiments 1 to 22, wherein the article contains 0.04% by weight or less of extractable components or 0.03% by weight or less of extractable components, based on the total weight of the article, when extracted with 5 volume percent ethanol in water.

Embodiment 24 is the method of any of embodiments 1 to 23, wherein at least one of the plurality of layers has a thickness of no greater than 125 micrometers.

Embodiment 25 is the method of any of embodiments 1 to 24, wherein each of the plurality of layers except for an outer layer has a thickness of no greater than 130 micrometers, 120 micrometers, 110 micrometers, 100 micrometers, 80 micrometers, 60 micrometers, 50 micrometers, 40 micrometers, or 30 micrometers.

Embodiment 26 is the method of any of embodiments 1 to 25, wherein the photopolymerizable composition includes at least one reactive diluent.

Embodiment 27 is the method of any of embodiments 1 to 26, wherein the article includes a portion including a concave shape, the concave shape having a maximum thickness within 5% of a thickness of the concave shape in a data file of the article used to selectively cure the photopolymerizable composition.

Embodiment 28 is the method of any of embodiments 1 to 27, wherein the selectively curing of the photopolymerizable composition forms a plurality of voxels in the article.

Embodiment 29 is the method of any of embodiments 1 to 28, wherein the photopolymerizable composition is a first composition and the uncured photopolymerizable composition is a second composition including a polymer that is different from the first composition. The method further includes (f) removing excess first composition from the article by washing with at least one solvent; and (g) applying the second composition to the article. Steps f) and g) are performed after step b) and before step c).

Embodiment 30 is the method of embodiment 29, wherein the at least one solvent includes propylene carbonate, isopropanol, methanol, di(ethylene glycol) ethyl ether, tripropylene glycol monomethyl ether, diethylene glycol monobutyl ether, a blend of dipropylene glycol monomethyl ether with [2-(2-methoxymethylethoxy)methylethoxy]propanol, or combinations thereof.

Embodiment 31 is the method of embodiment 29 or embodiment 30, wherein the second composition is applied to the article using dip coating, spray coating, vacuum deposition, painting, or brushing.

Embodiment 32 is the method of any of embodiments 29 to 31, after step g), further including h) subjecting the article to actinic radiation to photopolymerize uncured first composition, uncured second composition, or both.

Embodiment 33 is the method of any of embodiments 29 to 32, wherein the second composition includes at least one of a (meth)acryl component, an epoxy component, a polyalkylene component, a polyalkylene oxide component, a polyester component, a polycarbonate component, a urethane component, a polyamide component, a thiol component, an ene component that is not the (meth)acryl component, or combinations thereof.

Embodiment 34 is the method of any of embodiments 1 to 33, wherein the photopolymerizable composition includes a free radical photoinitiator, a cationic photoinitiator, or combinations thereof.

Embodiment 35 is the method of embodiment 34, further comprising a thermal initiator.

Embodiment 36 is the method of any of embodiments 1 to 34, wherein no more than 20% of the first surface has a slope magnitude greater than 5.5 degrees, no more than 15%, no more than 10%, no more than 8%, no more than 5%, or no more than 3% of the first surface has a slope magnitude greater than 5.5 degrees.

Embodiment 37 is the method of any of embodiments 1 to 35, wherein the article has a haze of 650% or less, 55% or less, 50% or less, 45% or less, 40% or less, 35% or less, 30% or less, 25% or less, 20% or less, or 15% or less.

Embodiment 38 is the method of any of embodiments 1 to 36, wherein the article has a clarity of 40% or greater, 45% or greater, 50% or greater, 55% or greater, or 60% or greater.

Embodiment 39 is the method of any of embodiments 1 to 37, wherein the article exhibits an initial relaxation modulus of 100 megapascals (MPa) or greater measured at 2% strain at 37° C.

Embodiment 40 is the method of any of embodiments 1 to 39, wherein the article exhibits a percent loss of relaxation modulus of 70% or less or 40% or less.

Embodiment 41 is the method of any of embodiments 1 to 40, wherein the article exhibits a relaxation modulus of 100 MPa or greater.

Embodiment 42 is the method of any of embodiments 1 to 41, wherein the article exhibits an elongation at break of a printed article of 20% or greater or 70% or greater.

Embodiment 43 is the method of any of embodiments 1 to 42, wherein the article exhibits a tensile strength at yield of 14 MPa or greater.

Embodiment 44 is the method of any of embodiments 1 to 43, wherein the article exhibits a tensile strength at yield of 25 MPa or greater.

Embodiment 45 is the method of any of embodiments 1 to 44, wherein the article is free of inorganic fillers and colorants.

Embodiment 46 is the method of any of embodiments 1 to 45, wherein the article having the shape of an orthodontic article is an aligner, a splint, or a retainer.

Embodiment 47 is an orthodontic article prepared by the method of any of embodiments 1 to 46.

Embodiment 48 is an orthodontic article. The orthodontic article includes a plurality of layers of at least one photopolymerized crosslinked polymer. The orthodontic article has a first surface, and no more than 75% of the first surface has a slope magnitude greater than 2.5 degrees.

Embodiment 49 is the orthodontic article of any of embodiment 48, wherein the orthodontic article includes 0.05% by weight or less of extractable components, based on the total weight of the orthodontic article, when extracted with 5 volume percent ethanol in water.

Embodiment 50 is an orthodontic article. The orthodontic article includes a plurality of layers of at least one photopolymerized crosslinked polymer. The orthodontic article includes 0.05% by weight or less of extractable components, based on the total weight of the orthodontic article, when extracted with 5 volume percent ethanol in water.

Embodiment 51 is the orthodontic article of embodiment 50, wherein the orthodontic article has a first surface, and no more than 75% of the first surface has a slope magnitude greater than 2.5 degrees.

Embodiment 52 is the orthodontic article of any of embodiments 48 to 51, wherein no more than 70% of the first surface has a slope magnitude greater than 2.5 degrees, no more than 65%, no more than 55%, no more than 45%, no more than 35%, no more than 25%, no more than 15%, no more than 10%, or no more than 5% of the first surface has a slope magnitude greater than 2.5 degrees.

Embodiment 53 is the orthodontic article of any of embodiments 48 to 52, wherein the orthodontic article has a clarity of 35% or greater.

Embodiment 54 is the orthodontic article of any of embodiments 48 to 53, wherein the orthodontic article has a haze of 65% or less.

Embodiment 55 is the orthodontic article of any of embodiments 48 to 54, wherein the at least one photopolymerized crosslinked polymer includes a (meth)acryl polymer, a thioether polymer, an epoxy polymer, or combinations thereof.

Embodiment 56 is the orthodontic article of any of embodiments 48 to 55, wherein the at least one photopolymerized crosslinked polymer includes a urethane (meth)acryl polymer, a polyalkylene oxide (meth)acryl polymer, a polyalkylene oxide urethane (meth)acryl polymer, a polyester urethane (meth)acryl polymer, a polycarbonate urethane (meth)acryl polymer, a polyamide polymer, an epoxy (meth)acrylate polymer, or combinations thereof.

Embodiment 57 is the orthodontic article of any of embodiments 48 to 56, wherein the at least one photopolymerized crosslinked polymer includes a polycarbonate urethane (meth)acryl polymer.

Embodiment 58 is the orthodontic article of any of embodiments 48 to 57, wherein the plurality of layers includes an outer layer comprising a polymer that is different from the polymer of a layer adjacent to the outer layer.

Embodiment 59 is the orthodontic article of embodiment 57, wherein the outer layer includes a polymer selected from the group consisting of a (meth)acryl polymer, a thioether polymer, an epoxy polymer, or combinations thereof.

Embodiment 60 is the orthodontic article of any of embodiments 48 to 59, wherein the first surface is an outer surface.

Embodiment 61 is the orthodontic article of any of embodiments 48 to 60, wherein the first surface is a facial or labial side surface.

Embodiment 62 is the orthodontic article of any of embodiments 48 to 61, further including a second surface, wherein no more than 95% of the second surface has a slope magnitude greater than 2.5 degrees.

Embodiment 63 is the orthodontic article of embodiment 62, wherein the second surface is an inner surface.

Embodiment 64 is the orthodontic article of embodiment 62 or embodiment 63, wherein no more than 90% of the second surface has a slope magnitude greater than 2.5 degrees, no more than 80%, no more than 70%, no more than 60%, no more than 50%, no more than 40%, no more than 30%, no more than 20%, or no more than 10% of the second surface has a slope magnitude greater than 2.5 degrees.

Embodiment 65 is the orthodontic article of any of embodiments 62 to 64, wherein no more than 85% of the second surface has a slope magnitude greater than 5.5 degrees, no more than 80%, no more than 70%, no more than 60%, no more than 50%, no more than 40%, no more than 30%, no more than 20%, or no more than 10% of the second surface has a slope magnitude greater than 5.5 degrees.

Embodiment 66 is the orthodontic article of any of embodiments 48 to 65, wherein the orthodontic article is free of inorganic fillers and colorants.

Embodiment 67 is the orthodontic article of any of embodiments 48 to 66, wherein the orthodontic article contains 0.04% by weight or less of extractable components or 0.03% by weight or less of extractable components, based on the total weight of the orthodontic article, when extracted with 5 volume percent ethanol in water.

Embodiment 68 is the orthodontic article of any of embodiments 48 to 67, wherein the plurality of layers includes an outer layer having a thickness of 20 micrometers or greater, 30 micrometers or greater, 40 micrometers or greater, or 50 micrometers or greater.

Embodiment 69 is the orthodontic article of any of embodiments 48 to 68, wherein at least one of the plurality of layers has a thickness of no greater than 125 micrometers.

Embodiment 70 is the orthodontic article of any of embodiments 48 to 69, wherein each of the plurality of layers except for an outer layer has a thickness of no greater than 130 micrometers, 120 micrometers, 110 micrometers, 100 micrometers, 80 micrometers, 60 micrometers, 50 micrometers, 40 micrometers, or 30 micrometers.

Embodiment 71 is the orthodontic article of any of embodiments 48 to 70, wherein the orthodontic article includes a concave shape that has a thickness within 5% of a thickness of the concave shape in a data file of the orthodontic article.

Embodiment 72 is the orthodontic article of any of embodiments 48 to 71, wherein no more than 20% of the first surface has a slope magnitude greater than 5.5 degrees, no more than 18%, no more than 15%, no more than 12%, no more than 10%, no more than 8%, no more than 7%, no more than 6%, no more than 5%, or no more than 3% of the first surface has a slope magnitude greater than 5.5 degrees.

Embodiment 73 is the orthodontic article of any of embodiments 48 to 72, wherein the orthodontic article has a haze of 60% or less, 55% or less, 50% or less, 45% or less, 40% or less, 35% or less, 30% or less, 25% or less, 20% or less, or 15% or less.

Embodiment 74 is the orthodontic article of any of embodiments 48 to 73, wherein the orthodontic article has a clarity of 40% or greater, 45% or greater, 50% or greater, 55% or greater, or 60% or greater.

Embodiment 75 is the orthodontic article of any of embodiments 48 to 74, wherein the orthodontic article includes a plurality of voxels present in the plurality of layers of the at least one photopolymerized crosslinked polymer.

Embodiment 76 is the orthodontic article of any of embodiments 48 to 75, exhibiting an initial relaxation modulus of 100 megapascals (MPa) or greater measured at 2% strain at 37° C.

Embodiment 77 is the orthodontic article of any of embodiments 48 to 76, exhibiting a percent loss of relaxation modulus of 70% or less.

Embodiment 78 is the orthodontic article of any of embodiments 48 to 77, exhibiting a percent loss of relaxation modulus of 40% or less.

Embodiment 79 is the orthodontic article of any of embodiments 48 to 78, exhibiting a relaxation modulus of 100 MPa or greater.

Embodiment 80 is the orthodontic article of any of embodiments 48 to 79, exhibiting an elongation at break of a printed article of 20% or greater.

Embodiment 81 is the orthodontic article of any of embodiments 48 to 80, exhibiting an elongation at break of a printed article of 70% or greater.

Embodiment 82 is the orthodontic article of any of embodiments 48 to 81, exhibiting a tensile strength at yield of 14 MPa or greater.

Embodiment 83 is the orthodontic article of any of embodiments 48 to 82, exhibiting a tensile strength at yield of 25 MPa or greater.

Embodiment 84 is the orthodontic article of any of embodiments 48 to 83, wherein the orthodontic article is an aligner, a splint, or a retainer.

Embodiment 85 is a method of making an orthodontic article. The method includes (a) providing a first composition comprising a photopolymerizable composition; (b) selectively curing the first composition using actinic radiation to form an article in the shape of an orthodontic article including a plurality of layers of at least one photopolymerized polymer; (c) removing uncured first composition from the article; (d) applying a second composition comprising a polymerizable composition or a polymer to the article, wherein the first composition is different from the second composition; (e) moving the article and thereby generating a mass inertial force in the polymerizable composition or polymer; (f) optionally subjecting the article to actinic radiation to photopolymerize uncured photopolymerizable composition; and (g) optionally subjecting the article to heat before, during, or after step (e).

Embodiment 86 is the method of embodiment 85, wherein removing uncured first composition from the article is performed by washing with at least one solvent, by moving the article and thereby generating a mass inertial force in the uncured photopolymerizable composition, or both.

Embodiment 87 is an orthodontic article prepared by the method of embodiment 85 or embodiment 86.

EXAMPLES

Objects and advantages of this disclosure are further illustrated by the following examples, but the particular materials and amounts thereof recited in these examples, as well as other conditions and details, should not be construed to unduly limit this disclosure.

Unless otherwise noted, all parts, percentages, ratios, etc. in the Examples and the rest of the specification are by weight. Table 1 (below) lists materials used in the examples and their sources.

TABLE 1

Materials List

| DESIGNATION | DESCRIPTION | SOURCE |
| --- | --- | --- |
| ACCURA 60 | Transparent, polycarbonate-like resin obtained under the trade designation ACCURA 60 | 3D Systems, Rock Hill, South Carolina |
| IBOMA | Isobornyl methacrylate | San Esters Corp., New York, NY |
| EXOTH-10 | A urethane (meth)acrylate oligomer comprising a polyethylene oxide diol of about 400 MW, obtained under the trade designation EXOTHANE-10 | Esstech Inc., Essington, PA |
| EHMA | 2-Ethyl hexyl methacrylate | Alfa Aesar, Haverhill, MA |
| PEMA | 2-Phenoxy ethyl methacrylate ("SR 340") | Sartomer, Exton, PA |
| Propylene Carbonate | Propylene Carbonate | Alfa Aesar |
| iPrOH | Isopropyl alcohol | EMD Millipore, a part of Merck KGaA, Darmstadt, Germany |
| TIN-326 | 2-(5-chloro-2H-benzotriazol-2-yl)-6-(1,1-dimethylethyl)-4-methylphenol obtained under the trade designation TINUVIN 326 | BASF, Ludwigshafen, Germany |
| BHT | 2,6-di-t-butyl-4-methylphenol | Alfa Aesar |
| IRG-TPO | 2,4,6-trimethylbenzoyldiphenylphosphine oxide photoinitiator obtained under the trade designation IRGACURE TPO | BASF |
| C-2050 | A polycarbonate diol of about 2000 MW made with about a 50% (i.e., 5:5) mole ratio of (MPD):(HD), obtained as "KURARAY POLYOL C-2050" from Kuraray Co. Ltd. | Kuraray Co. Ltd., Tokyo, Japan. |
| XK-672 | Zn-based catalyst obtained under the trade designation K-KAT XK-672 | King Industries, Norwalk, CT |
| HEMA | Hydroxyethyl methacrylate | TCI America, Portland, OR |
| IPDI | Isophorone diisocyanate, equivalent weight 111.11, molecular weight 222.22 g/mole, obtained under trade designation DESMODUR I | Covestro LLC, Leverkusen, Germany |

TABLE 1-continued

Materials List

| DESIGNATION | DESCRIPTION | SOURCE |
| --- | --- | --- |
| Nap-A | Naphthalimide acrylate (NapA), prepared as described in U.S. patent application Ser. No. 62/736,027 | |
| EtOH | Ethanol | Spectrum Chemicals, New Brunswick, NJ |

Test Methods

Additive Manufacturing of 3D Printed Dogbones and DMA Bars

Unless otherwise noted, all 3D-printed examples were manufactured on an Asiga Max, a vat polymerization 3D printer available from Asiga USA, Anaheim Hills, CA.

Each formulation listed in Table 2 was photopolymerized on an Asiga Max 3D printer with a LED light source of 385 nanometer (nm). The dogbone shaped tensile test bars of Type V according to ASTM D638-14 (2014) and 3-point bend rectangular dynamic mechanical analysis (DMA) bars according to ASTM E328-13 (2013) were prepared via 3D printing. The resin bath of the printer was heated to 35-50° C. before photopolymerization to reduce the viscosity to prepare the tensile test bars. The following settings were used for the printing: slice thickness=50 micrometers (μm); burn in layers=1; separation velocity=1.5 millimeters per second (mm/s), separation distance=10 millimeters (mm), approach velocity=1.5 mm/s.

Post Processing of Printed Dogbones and DMA Bars

The printed parts were post processed in one of the following ways: Solvent washing or Centrifugation.

Solvent washing: The printed parts were washed in a bath of propylene carbonate for approximately 1 minute followed by using two different baths of isopropanol for approximately 15 seconds (sec) each. The printed parts were then post-cured using a CLEARSTONE 3200 UV chamber (365 nm, 385 nm, 405 nm LEDs—all of them switched on) for 5 minutes on each side under a nitrogen purge. The parts were then heated in an oven set at 100° C. for 30 minutes. The dogbone specimens were conditioned in phosphate-buffered saline (PBS, diluted to 1× from 10× stock, pH=7.4) for 24 hours at 37° C. The DMA 3-point bend rectangular specimens were conditioned in de-ionized (DI) water for 48 hours at room temperature. Examples that were solvent washed are designated with a (SW) behind the example number.

Centrifugation: The printed parts were centrifuged (instead of solvent washed) using a Beckman Coulter AVANTI J-20 XP. The parts were placed in the centrifuge cup on top of a wire mesh to allow resin to flow off and oriented such that the concave surfaces would face outwards (e.g., away from the center of the centrifuge) during centrifugation, and were spun for 1 minute at 4300 revolutions per minute (rpm). The printed parts were then post-cured using a CLEARSTONE 3200 UV chamber (365 nm, 385 nm, 405 nm LEDs—all of them switched on) for 5 minutes on each side under a nitrogen purge. The parts were then heated in an oven set at 100° C. for 30 minutes. The dogbone specimens were conditioned in phosphate-buffered saline (PBS, diluted to 1× from 10× stock, pH=7.4) for 24 hours at 37° C. The DMA 3-point bend rectangular specimens were conditioned in de-ionized (DI) water for 48 hours at room temperature. Examples that were centrifuged are designated with a (C) behind the example number.

General Procedure for Tensile Testing

PBS conditioned dogbone specimens were tested on an INSTRON 5944 testing system (Instron, Norwood, MA) with a 500 Newton (N) load cell. The crosshead displacement rate was 5 mm/minute, and the initial grip separation was 1 inch (2.5 centimeters (cm)). The gauge length was set to 1 inch (2.5 cm). Five replicate samples for each formulation were tested and the average values are reported. The tensile strength at yield was determined according to ASTM D638-14 (2014). Elongation at break was determined from the crosshead movement of the grips. Tensile strength at yield and elongation at break are shown in Table 3.

General Procedure for the Determination of Relaxation Modulus Using Dynamic Mechanical Analysis DMA 3-point bend rectangular specimens were tested in a TA Instruments Q800 DMA (New Castle, DE) equipped with a submersion 3-point bending clamp. The water-conditioned rectangular specimens were placed in water-filled submersion fixture and were equilibrated for 10 minutes at 37° C. After equilibration, a 2% strain was applied, and data collection began. Relaxation modulus was measured for 30 minutes using TA Advantage software. The first data point collected is the initial relaxation modulus and the final data point collected at 30 minutes is the relaxation modulus at 30 minutes. The percentage loss in relaxation modulus from its initial value compared to the relaxation modulus at 30 min (termed Percent Loss of Relaxation Modulus After 30 Minutes) was calculated in the following way: 100−((relaxation modulus at 30 min/Initial relaxation modulus)*100)). The results are shown in Table 3.

Additive Manufacturing of Aligner Articles from the Formulated Resin

Polymerizable compositions PE-3 and PE-4 of Table 2 were photopolymerized on the Asiga Max printer with a LED light source of 385 nm. A stereolithography file format (STL file) of the aligner was loaded into the Asiga Composer software, and support structures were generated. The resin bath of the printer was heated to 40° C. before photopolymerization to reduce the viscosity to be able to manufacture the article. The following settings were used for the printing: slice thickness=50 μm; burn in layers=1; separation velocity=1.5 mm/min, burn-in exposure time=10 sec; exposure time=3 sec. The printed parts were either centrifuged or speed mixed at a desired RPM (as listed in Table 4), or washed using propylene carbonate for approximately 1 minute followed by using two different baths of isopropanol for approximately 15 secs and repeating through the wash process one more time. The printed specimens were then post-cured using an CLEARSTONE 3200 post-curing UV-chamber (365 nm, 385 nm, 405 nm LEDs—all of them switched on) for 15 minutes on each side. The printed specimens were heated in an oven at 100° C. for 30 minutes. Examples that are centrifuged are designated with a (C) behind the example number. Examples that are solvent washed are designated with a (SW) behind the example number.

Thickness Measurements of 3D Printed Dental Aligners 3D printed aligners, made using compositions PE-3 and PE-4 and post processed as described above, were scanned using SKYSCAN 1275 (Bruker, Belgium). Each scanned image was analyzed using NRecon construction software (Bruker), and 3D Slicer software (3D Slicer, 4.9.0). An upper left cuspid tooth model of the aligner was selected to measure the thickness, and the thickness was measured at a point on the labial/facial surface, the occlusal surface, and the lingual surface. The thickness values are listed in Table 4. The thickness difference at a particular RPM is the difference in thickness calculated by subtracting the thickness measured in a washed aligner from the thickness measured in a centrifuged or spun mixed aligner, and then dividing the difference by 2.

Test Procedure for Gravimetric Analysis of Extractable Components from Printed Articles Articles shaped as a continuous 5-tooth row (30.4 mm×9.24 mm×8.17 mm) using formulation PE-4 were printed on the Asiga Max printer. The articles were in the shape of a shell with a thickness of 0.49 mm. The printed parts were either centrifuged for 1 minute at 4300 RPM, or washed using propylene carbonate for approximately 1 minute followed by using two different baths of isopropanol for approximately 15 seconds and repeating through the wash process one more time. The printed articles were then post cured in a CLEARSTONE 3200 UV chamber (365 nm, 385 nm, 405 nm LEDs—all of them switched on) for 15 minutes on each side under a nitrogen purge. The articles were then heated in an oven set at 100° C. for 30 minutes. The articles were then heated under vacuum for 2 hours in an oven set at 100° C. Three of the 5-tooth articles (together providing a total surface area of 45 cm$^2$) were placed in a 40 milliliter (mL) glass vial and weighed. 15 mL of solvent (5 volume % ethanol/Milli-Q water) was added to the vial, with one 15 mL blank (vial containing solvent but without articles). The vials were covered with TEFLON caps and the samples were kept at 37° C. for 24 hours while shaking at 80 revolutions per minute (RPM) in a LabLine Benchtop incubated shaker, Model No. 4628. The samples were allowed to cool before transferring the extraction solution to a new 20 mL glass vial. A 5 mL aliquot was transferred to a pre-weighed 8 mL glass vial and set to evaporate under a nitrogen purge. The vials were then weighed once the solvent evaporated, until a constant weight was reached. % Residue was calculated using the formula below. The test was completed in triplicates, all run at the same time, and results shown are the average of the three replicates in Table 5.

$$\% \text{ Residue} = \left[ \frac{(\text{vial after evaporation}(g) - \text{vial tare}(g)) * (15 \text{ mL solvent})}{(\text{mass of article}(g)) * (5 \text{ mL solvent analyzed})} \right] * 100$$

Examples that are centrifuged are designated with a (C) behind the example number. Examples that are solvent washed are designated with a (SW) behind the example number.

Viscosity of Resins

Absolute (e.g., dynamic) viscosities of the example resins were measured using a TA Instruments AR-G2 magnetic bearing rheometer (New Castle, DE) using a 40 millimeter cone and plate measuring system at 40° C. at a shear rate of 0.1 s$^{-1}$. Two replicates were measured and the average value was reported as the viscosity in pascal·seconds (Pa·s) (see Table 6, below).

Haze and Clarity Test Method

Square shaped sheets (2.5 inches×2.5 inches×0.03 inches (6.35 cm×6.35 cm×0.08 cm)) using formulation PE-4 were printed on the Asiga Max printer. The resin bath of the printer was heated to 40° C. before photopolymerization to reduce the viscosity to be able to manufacture the article. The following settings were used for the printing: slice thickness=50 μm; burn in layers=1; separation velocity=1.5 mm/min, burn-in exposure time=10 sec; exposure time=3 sec. The printed parts were either centrifuged at 4300 RPM for 1 minute or washed using propylene carbonate for approximately 1 minute followed by using two different baths of isopropanol for approximately 15 seconds each. The printed articles were then post cured in a CLEARSTONE 3200 UV chamber (365 nm, 385 nm, 405 nm LEDs—all of them switched on) for 15 minutes on each side under a nitrogen purge. The articles were then heated in an oven set at 100° C. for 30 minutes.

The optical properties were measured using haze-gard i (Obtained from BYK, MD, USA, Catalog 4775, Serial number 1264257) with a 25 mm aperture. Before measurement, the haze-gard was calibrated using the BYK Calibration Standard (ID 1338-194368). Data was collected with the BYK smart-lab haze software. Haze and Transmittance were measured using the ASTM D 1003 Illuminant C standard, and Clarity was measured using the BYK clarity standard. All standards came pre-programmed into the haze-gard. Ten measurements of transmittance, haze, and clarity (THC) were collected for each sample, as the sample surface texture resulted in variation of THC across a sample replicate. It was observed than ten measurements resulted in "stabilized" averages of THC. Each of the ten measurements was taken at different areas of the sample. For consistency, the same ten areas were measured on each sample. The software automatically averaged the ten measurements for THC and produced a final result for each sample. The results reported in Table 7 are averages of 5 replicate articles that were washed and 4 replicates that were centrifuged. Examples that are centrifuged are designated with a (C) behind the example number. Examples that are solvent washed are designated with a (SW) behind the example number.

Additive Manufacturing of Parts with Accura 60

Square shaped sheets (2.5 inches×2.5 inches×0.03 inches (6.35 cm×6.35 cm×0.08 cm)) using ACCURA 60 (3D Systems, Rock Hill, SC) were printed on a 3D Systems Viper (3D Systems). The models were supported and prepped for the build using 3D Systems Lightyear software. The printing parameter for layer thickness was 0.002 inches (0.05 millimeters), critical energy was 15.4 mJ/cm$^2$ and penetration depth was 6.3 mils (0.16 millimeters). The printed parts were either centrifuged at 1500 RPM for 1 minute or washed using propylene carbonate followed by isopropanol, using the respective protocol demonstrated above, to remove unreacted resin. The printed articles were then post cured in a CLEARSTONE 3200 UV chamber (365 nm, 385 nm, 405 nm LEDs—all of them switched on) for 1 minute on each side under a nitrogen purge.

The optical properties were measured using a haze-gard i as described above and the results reported in Table 7 are the average of 4 replicate articles that were washed and 3 replicates that were centrifuged. Examples that are centrifuged are designated with a (C) behind the example number. Examples that are solvent washed are designated with a (SW) behind the example number.

Test Method for Slope Analysis of Surfaces

Slope analysis has been used to characterize rough surfaces on the 3D printed aligners. The analysis is carried out on the height maps of the surfaces obtained using a Keyence VK-X200 confocal laser scanning microscope using the 50× objective and 3×4 tiling. A piece was cut from the front portion of each aligner in a region that contains the flat portion of the tooth shape. Height maps of the outside surface were obtained from each piece. Height maps on the inside surface of the aligner were obtained from a replica of the inside surface of each piece, because it was not possible to image the inside surface directly with the 50× objective. The replicas were made using a F5 RepliSet replicating system (Struers Inc., Clevelend, OH). MATLAB (version R2015a, MathWorks, Natick, MA). Code was written to take the height map data for a surface and generate all the slope distributions of interest. Prior to the slope analysis, the height maps were tilt corrected, cylindrical curvature removed for both axes, and a Fourier band pass spatial filter from 7 to 400 inverse mm applied to remove waviness and to remove high frequency noise.

MATLAB was used to calculate the surface slopes about each pixel in the height map using the equations below. Surface height map data give the height of the surface as a function of x and y positions, and is represented as a function H(x,y). The surface slope about the pixel at coordinates (x,y) are defined below. The results are reported in degrees.

1. Slope (in Degrees) Distribution—F($\theta$)

$$\theta = \arctan(|\nabla H(x, y)|) = \arctan\left(\sqrt{\left(\frac{H(x+\Delta x, y) - H(x-\Delta x, y)}{2\Delta x}\right)^2 + \left(\frac{H(x, y+\Delta y) - H(x, y-\Delta y)}{2\Delta y}\right)^2}\right)$$

The slope in degrees about the point (x,y) is defined as the arc tangent of the magnitude of the gradient vector calculated using $\Delta x$ and $\Delta y$ between 500 and 1500 nm. For the height maps analyzed, $\Delta x$ and $\Delta y$ were set to 1100 nm.

F($\theta$) is defined as the number of points with slope between $\theta-\Delta\theta/2$ and $\theta+\Delta\theta/2$, where $\Delta\theta$ of 0.2 degrees was used.

2. $F_{CC}(\theta)$—Complement Cumulative Distribution of the Slope Distribution $$F_{CC}(\theta) = \frac{\sum_{q=\theta}^{90-\frac{\Delta\theta}{2}} F(q)}{\sum_{q=\frac{\Delta\theta}{2}}^{\infty} F(q)}$$

$F_{CC}(\theta)$ is the complement of the cumulative slope distribution and gives the fraction of the slopes that are greater than or equal to $\theta$.

The aligner $F_{CC}$ data at 2.5° and 5.5° are shown in Table 8.

EXAMPLES

Preparative Example 1 (PE-1)

Synthesis of PE-1 was prepared as follows. A 1 liter (L) three-necked round-bottom flask was charged with 1100.8 g C-2050, heated to about 45° C., then were added 248.55 g IPDI, 0.6 g BHT, and 0.375 g XK-672. The reaction was heated under dry air to an internal setpoint of 105° C. (temperature reached at about 20 min). At 1 hour and 20 minutes 150.65 g HEMA was added via an addition funnel at a steady rate over 1 hour and 10 minutes. The reaction was heated for about 2.5 hours at 105° C., then an aliquot was checked by Fourier transform infrared spectroscopy (FTIR) and found to have no —NCO peak at 2265 cm-1 and the product was isolated as a clear, viscous material.

Preparative Examples 2 to 4 (PE-2 to PE-4)

Each formulation was prepared by weighing the components (indicated in Tables 2) into an amber jar, followed by rolling each amber jar on a roller (having the trade designation "OLDE MIDWAY PRO18" and manufactured by Olde Midway) at 60° C. until mixed.

TABLE 2

Formulations (parts by weight)

| Example | PE-1 | EXOTH-10 | IBOMA | EHMA | PEMA | IRG-TPO | BHT | Nap-A | TIN 326 |
|---|---|---|---|---|---|---|---|---|---|
| PE-2 | 50 | | 50 | | | 2 | 0.025 | 0.025 | |
| PE-3 | | 45 | 11 | 18 | 26 | 2 | 0.025 | | |
| PE-4 | 50 | | 50 | | | 2 | 0.025 | | 0.025 |

Examples (EX) and Comparative Examples (CE)

Dogbones, DMA bars, square sheets, and orthodontic articles were additively manufactured and tested as described in detail above. Results are provided in Tables 3, 4, 5, 7 and 8 below.

TABLE 3

Mechanical properties of printed dogbones and DMA bars

| Example | Formulation | Strength at yield, MPa | % Elongation at break | Initial relaxation modulus, MPa | Relaxation Modulus at 30 Minutes, MPa | % Loss of Relaxation Modulus After 30 Minutes |
|---|---|---|---|---|---|---|
| CE-1 (SW) | PE-2 | 27.7 | 77.7 | 792.4 | 324.1 | 59.1 |
| EX-2 (C) | PE-2 | 32.6 | 68.2 | 888.9 | 435.8 | 51.1 |

TABLE 4

Thickness measurement of the upper left cuspid model of aligners

| Upper Left Cuspid | Formulation | Labial/facial surface, mm | Occlusal surface, mm | Lingual Surface, mm |
|---|---|---|---|---|
| EX-3 (C) at 4300 RPM | PE-4 | 0.5529 | 0.5618 | 0.5551 |
| EX-3 (thickness difference at 4300 RPM) | PE-4 | 0.0389 | 0.0329 | 0.0234 |
| CE-4 (SW) | PE-4 | 0.4750 | 0.4960 | 0.5083 |
| EX-5 (at 2000 RPM) | PE-4 | 0.5491 | 0.5241 | 0.5704 |
| EX-5 (thickness difference at 2000 RPM) | PE-4 | 0.0371 | 0.0141 | 0.0311 |
| EX-6 (at 3000 RPM) | PE-4 | 0.5345 | 0.5251 | 0.5543 |
| EX-6 (thickness difference at 3000 RPM) | PE-4 | 0.0298 | 0.0146 | 0.0230 |
| EX-7 (speed mixed$^a$ at 1600 RPM) | PE-4 | 0.5284 | 0.6016 | 0.5594 |
| Ex-7 (thickness difference at 1600 RPM) | PE-4 | 0.0267 | 0.0528 | 0.0256 |
| CE-8 (SW) | PE-3 | 0.5963 | 0.9026 | 0.6645 |
| EX-9 (C) (at 4300 RPM) | PE-3 | 0.6340 | 1.0579 | 0.7112 |
| EX-9 (thickness difference at 4300 RPM) | PE-3 | 0.0189 | 0.0777 | 0.0234 |

$^a$The appliances were spun in a DAC 1100 FVZ Speed Mixer (Flack Tek, Landrum, SC) for 1 minute

TABLE 5

Percent extractable components of solvent washed and centrifuged samples in 5% ethanol water

| Example | Formulation | % Extractable in 5% EtOH/H$_2$O |
|---|---|---|
| EX-10 (C) | PE-4 | 0.021 |
| CE-11 (SW) | PE-4 | 0.061 |

TABLE 6

Viscosities of resins in Pa · s

| Example | Temperature, ° C. | Viscosity, Pa · s |
|---|---|---|
| PE-3 | 25 | 0.282 |
| PE-3 | 40 | 0.168 |
| PE-4 | 25 | 5.27 |
| PE-4 | 40 | 1.878 |

TABLE 7

Optical properties of printed articles

| Example | Formulation | Haze | Clarity |
|---|---|---|---|
| CE-12 (SW) | PE-4 | 96.1 (3.8) | 3.49 (1.63) |
| EX-13 (C) | PE-4 | 11.2 (2.9) | 58.68 (3.59) |
| CE-14 (SW) | ACCURA 60 | 76.4 (4.2) | 31.0 (1.7) |
| EX-15 (C) | ACCURA 60 | 13.7 (2.6) | 72.7 (5.3) |

The values in the parenthesis denote standard deviation.

TABLE 8

$F_{CC}$ data for Aligners

| Side | | EX-9 (C) | CE-8 (SW) | EX-3 (C) | CE-4 (SW) |
|---|---|---|---|---|---|
| $F_{CC}$ (2.5°) | outside | 47.9% | 97.6% | 5.1% | 96.1% |
| $F_{CC}$ (2.5°) | inside | 93.7% | 98.8% | 0.8% | 98.2% |
| $F_{CC}$ (5.5°) | outside | 11.9% | 90.1% | 1.9% | 85.1% |
| $F_{CC}$ (5.5°) | inside | 79.0% | 94.5% | 0.4% | 92.0% |

Example 16 and Comparative Example 17

Two 75 micrometer (μm) thick shells covering a full dental arch were printed with formlabs Dental LT resin on a Form 2 printer (formlabs, Somerville, MA). Shell 1 (CE-17) was conventionally post-processed with a 5 minute rinse in IPA (isopropyl alcohol) followed by air drying in accordance with the manufacturer's instructions. Shell 2 (EX-16) was mounted in an inclined position into a 1 quart container and spun for 10 seconds at 2750 rpm in a DAC 400 FVZ Speed Mixer (Flack Tek, Landrum, SC). Both shells were then post cured under a nitrogen purge for 20 minutes in a PCU 90 UV curing unit Innovation MediTech (Unna, Germany). FIGS. 12A and 12B show the appearance of a dental appliance that was spun (12A) and one that was washed (12B).

All of the patents and patent applications mentioned above are hereby expressly incorporated by reference. The embodiments described above are illustrative of the present invention and other constructions are also possible. Accordingly, the present invention should not be deemed limited to the embodiments described in detail above and shown in the accompanying drawings, but instead only by a fair scope of the claims that follow along with their equivalents.

The invention claimed is:

1. A method of making an orthodontic article, the method comprising:
   a) providing a photopolymerizable composition;
   b) selectively curing the photopolymerizable composition using actinic radiation to form an article in the shape of an orthodontic article, the article comprising a plurality of layers of at least one photopolymerized polymer;
   c) moving the article and thereby generating a mass inertial force in remaining uncured photopolymerizable composition, wherein the generating the mass inertial force forms a coating layer of remaining uncured photopolymerizable composition on the article, the coating layer having a thickness of 20 micrometers or greater, 30 micrometers or greater, 40 micrometers or greater, or 50 micrometers or greater; and
   d) curing the coating layer of remaining uncured photopolymerizable composition to form the orthodontic article,
   wherein the orthodontic article has a first surface, wherein no more than 75% of the first surface has a slope magnitude greater than 2.5 degrees.

2. The method of claim 1, wherein the mass inertial force is generated using a centrifuge, a shaker, or a mixer that spins along one or more axes.

3. The method of claim 1, wherein the mass inertial force is generated using a dual asymmetric centrifugal mixer.

4. The method of claim 1, wherein the mass inertial force provides a G-force of 2 G or greater.

5. The method of claim 1, further comprising e) subjecting the article to heat before, during, and/or after step c).

6. The method of claim 1, wherein the first surface is an outer surface.

7. The method of claim 1, wherein the article comprises a portion comprising a concave shape, the concave shape having a maximum thickness within 5% of a thickness of the concave shape in a data file of the article used to selectively cure the photopolymerizable composition.

8. The method of claim 1, the orthodontic article comprising a plurality of layers of at least one photopolymerized crosslinked polymer, the orthodontic article comprising 0.05% by weight or less of extractable components, based on the total weight of the orthodontic article, when extracted with 5 volume percent ethanol in water.

9. The method of claim 1, wherein no more than 65% of the first surface has a slope magnitude greater than 2.5 degrees, no more than 55%, no more than 45%, no more than 35%, no more than 25%, no more than 15%, no more than 10%, or no more than 5% of the first surface has a slope magnitude greater than 2.5 degrees.

10. The method of claim 1, wherein the orthodontic article is characterized by a clarity of 35% or greater.

11. The method of claim 1, wherein the orthodontic article is characterized by a haze of 65% or less.

12. The method of claim 1, wherein the first surface is a facial side surface.

13. The method of claim 1, wherein each of the plurality of layers, except for an outer layer, are characterized by a thickness of no greater than 130 micrometers, 120 micrometers, 110 micrometers, 100 micrometers, 80 micrometers, 60 micrometers, 50 micrometers, 40 micrometers, or 30 micrometers.

14. The method of claim 1, wherein the orthodontic article comprises a concave shape that has a thickness within 5% of a thickness of the concave shape in a data file of the orthodontic article.

15. The method of claim 1, wherein the orthodontic article comprises a plurality of voxels present in the plurality of layers of the at least one photopolymerized polymer.

16. The method of claim 1, the polymerizable composition comprising:
    a urethane (meth)acrylate monomer; and
    a cycloaliphatic monofunctional (meth)acrylate monomer.

17. The method of claim 16, the urethane (meth)acrylate monomer represented by a formula:

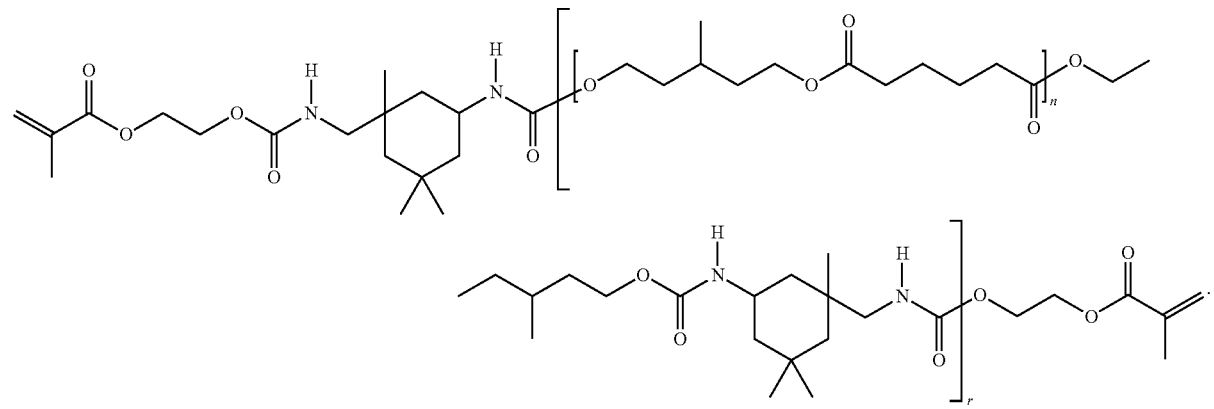

18. The method of claim 16, the cycloaliphatic monofunctional (meth)acrylate monomer being isobornyl (meth)acrylate.

* * * * *